US010861249B2

(12) United States Patent
Eschricht et al.

(10) Patent No.: US 10,861,249 B2
(45) Date of Patent: Dec. 8, 2020

(54) METHODS AND SYSTEM FOR MANIPULATING DIGITAL ASSETS ON A THREE-DIMENSIONAL VIEWING PLATFORM

(71) Applicant: The Q Digital Technologies, Inc., Old Greenwich, CT (US)

(72) Inventors: James G. Eschricht, Old Greenwich, CT (US); William A. King, Old Greenwich, CT (US); Sungkyu Koo, Fort Lee, NJ (US)

(73) Assignee: The Q Digital Technologies, Inc., Old Greenwich, CT (US)

( * ) Notice: Subject to any disclaimer, the term of this patent is extended or adjusted under 35 U.S.C. 154(b) by 0 days.

(21) Appl. No.: 16/523,773

(22) Filed: Jul. 26, 2019

(65) Prior Publication Data

US 2020/0035040 A1 Jan. 30, 2020

Related U.S. Application Data

(60) Provisional application No. 62/703,991, filed on Jul. 27, 2018.

(51) Int. Cl.
| | |
|---|---|
| *G06T 19/20* | (2011.01) |
| *G06T 15/20* | (2011.01) |
| *G06F 3/01* | (2006.01) |
| *G06F 3/14* | (2006.01) |
| *G06T 7/70* | (2017.01) |

(52) U.S. Cl.
CPC .............. *G06T 19/20* (2013.01); *G06F 3/013* (2013.01); *G06F 3/1446* (2013.01); *G06F 3/1454* (2013.01); *G06T 7/70* (2017.01); *G06T 15/20* (2013.01); *G06T 2207/30244* (2013.01)

(58) Field of Classification Search
CPC ...... G06F 3/013; G06F 3/1446; G06F 3/1454; G06T 15/20; G06T 19/20; G06T 2207/30244; G06T 7/70
See application file for complete search history.

(56) References Cited

U.S. PATENT DOCUMENTS

| | | | |
|---|---|---|---|
| 9,700,801 B2 | 7/2017 | Yamaguchi | |
| 9,736,540 B2 | 8/2017 | Anderson et al. | |
| 9,741,167 B1 * | 8/2017 | Terahata | G06F 3/012 |
| 9,762,851 B1 | 9/2017 | Baumert et al. | |
| 9,779,702 B2 | 10/2017 | Matsuyama | |
| 9,928,627 B2 | 3/2018 | Fulks et al. | |
| 10,016,680 B2 | 7/2018 | Fujisawa et al. | |
| 10,022,633 B2 | 7/2018 | Yuan | |

(Continued)

*Primary Examiner* — Chun-Nan Lin
(74) *Attorney, Agent, or Firm* — Arent Fox LLP

(57) ABSTRACT

Aspects of the present disclosure describe various methods and a system for manipulating digital assets on a three-dimensional viewing platform. The method may include configuring at least one dome layer as part of a dome framework having a spherical virtual environment that surrounds a user, virtually displaying, within a gaze area for the user, at least one screen in the at least one dome layer, wherein one or more digital assets are provided to the user through the at least one screen, and enabling the user to interact with the one or more digital assets on the at least one screen. The system may include a memory configured to store instructions, and one or more processors configured to execute the instructions to perform the method.

26 Claims, 52 Drawing Sheets

(56) References Cited

U.S. PATENT DOCUMENTS

| | | | |
|---|---|---|---|
| 10,078,919 B2 | 9/2018 | Powderly et al. | |
| 10,146,333 B1 | 12/2018 | Smith et al. | |
| 10,210,666 B2 | 2/2019 | Stafford et al. | |
| 10,226,708 B2 | 3/2019 | Bruzzo et al. | |
| 10,229,134 B2 | 3/2019 | Chiu | |
| 10,229,541 B2 | 3/2019 | Perry | |
| 10,229,656 B2 | 3/2019 | Takahashi et al. | |
| 10,244,200 B2 | 3/2019 | Wozniak et al. | |
| 10,265,623 B2 | 4/2019 | Odagiri et al. | |
| 2013/0194278 A1* | 8/2013 | Zajac, III | A63F 13/10 345/473 |
| 2016/0253809 A1* | 9/2016 | Cole | G06T 17/20 345/672 |
| 2017/0061936 A1* | 3/2017 | Matsuyama | G06T 19/006 |
| 2018/0359489 A1 | 12/2018 | Lakshman et al. | |
| 2018/0361248 A1 | 12/2018 | Nomura et al. | |
| 2019/0188900 A1* | 6/2019 | Troy | G06F 30/15 |
| 2019/0390454 A1* | 12/2019 | Kalenak | E04B 7/102 |

\* cited by examiner

1700a

| SCREEN ID | CONTENT ID | PROJECT ID | ASPECT RATIO | CONTENTS STATUS | : |
|---|---|---|---|---|---|
| 1 | WIN_1035 | PRO_05 | 16*9 | PUBLIC | : |
| 2 | OS_2021 | PRO_02 | 4*3 | SHARED | : |
| 3 | WIN_0007 | CATFOOD | 16*9 | SOLO | : |
| 4 | MB_0789 | CAT FISH | 9*16 | PRIVET | : |
| : | : | : | : | : | : |

| CONTENT | TYPE | UV ID | Sequence Start Number | Sequence End Number | File NAME | ... |
|---|---|---|---|---|---|---|
| PAINT04 | W | UV_01001 | 000001 | 000002 | E_0245_30458 | ... |
| CAR RACE 500 | W | UV_02030 | 000001 | 000359 | F_6812_32895 | ... |
| SPORTS G77 | O | UV_01050 | 000001 | 007700 | C_0201_77251 | ... |
| LIVE ABC | A | UV_99900 | 000001 | 00000N | TEMP_0111_99581 | ... |
| ⋮ | ⋮ | ⋮ | ⋮ | ⋮ | ⋮ | |

2900b

| SCREEN ID | FORMAT | UV ID | UV COORD | Sequence ID | ASPECT RATIO | ... |
|---|---|---|---|---|---|---|
| 1 | PNG | UV_00001 | 1001_1001 | 000001 | 2048*2048 | ... |
| 2 | AVI | UV_02030 | 1001_1090 | 000060 | 1280*720 | ... |
| 3 | RAW | UV_01070 | 1001_3021 | 000201 | 1920*1080 | ... |
| 4 | MOV | UV_99900 | 1001_1058 | 000058 | 1920*1080 | ... |
| ⋮ | ⋮ | ⋮ | ⋮ | ⋮ | ⋮ | |

FIG. 29

METHODS AND SYSTEM FOR MANIPULATING DIGITAL ASSETS ON A THREE-DIMENSIONAL VIEWING PLATFORM

CROSS REFERENCE TO RELATED APPLICATION

The present application claims priority to and the benefit from U.S. Provisional Patent Application No. 62/703,991, entitled "METHOD AND SYSTEM FOR MANIPULATING DIGITAL ASSETS ON A THREE-DIMENSIONAL VIEWING PLATFORM," and filed on Jul. 27, 2018, the contents of which are incorporated herein by reference in their entirety.

BACKGROUND

Aspects of the present disclosure relate generally selection, manipulation and consumption of digital assets selected from multiple such assets, and in particular to various methods and a system for manipulating digital assets on a three-dimensional viewing platform.

As digital assets that are available for consumption (e.g. viewing) proliferates, the need for managing, selecting, and viewing these available assets increases. For example, a surgeon performing an operation on a patient may desire to access and view many different assets such as a video showing a standard methodology for performing the procedure, X-rays or MRIs of the patient that were previously recorded and stored, other medical histories of the patient, etc. In addition, the surgeon may wish to collaborate with another physician located at a remote location by enabling that remote physician to see a live video the operation being performed, as well as the other digital assets related to the surgery described above.

It is therefore desirable to enable a platform in which this scenario, in addition to other types of similar applications and scenarios, in which multiple digital assets are easily selected, manipulated, viewed, and synchronously shared with others.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Provided therefore is a system referred to generally as the Q system, which is configured to perform various operations or methods that enable users to access assets, sensor displays, applications, programs, software and any digital content in real-time anywhere. The Q system is an extended reality system that can blend the physical world with digital content including displays environmental input, spatial sound, and location. Through any detection, projection sensor display system, the Q system can create a conduit through which users can stream as many digital assets as context demands in real-time, thus allowing interaction, manipulation and collaboration with as many other users as the network of the Q system allows, wherever they may be. Handheld, laptop, tabletop, head-mounted or for any other type of projection/detection hardware, the Q system allows multiple programs, applications and content software to be displayed simultaneously over as many devices as can access the network of the Q system. The Q system can provide access to multiple interactive real-time display projections using a block chain security system.

The Q system architecture can be configured into four components: A Q dome framework (or more simply a "dome framework"), a Q focus gaze cell (or more simply a "focus gaze cell"), a Q smart stream (or more simply a "smart stream"), and a Q behavior synchronization or Q behavior sync (or more simply a "behavior sync").

In an aspect of this disclosure, a method for manipulating digital assets on a three-dimensional viewing platform is described that includes configuring at least one dome layer as part of a dome framework having a spherical virtual environment that surrounds a user, virtually displaying, within a gaze area for the user, at least one screen in the at least one dome layer, wherein one or more digital assets are provided to the user through the at least one screen, and enabling the user to interact with the one or more digital assets on the at least one screen.

In another aspect of this disclosure, a system for manipulating digital assets on a three-dimensional viewing platform is described that includes a memory configured to store instructions, and one or more processors configured to execute the instructions to configure at least one dome layer as part of a dome framework having a spherical virtual environment that surrounds a user, virtually display, within a gaze area for the user, at least one screen in the at least one dome layer, wherein one or more digital assets are provided to the user through the at least one screen, and enable the user to interact with the one or more digital assets on the at least one screen.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 19C is a diagram of a behavior sync that illustrates an example of a screen content management table in accordance with aspects of the present disclosure.

FIG. 29 shows diagrams that illustrate for a smart stream examples of a UV map identifier (ID) system in accordance with aspects of the present disclosure.

DETAILED DESCRIPTION

Figure 1A:
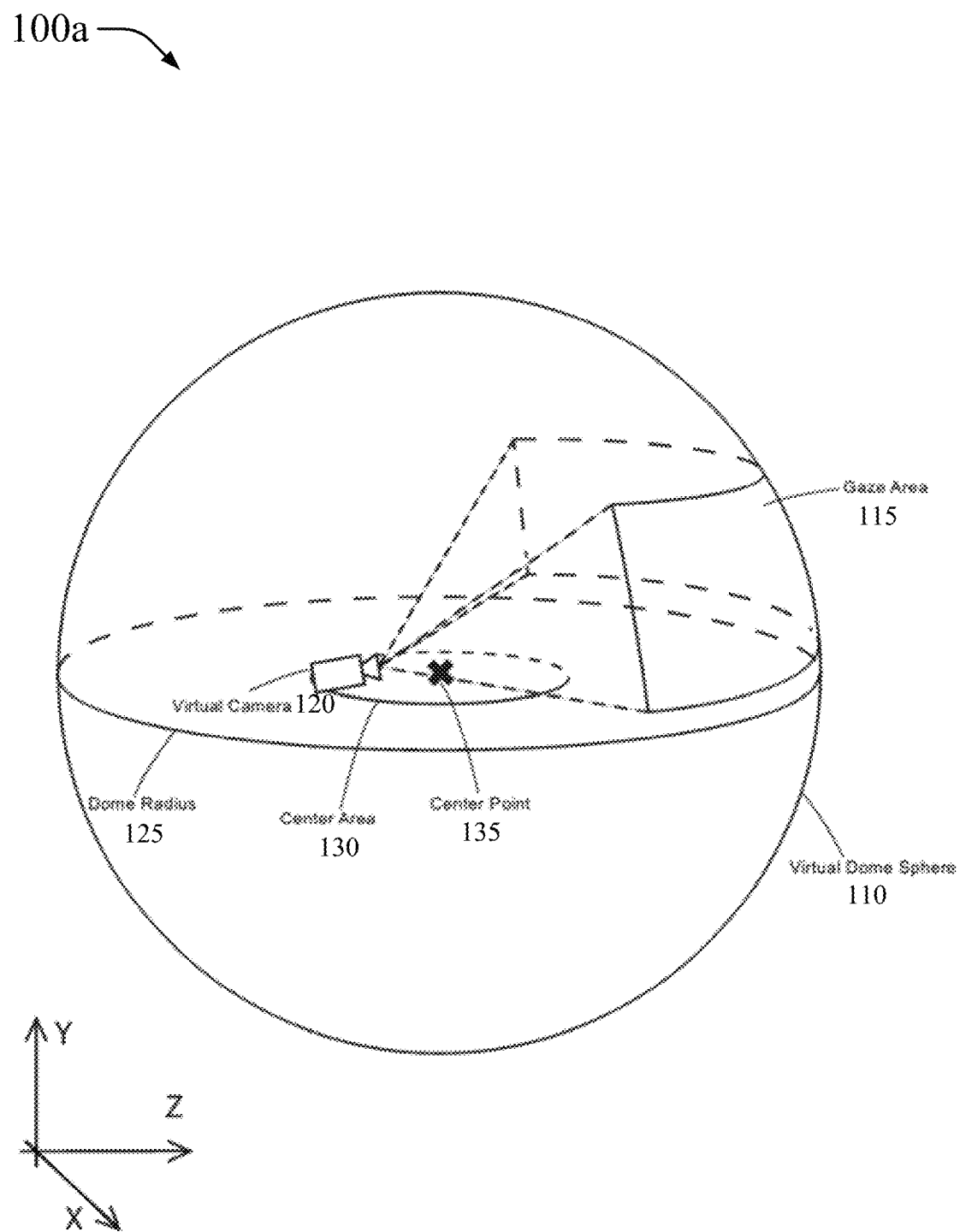
FIGS. 1A and 1B are diagrams of a dome framework that illustrate a view of an XYZ-space with an example of a virtual space and structure in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The present disclosure describes a system, generally referred to as the Q system, that is configured to enable a primary user to select desired digital assets for viewing in one of many available three-dimensional virtual spaces and, in addition, enable the primary user to synchronize his selection with a secondary user located remotely from the primary user. The Q system is configured to present multiple, fully-functional displays projected through a single stream, Each of the digital assets functions independently and can be accessed by all users of the Q system.

With the expansion of remote and global work environments, the accelerated pace of business operations and the rapidly increasing amounts of data, communication and collaboration have become exponentially complex. The Q system is an enterprise collaboration system that is configured to facilitate efficient sharing of content, reference and documents, the trading of knowledge, storing and exchanging files, creating and jointly modifying projects, and interacting remotely, in real-time in a collaborative workspace. Because the Q system makes existing applications available, the selected tools are familiar, easy to use and accessible so users can engage with the Q system and use it on a regular basis without having to learn new software or deployment strategies. The Q system allows users to access and work on any application during a collaborative session, in real-time from anywhere.

In one example scenario, a producer working with an editor on a car commercial has access to all reference and information necessary to satisfy the requirements of the project while monitoring and directing the editing process remotely. In this example, it is possible to separately display virtual spaces, each of which presents or provides a different digital asset such as an internet search engine, a brand style-guide PDF document, a font/color library in Acrobat Preview, story boards of the car commercial, an after effects editing tool, e-mail, and a 3D computer graphics models of cars for the commercial. The Q system is therefore configured to simplify the communication and collaboration process for teams that require many different types of content as part of their work. As used herein, the terms "digital assets" and "assets" may be used interchangeably to refer to content, whether it is video, image, text, graphics, or other type of content, that can be accesses digitally, including streaming access.

As mentioned above, the Q system architecture can be configured into four components or aspects: A Q dome framework ("dome framework"), a Q focus gaze cell ("focus gaze cell"), a Q smart stream ("smart stream"), and a Q behavior sync ("behavior sync"). Additional details of those components or aspects are provided below.

Dome Framework

The dome framework is the screen (e.g., display/sensor) framing method for the Q system. Based on the user's pivot point (e.g., camera) it will use a set of pre-defined radii to create a spherical frame (or at least part of a spherical frame). Within the spherical frame, based on the central pivot point, the dome framework can generate a radial space out from which the camera can focus. The default camera direction and gaze area will be set up (e.g., Z space) and initiate a vertex point on the sphere frame. The vertex point will be the screen(s) center point and pivot point. The screens can be manipulated by each vertex point. Each screen can have customizable features, function independently from the others, and be capable of projecting any content or application. Each screen can be generated in a pre-defined aspect ratio and can be used as a content browsing frame. Additional screens can be added to the dome framework by different methods. One method may be adding one or more screen(s) in a sphere frame and another may be by generating one or more additional sphere frames as independent layers. After a first sphere is created additional layers of sphere frame can be added to the main sphere to generate and display/hold the additional screens. Layered spheres can also contain multiple screens.

For content, two types of dome frameworks may be utilized: a fixed dome framework and a floating dome framework. The fixed dome framework is based on a constant fixed rotational angle and direction. Thus, when a user moves his head left and right, the framework would not track the user's eyesight or head orientation. In the floating dome framework, based on the rotational angle and direction the dome will track the user's focus. Thus, when the user turns his head, the framework will follow the user's sight path.

Each screen in the dome framework is user oriented. That is, the function on each screen will have user-centric interface rules. For example, the scale of the screen will be relative to the distance and size of the screen and each screen will face the central camera position.

Multiple screens in the dome framework can form into one, single bigger screen for higher resolution and larger screen space. Conversely, a large screen can be split into smaller screens to focus on content details.

Focus Gaze Cell

The focus gaze cell acts as a workspace concentrating on a hierarchy of screens to render at a higher resolution. By using the focus gaze cell, users can observe finer detail, more accurate color, anti-aliasing and real-time ray tracing, focus/defocus options. Users can also divide a single screen content into multiple screens by modifying the cell area. The screen selected by the user for main viewing purpose may be given the focus in any manner desired by the user. For example, the selected screen may be pushed to one side, always available but not immediately in the focus.

Multiple screens may be given priority to render the contents and will be generated based on the focus gaze cell area, prior and sequential build side by side and up and down with the display protocol.

Smart Stream

The smart stream uses the UV mapping method to assign massive image sequence data into a UV tile system for a simpler texture mapping and pattern it. Using ID sequences in a UV mapping system for the Q system (QDIM) allows multiple image sequences to display simultaneously in the dome framework. UV mapping may refer to a technique used to "wrap" a 2D image texture onto a 3D mesh. "U" and "V" are the names of the axes of a plane, since "X", "Y" and "Z" are used for the coordinates in the 3D space.

Behavior Sync

The behavior sync features of the Q system are used to synchronize the activities and interactions of multiple users. It may use, for example, the SVG (Scalable Vector Graphics) format to generate data and track the users' points of interest by building a pattern within the SVG format. This data will be sending and receiving engine protocol from the Q sync node and building and synching behaviors using a GPU processor and dome framework screen displays. For example, if a first user (user 1) is working with a second user (user 2), the screen layer will be sending the users indicator movement data to each other's screen layers to enable the interaction between the two users. This process will be using the GPU to speed up the read and write data process and generate a SVG for future work logic prediction of a same or similar project workflow. By using a behavior sync engine, real-time interaction and collaboration with other users in different space or locations will be possible.

The Q system described herein and including the dome framework, the focus gaze cell, the smart stream, and the behavior sync functionalities is generally configured to operate as a master controller system for providing multi-channel digital asset streaming to one or more users of the content. It enables users to access assets, sensor displays, applications, programs, software and any content in real-time anywhere. As such, Q system can operate as an extended reality system that can blend the physical world (e.g., the user's actual work environment) with digital content including displays environmental input, spatial sound, and location (e.g., superimposed on the user's actual work environment). As mentioned above, the Q system thus creates a conduit through which users can stream as many assets as context demands in real-time allowing interaction, manipulation and collaboration with other users regardless of their physical location.

Various types of devices may be used by a user to receive and view the content supplied, including handheld mobile devices, laptops, desktop computers, and head-mounted devices (HMDs), where multiple of these devices can be used concurrently. The Q system allows for multiple programs, applications, and content software to be displayed simultaneously over as many devices as are networked.

The dome framework may be utilized by a user of the Q system in order to select desired content from the multi-channels provided and view that content. In one implementation, the dome framework may be implemented within a dome device such as a pair of virtual reality glasses that is worn by a user, in which multiple layers of video streams are presented to the user in a spherical model with multiple layers, and where the user can select the desired stream for more focused viewing.

The dome device used to implement the dome framework can receive from a server computer a data channel that is comprised of, for example, multiple video streams as digital assets, whereby the user that is using the dome framework is presented with all of the video streams all around the user's peripheral vision.

Within the dome device, the various virtual screens may be virtually manipulated by the user as desired. For example, any of the virtual screens may be (relative to the user's field of view) pushed back, pulled forward, faded in, faded out, pushed to the side, pulled from the side, rotated horizontally, rotated vertically, changed in position relative to other virtual screens. That is, to the user the virtual screens can be moved about and around the Z-space (with X-space being horizontal and Y-space being vertical).

The digital assets (e.g., video streams) that are received may be context-relevant, and may be multiplexed into a single data stream that is delivered from one or more server computers (e.g., in the cloud) to the dome device. Data streams may be extracted from the input stream and are displayed on the various spaces (e.g., screens) defined in the dome device viewing space, which is a three-dimensional space. The user then has control over which display or screen gets the focus, or priority, for bringing into his main viewing region. This is accomplished with a view control mechanism that will vary based on the available parameters of the specific device using the dome framework and being implemented by the user. Examples of view control mechanisms are keyboards, wired or wireless controllers, motion sensors, voice activation, etc. Hand gestures may also be used with appropriate sensors in order to give the user greater control and granularity of his viewing selections.

The virtual screen selected by the user for main viewing may be given the focus in essentially any manner desired by the user. For example, a selected video stream may be made larger and/or placed closer in the Z-space to the user's eyes, to make it easier for the user to watch that stream. Alternatively, the selected screen may be pushed to one side, always available but not immediately in the focus, if desired by the user for a given application. In one implementation, multiple screens may be given priority (e.g. four screens moved to the center of the dome device for easy viewing, etc.).

Via collaboration, multiple users may view the same assets at the same time in different physical locations through a synchronization feature. In that case, each user may view the assets that are contextually relevant to them. For example, in the example scenario described above in which surgeon performs an operation on a patient, the surgeon my use a pair of goggles as the viewing or dome device, which allows the user to see the patient but also access and see a video from another doctor within his frame of vision. Through the synchronization aspect, the surgeon can upload a video stream of the operation as it is being performed, and the other doctor may use a similar device to receive the video stream and view the operation being performed and give real-time feedback to the surgeon.

In another scenario, when a product is being distributed through a distribution chain, documentation relevant to various points along the distribution chain may be accessed and viewed using a system like the Q system. This could include video feeds from the product warehouse showing it being loaded onto a truck for shipment, a dashboard camera to provide a video of the route being taken by the distribution truck, various documents regarding the design and/or manufacture of the product, etc.

The present disclosure may also be useful in the broadcasting industry or similar industries in which close coordination among multiple people handling a wide range of information is necessary. For example, in a daily routine in news broadcasting, a show director could use the Q system to make the operational process work without, or at least much reduced, system and human error. In a normal operational flow chart, the show director may need to have 10-20 pre-edited segments in individual monitor screens standing by, 20-30 graphical elements in the list to be directed, and 5-10 reporters to be on location ready to go on air. In a multi-million dollar TV station control room, having 10-30 operational personnel standing by to play just one or two of these screens each, with a single show director overseeing all of these processes tends to result in many kinds of human mistakes from miscommunication. The Q system can be used to improve this situation by, for example, preloading all the screens with real-time playable screens and use a motion and voice artificial intelligence (AI) input system to give operational order using the behavior sync functionality of the Q system. This not only troubleshoots for human error but also saves assets and building costs for the multi-million dollar control room. The Q system also can benefit remote control of broadcasting trucks in sporting events and many other live or pre-taped events like fashion shows and online school courses and etc.

The Q system may also be used for data and information that flows through a command center or control rooms to be accessed remotely and by as many users as a project or situation demands. Command centers and control rooms are used to monitor and control a wide array of information (e.g., multiple data assets). Utility management and process control centers need to keep operations running continuously. Public works entities that provide services such as power, waste water management, public transportation and electricity power/generation depend on the flow of information and operators need to quickly diagnose and react to issues. Having a system such as the Q system allows for a wide range of information to be easily handled and for collaboration between multiple people in different locations.

The Q system can be suitable for operations centers because they are unique and demanding environments and their control rooms are often the nerve center of an organization and criticaldecisions are made based on a continuous flow of data from a myriad of sources. Operations center consoles utilize equipment that is as resilient and reliable to maintain optimal performance 24 hours a day. Diffenth operations centers may include: Network Operations Centers (NOC), Security Operations Centers (SOC), Cyber Security Operations Centers (CSOC). Emergency Operations Centers (EOC), Fusion Centers, Joint Operations Centers (JOC), Tactical Operations Centers (TOC), Combined Operations Centers (COS), C4ISR Environments, and Social Media Command Centers, to name a few.

Audio/visual systems are the focal point of a control room and video wall technology used in these environments allows engineers to make informed decisions. In some cases, a wide variety of sources must be available to be viewed on the video wall; intuitive control systems offer easy to operate interface to rapidly view the sources they need to monitor. The Q system described herein brings the power of a command and control center, or other forms of operations centers, to individual and networked users.

The functionality of the Q system involves having a spherical layout of the dome framework with one or more virtual layers, wherein once the user initiates the dome framework, the base, main, or primary virtual layer will be generated based on the users' location (user-centric) in a three-dimensional space (X,Y,Z) in a spherical virtual environment. As used herein, the terms "layer," "mesh," "sphere," or "ring" may be used interchangeably to refer to a layered scheme for viewing, prioritizing, and/or sharing (e.g., collaboration) digital assets on a curved environment.

Additional details to the general concepts described above in connection with the various components or aspects of the Q system are provided below in connections with FIGS. 1A-31.

Figure 1B:
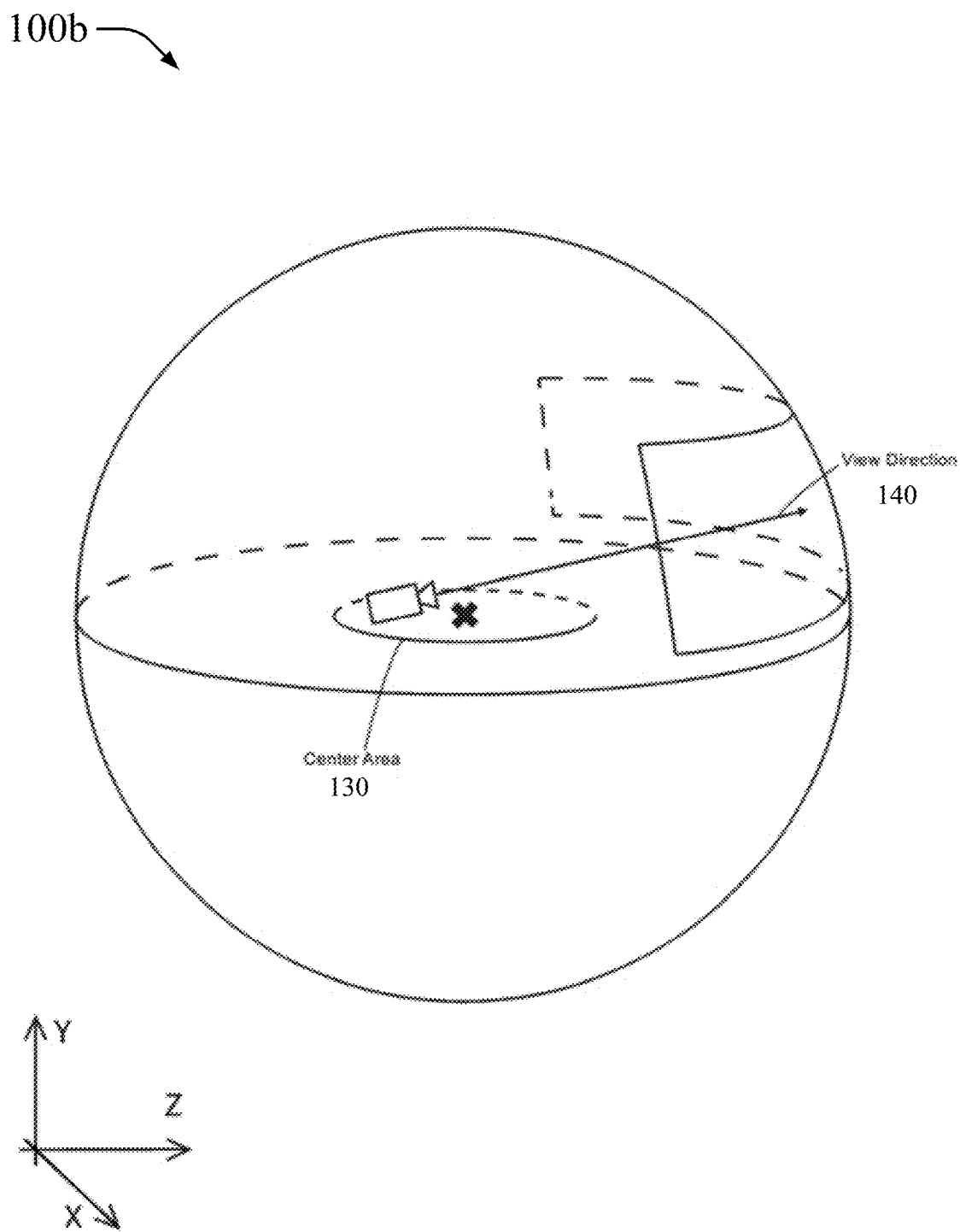

FIGS. 1A and 1B respectively show diagrams 100a and 100b of a dome framework that illustrate a view of an XYZ-space with an example of a virtual space and structure in accordance with aspects of the present disclosure. The diagram 100a shows a virtual dome sphere 110, a center point 135 associated with a user, a center area 130 about the center point 135, a virtual camera 120 that is directed into a gaze area 115 on the virtual dome sphere 110, and a dome radius 125. The dome framework show in the diagram 100a may be implemented using a dome device (e.g., a HMD, one or more 3D cameras, one or more 3D displays, or projection device). Although the virtual dome sphere 110 is shown to be spherical, there may be implementations in which it need not be perfectly circular but able to provide a curved environment. The diagram 100b in FIG. 1B shows a view direction 140 from the user to the gaze area 115 on the virtual done sphere 110. In some instances, the dome radius 125 may be adjusted and the virtual dome sphere 110 may be resized.

In an aspect, the virtual camera 120 can be considered to be a user's eye sight. For example, as a reference, when playing a first person game (e.g., a shooting game), what the user sees is what the character is looking at, it's the virtual eye of the user to view things. If a HMD is used, the HMD is capable of providing augmented reality and therefore display 3D images including 3D images of screens. The screen contents may be mapped using a UV mapping technique.

Figure 2A:
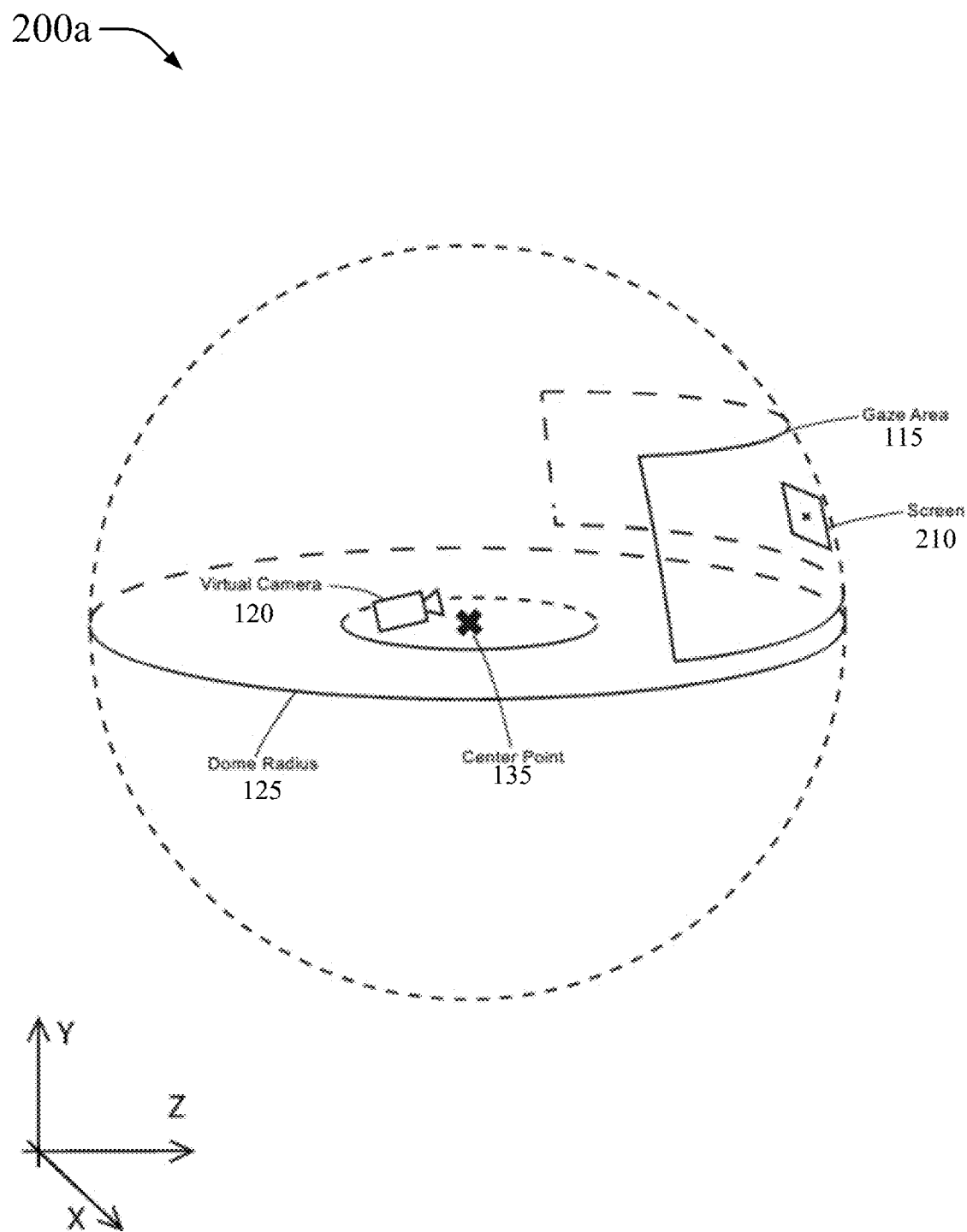
FIGS. 2A and 2B are diagrams of a dome framework that illustrate a view of a dome sphere space structure with an example of the dome sphere radius and initial screen position in accordance with aspects of the present disclosure.
Figure 2B:
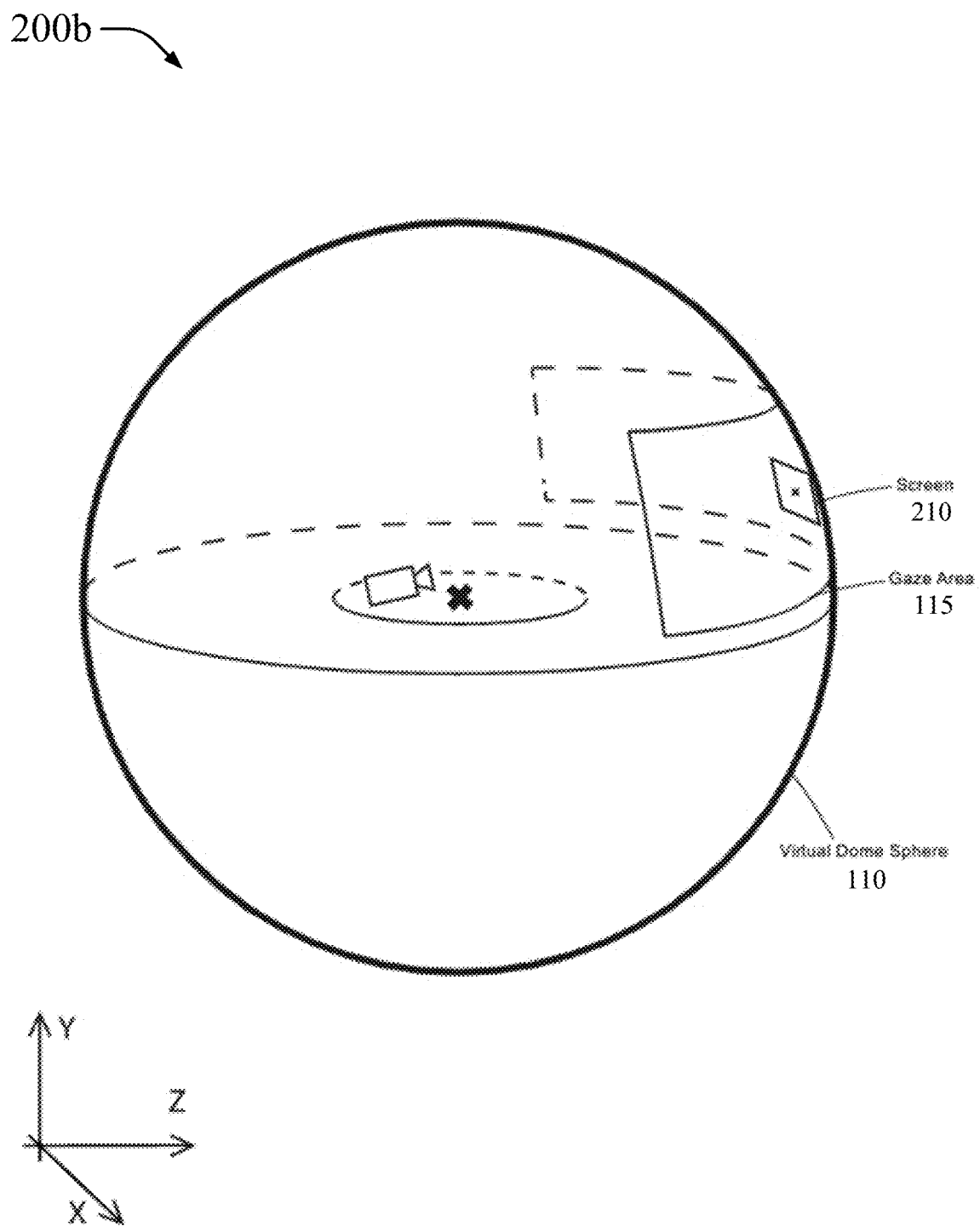

FIGS. 2A and 2B respectively show diagrams 200a and 200b of a dome framework that illustrate a view of a dome sphere space structure with an example of the dome sphere radius and initial screen position in accordance with aspects of the present disclosure. The diagram 200a shows a screen 210 being projected, displayed, or imaged onto the gaze area 115. The screen 210 may be projected by a dome device that implements the dome framework. The screen 210 being projected or imaged may be an initial or default screen 210 and may be on an initial virtual dome sphere 110 as illustrated in the diagram 200b in FIG. 2B where the virtual dome sphere 110 is shown in solid lines to indicate a base, main, or primary sphere in the dome framework. Additional screens 210 may be added after the initial or default screen 210. A size of the screen 210 (e.g., an aspect ratio) may be determined before projecting or imaging the screen 210.

It is to be understood that the while the diagrams 200a and 200b show the virtual camera 120 in the center area 130, there may be instances in which the virtual camera 120 may be implemented outside of the virtual dome sphere 110 and still be configured to project the screen 120 as described.

Figure 3A:
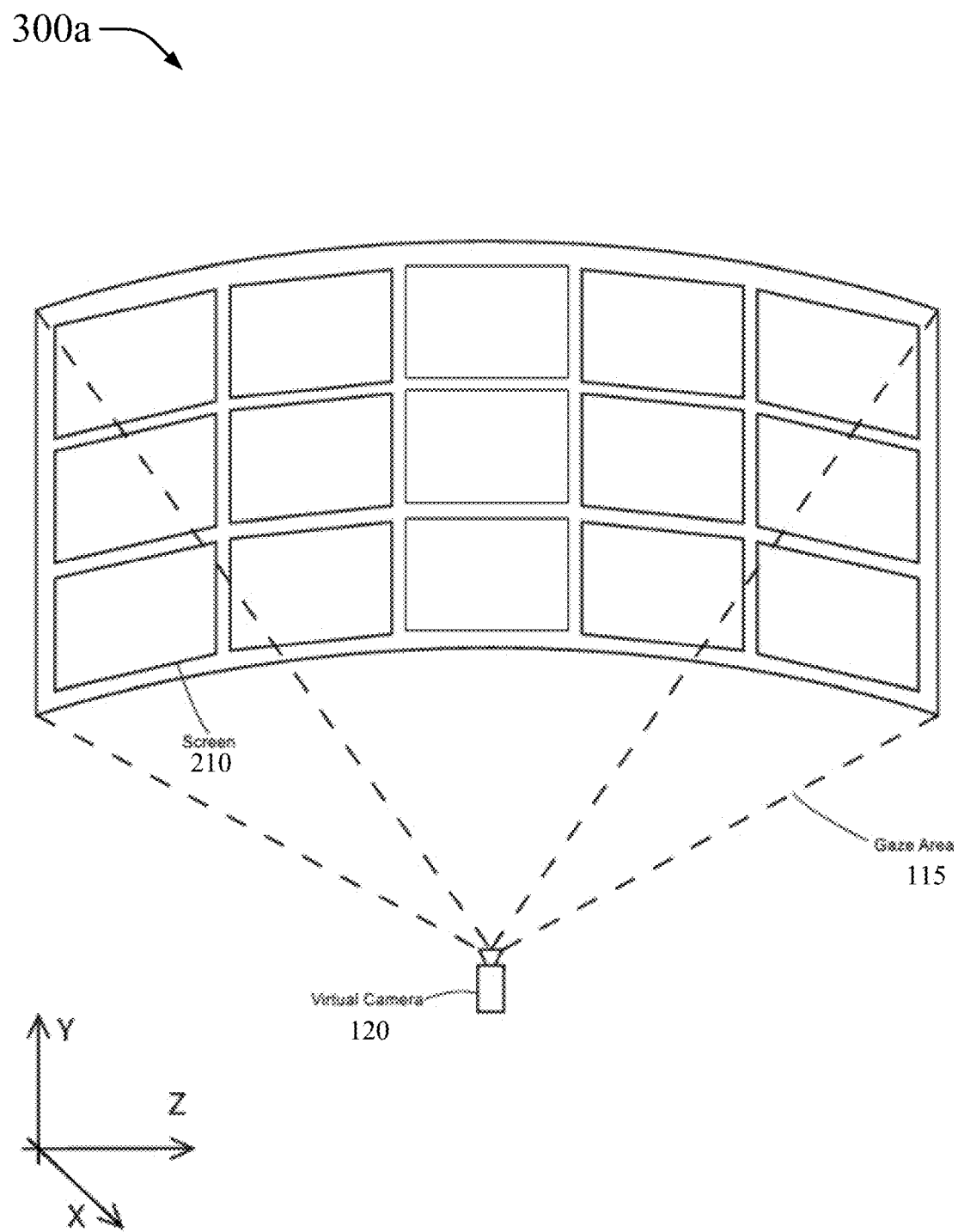
FIGS. 3A and 3B are diagrams of a dome framework that illustrate a field of view of a user immersed in the augmented/virtual reality screen as displayed to the user within a gazing area in accordance with aspects of the present disclosure.
Figure 3B:
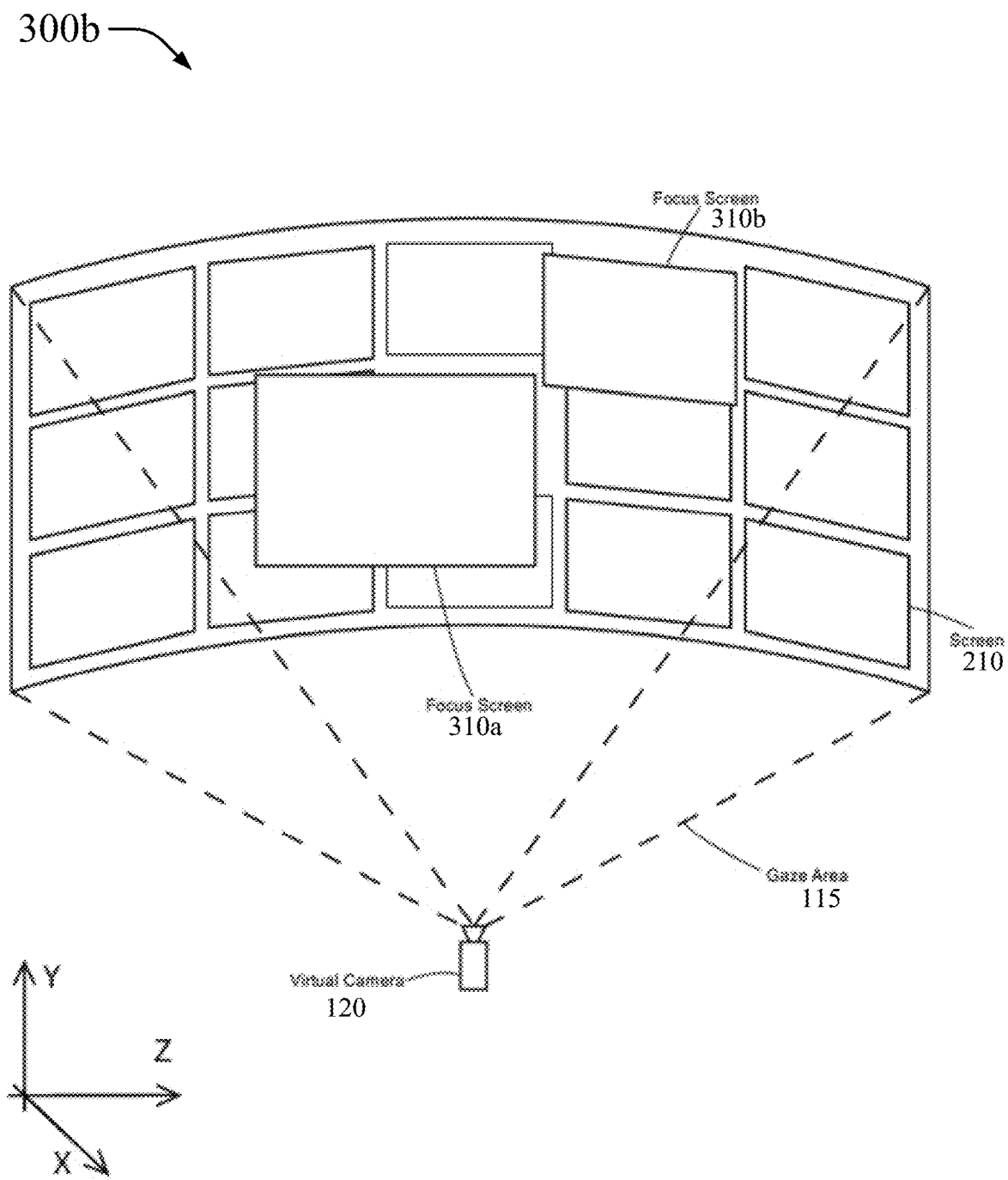

FIGS. 3A and 3B respectively show diagrams 300a and 300b of a dome framework that illustrate a field of view of a user immersed in the augmented/virtual reality screen as displayed to the user within a gazing area in accordance with aspects of the present disclosure. The diagram 300a shows the gazing area 115 having multiple screens 210 projected within the gaze area 115 and arranged in some way. The screens 210 may be arranged horizontally, vertically, in a matrix, or in some other fashion within the grazing area 115. Moreover, although the screens 210 have been shown to be of approximately the same size, there may be instances in which the screens 210 are of two or more sizes as described in further detail below.

The diagram 300b shows that the user can select (e.g., via some control mechanisms such as keyboards, wired or wireless controllers, motion sensors, voice activation, gestures, etc.) one or more screens 210 for focusing because the digital assets being provided by those screens are of more relevance to the user at the particular time of the selection. In this example, focus screens 310a and 310b are selected and may be brought closer to the user for convenience. In this regard, bringing a focus screen 310 closer to the user may mean that the screen is projected in such a way that appears closer to the user than the other screens. The focus screens can be moved around or placed somewhere where it is of easier use to the user.

Figure 4:
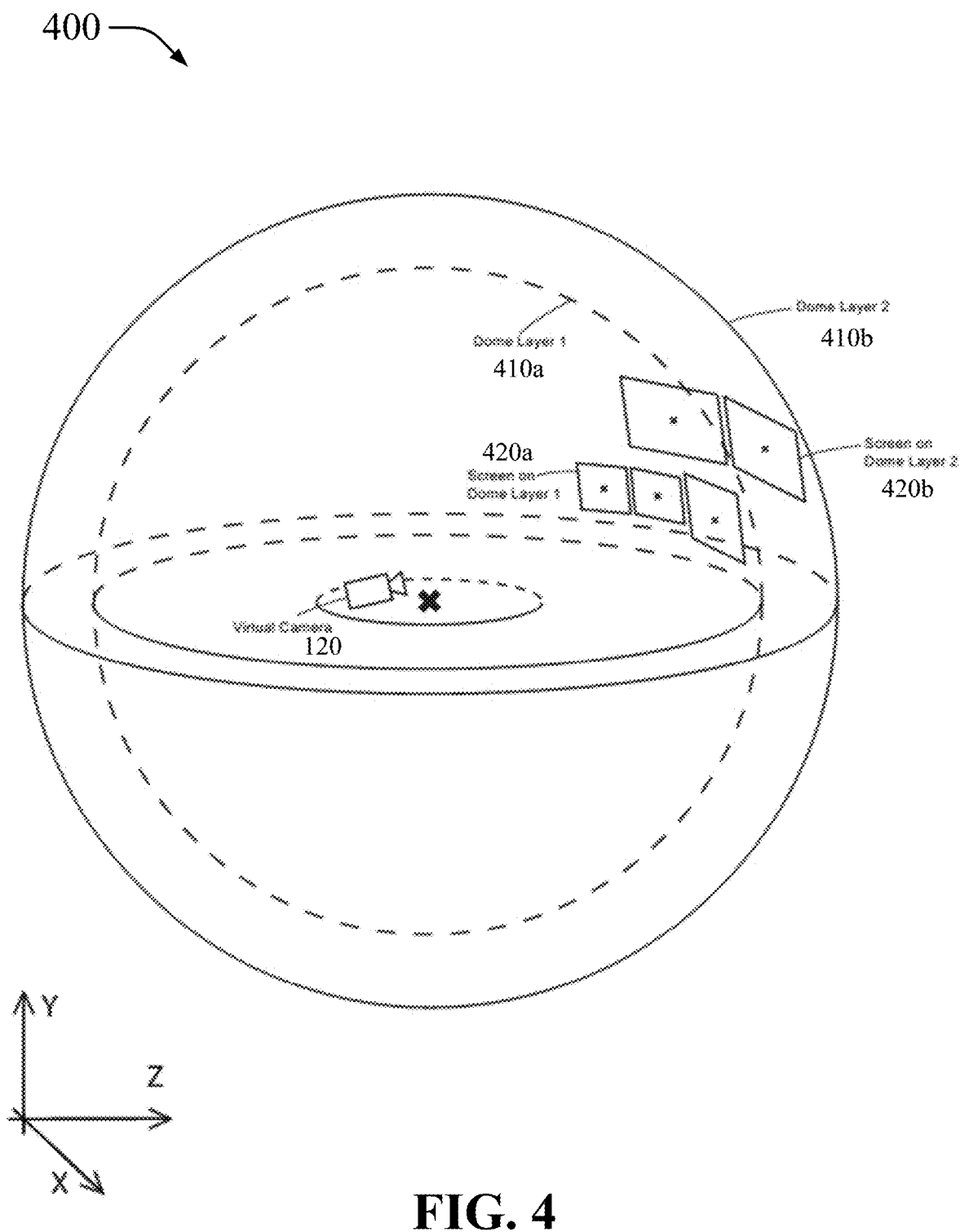
FIG. 4 is a diagram of a dome framework that illustrates an example of screens positioned in different sphere layer structures in accordance with aspects of the present disclosure.

FIG. 4 shows a diagram 400 of a dome framework that illustrates an example of screens positioned in different sphere layer structures (or simply layers) in accordance with aspects of the present disclosure. In this example, the dome framework that is implemented includes two layers (or meshes/rings), a dome layer 1 410a and a dome layer 2 410b. Each of these layers can have one or more screens projected onto it by the virtual camera 120. In this example, multiple screens 420a are projected onto the dome layer 1 420a, which is closer to the user, and multiple screens 420 are projected onto the dome layer 2 410b, which is farther away from the user. The number of layers and the number of screens in each layer can vary and may depend on the number of digital assets, the importance or relevance of those digital assets, the type of collaboration with other users, and/or on other criteria.

Figure 5A:
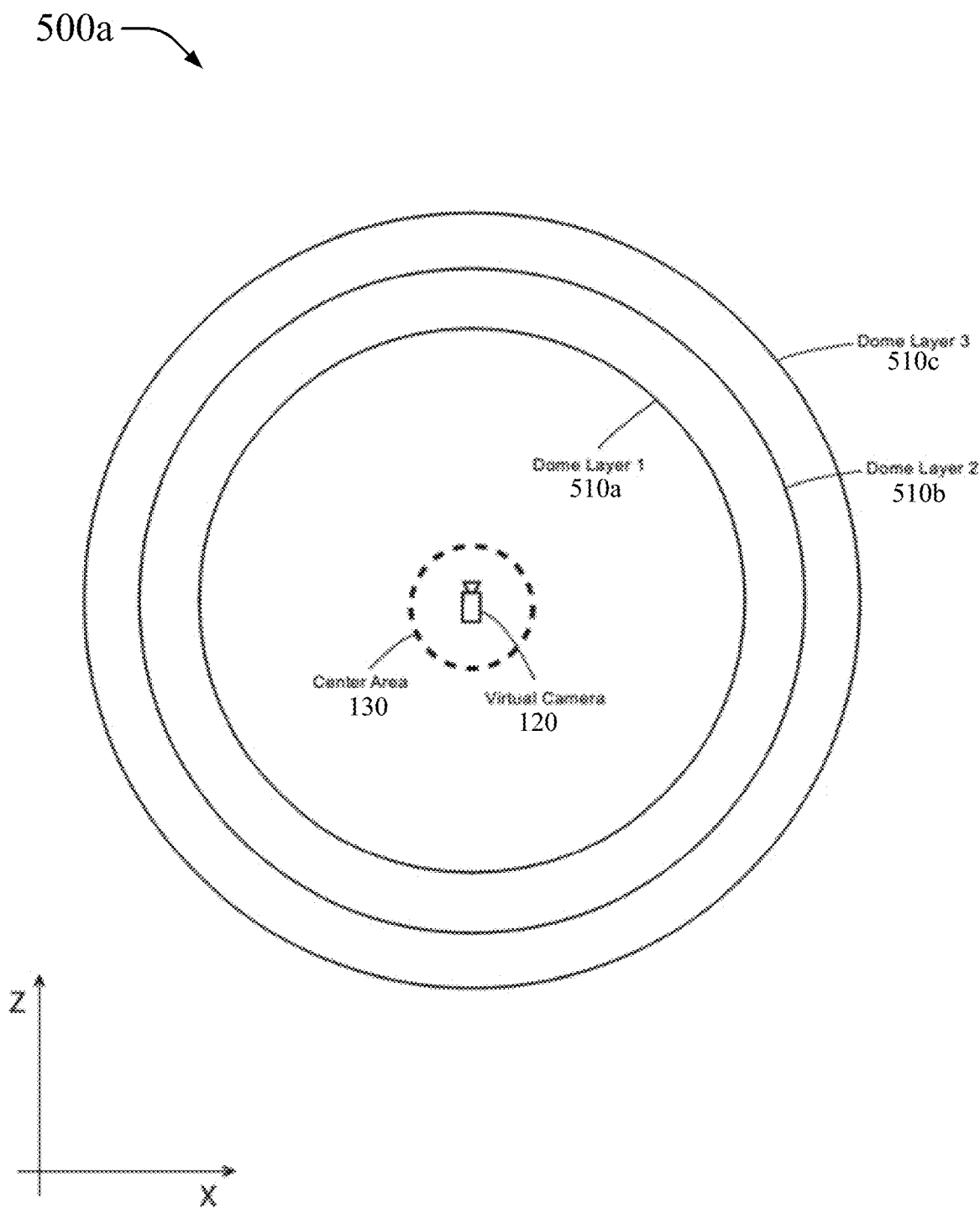
FIGS. 5A and 5B are diagrams of a dome framework that illustrate a top view in which a number of screens are positioned in different layers in accordance with aspects of the present disclosure.
Figure 5B:
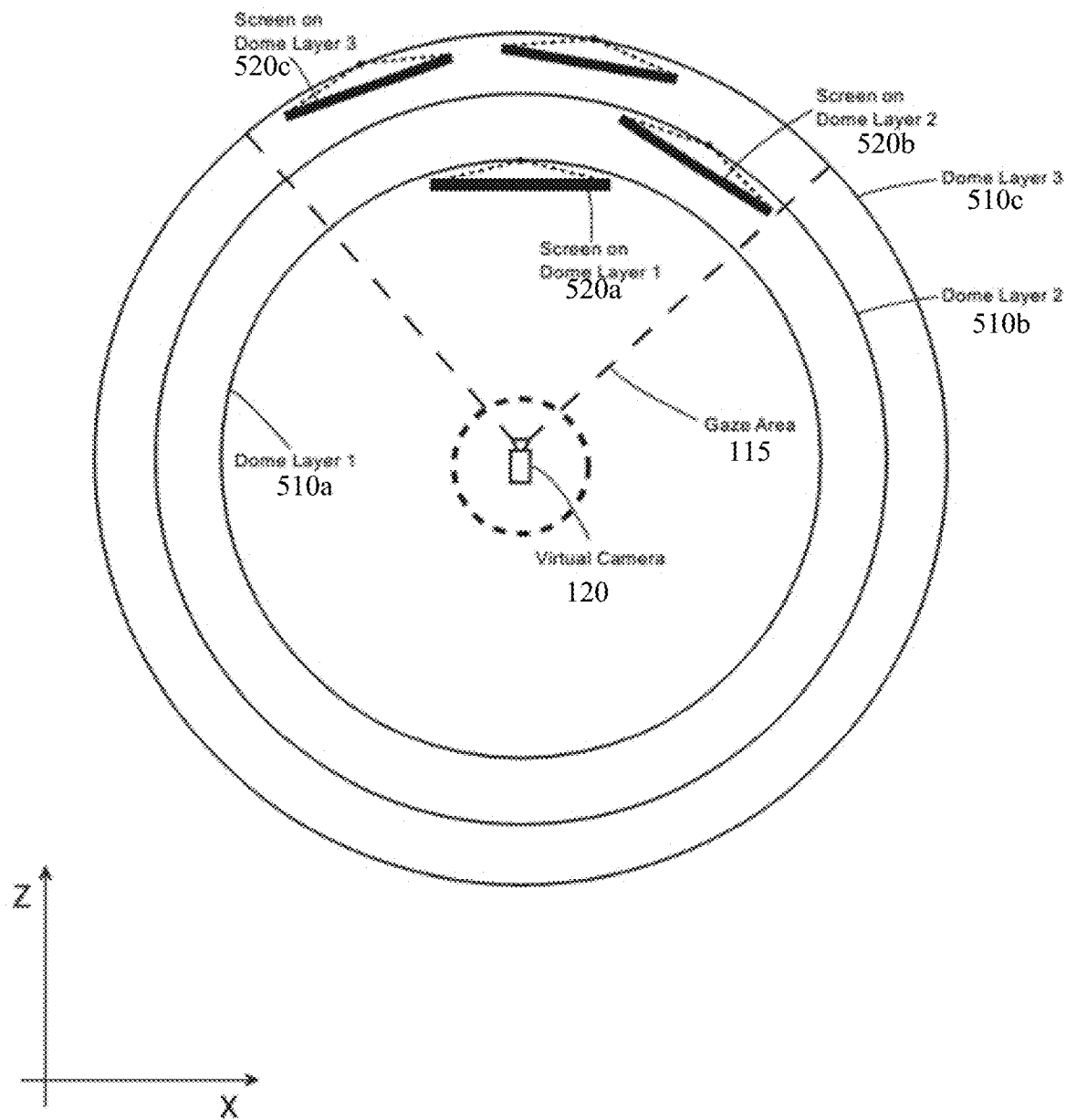

FIGS. 5A and 5B respectively show diagrams 500a and 500b of a dome framework that illustrate a top view in which a number of screens are positioned in different layers in accordance with aspects of the present disclosure. The diagram 500a shows concentric dome layers 510a (dome layer 1), 510b (dome layer 2), and 510c (dome layer 3) on a ZX plane. The different layers in this arrangement are used to surround the user within a sphere space (e.g., a user oriented interface). Although the spacing between dome layers is shown as being similar between any two adjacent dome layers, it may not be the case and the spacing between adjacent dome layers may vary within the dome framework implementation.

The diagram 500b further shows in the ZX plane the gaze area 115 within which screens can be projected onto each of the dome layers. In this example, a single screen 520a is projected or imaged onto the dome layer 1 510a, a single screen 520 is projected onto the dome layer 2 510b, and two screens 520c are projected onto the dome layer 3 510c.

In an aspect of the diagrams 500a and 500b, the order of the layers may be dynamically varied and the screens adjusted accordingly. For example, a layer may be moved forward closer to the user or a layer may be moved backward away from the user. The screens associated with the layers may move with the layers when the layers are moved forward or backward.

Figure 6A:
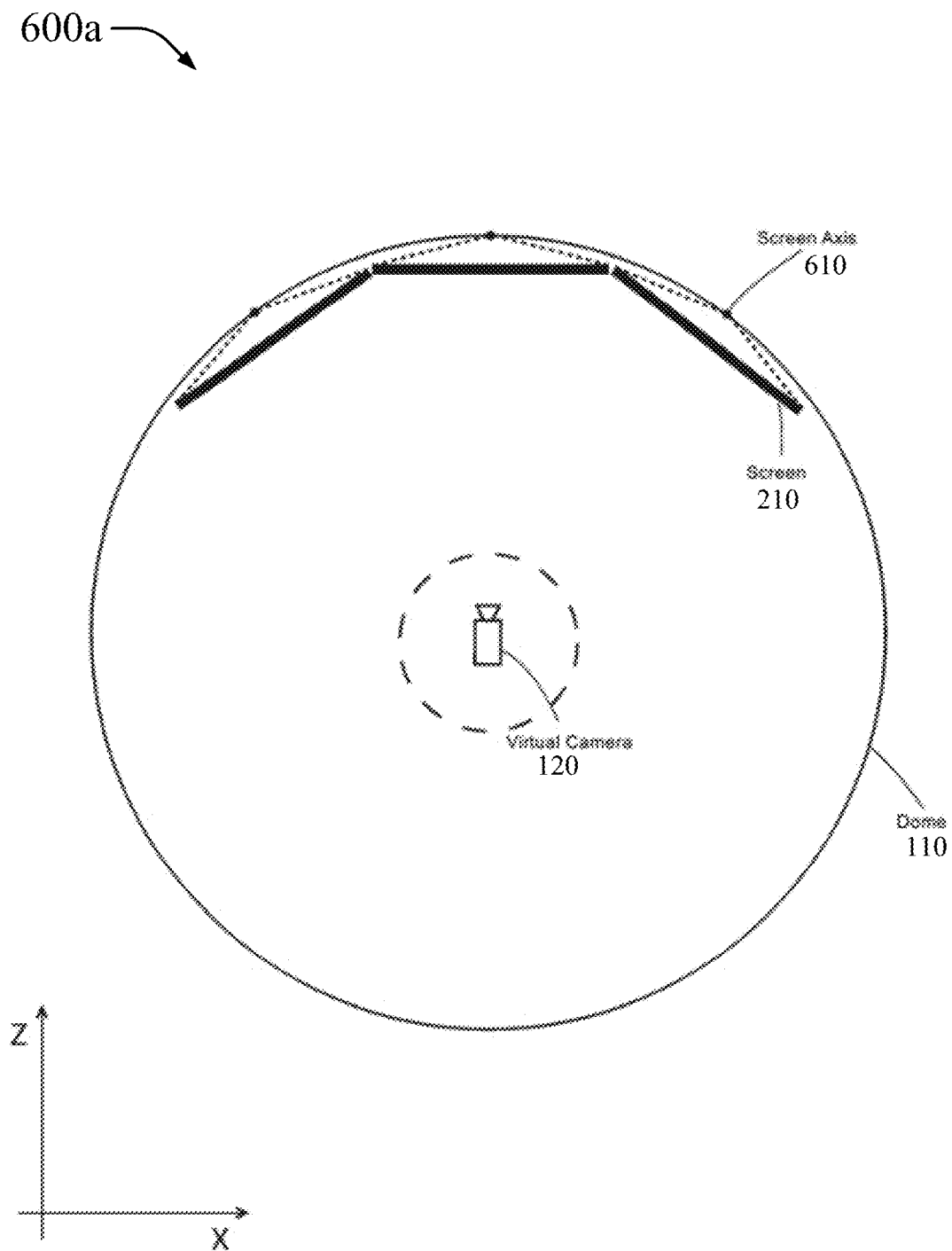
FIG. 6A is a diagram of a dome framework that illustrates a top view in which a number of screens face different directions and are aimed toward the center camera in accordance with aspects of the present disclosure.

FIG. 6A shows a diagram 600a of a dome framework that illustrates a top view (on a ZX plane) in which a number of screens face different directions and are aimed toward the center or virtual camera in accordance with aspects of the present disclosure. In this example, the dome 110 does not have multiple layers and multiple screens 210 are projected onto the dome 110 (e.g., a single main or primary layer). Each of the screens 210 (e.g., virtual screens) can effectively have a screen axis 610, which corresponds to a point that the respective screen can pivot from to change the direction facing the user. In this example, there are three (3) screens 210, a center screen faces the user directly, while the two screens to the sides of the center screen face the user at an angle.

Figure 6B:
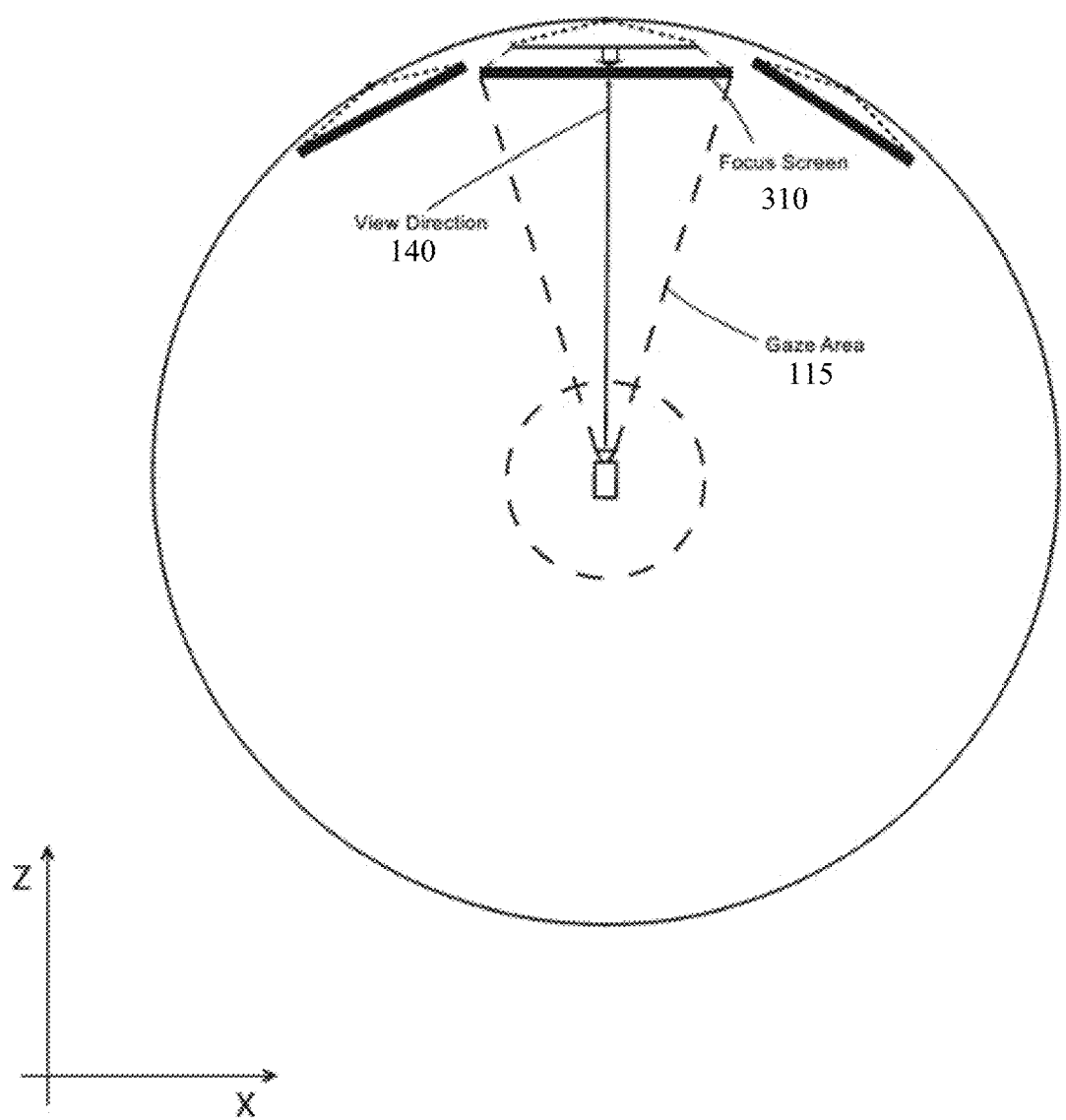
FIG. 6B is a diagram of a dome framework that illustrates a top view in which a focus screen is brought toward a user in the spatial manner in accordance with aspects of the present disclosure.

FIG. 6B shows a diagram 600b of a dome framework that illustrates a top view (on a ZX plane) in which a focus screen is brought toward a user in the spatial manner in accordance with aspects of the present disclosure. In this example, there are three (3) screens like in the example in the diagram 600a in FIG. 6A. The center screen is selected as a focus screen 310 (see e.g., in FIG. 3B) and is moved forward towards the user along the view direction 140 (e.g., is projected such that it appears closer to the user than other screens). As the focus screen 310 is moved forward, it can be enlarged or otherwise right-sized for better consumption (e.g., view) by the user.

Figure 7A:
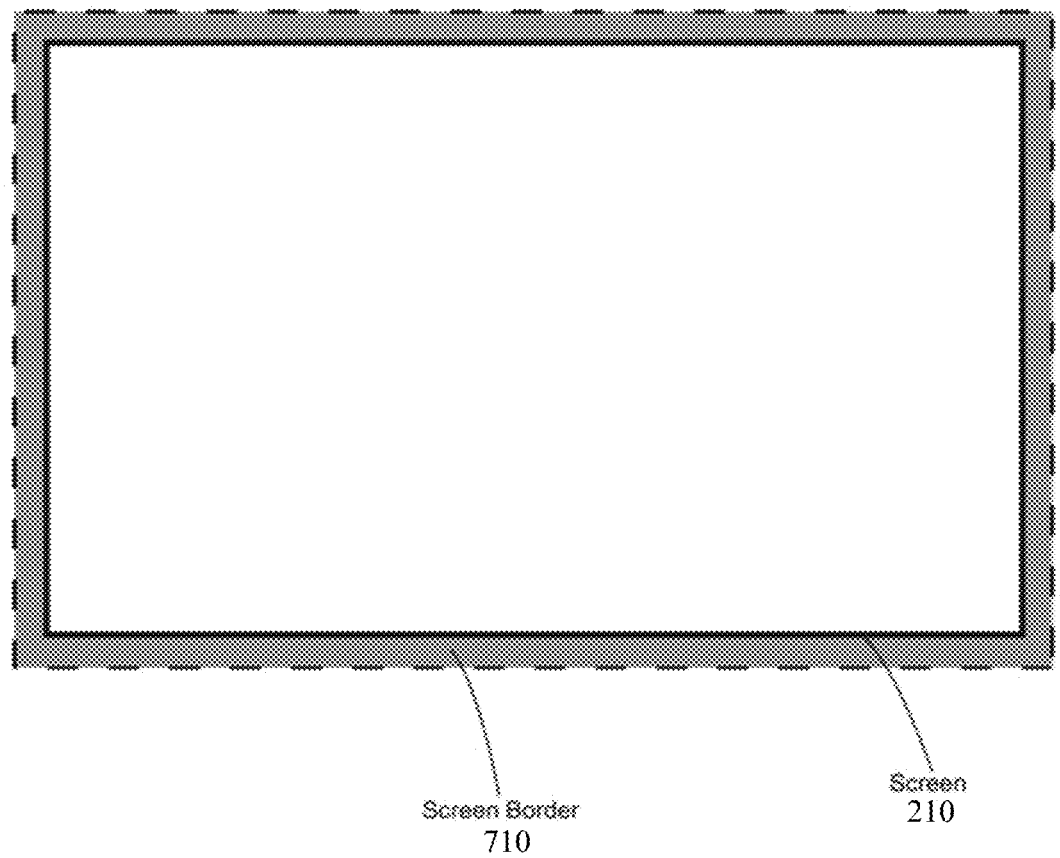
FIG. 7A is a diagram of a dome framework that illustrates a view of a screen window boundary area for customizable functions interface in accordance with aspects of the present disclosure.

FIG. 7A shows a diagram 700a of a dome framework that illustrates a view of a screen window boundary area for customizable functions interface in accordance with aspects of the present disclosure. In this example, a screen 210 may have a screen border 710 that surrounds all (as shown) or part of the screen 210. The screen border 710 may be used to display or enable custom functions, which may be associated with the display assets provided through the screen 210.

Figure 7B:
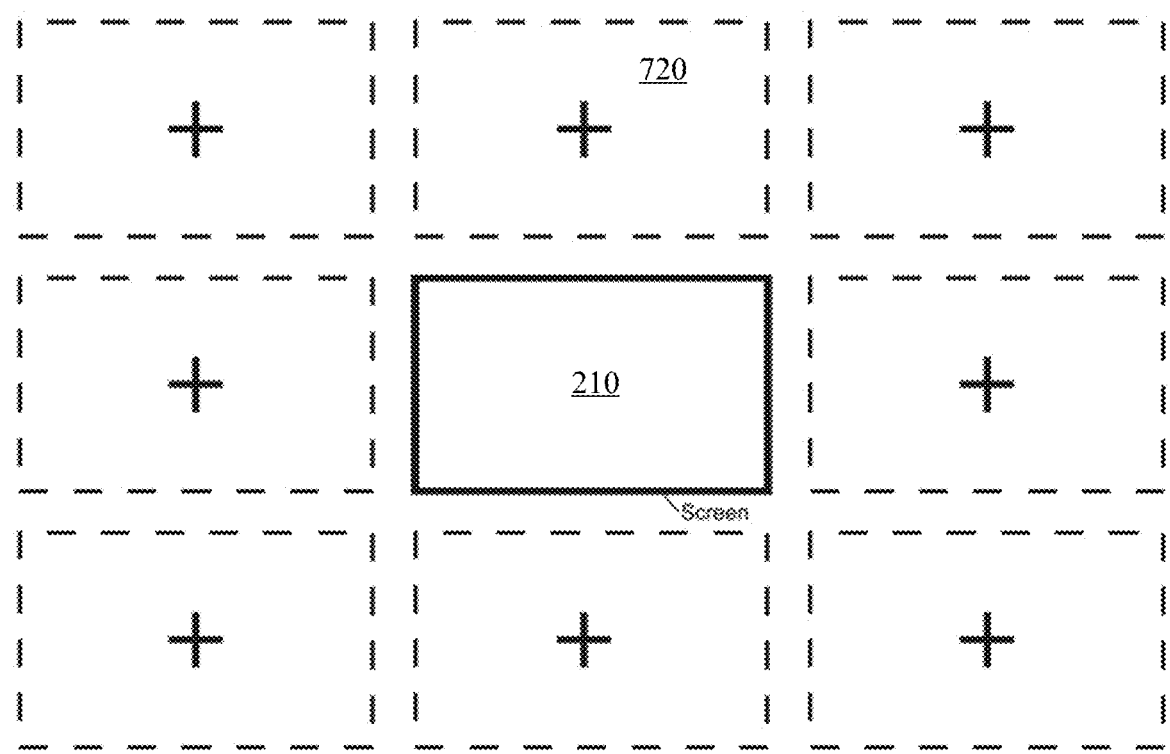
FIG. 7B is a diagram of a dome framework that illustrates a view of a screen window expansion layout/area for additional screens build in accordance with aspects of the present disclosure.

FIG. 7B shows a diagram 700b of a dome framework that illustrates a view of a screen window expansion layout/area for additional screens build in accordance with aspects of the present disclosure. In this example, the screen 210 may be expanded by increasing its area. This increase can take the form of adding one or more screens 720, which may or may not be in use. It is possible to add screens 720 to the left, right, top, bottom, or some combination (e.g., left-top, right-bottom) of the screen 210. The screens 720 being added to increase the area or size of the screen 120 need not be of the same size as the screen 120 and/or need not be all of the same size.

Figure 8A:
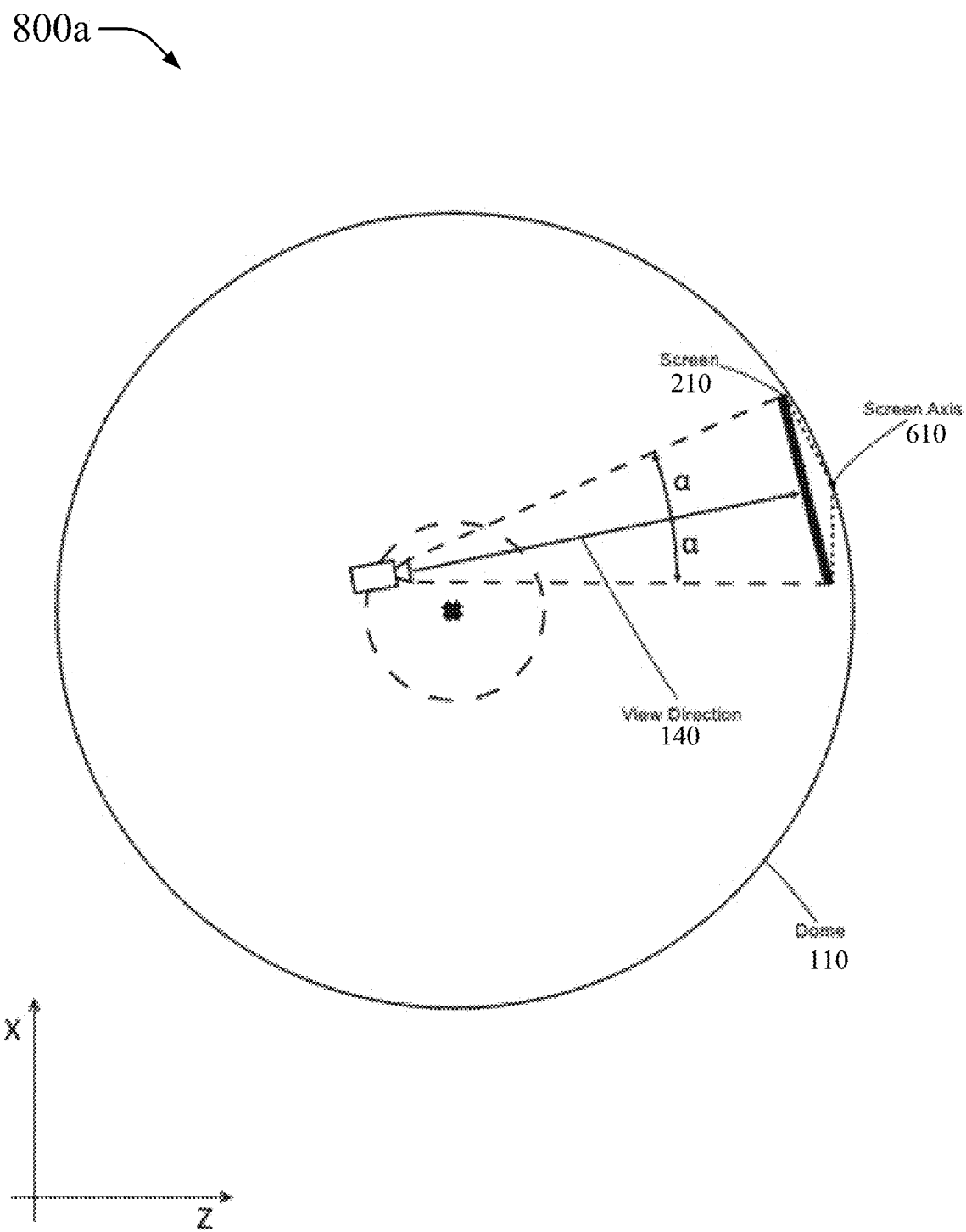
FIG. 8A is a diagram of a dome framework that illustrates an XZ-plane view of a vision region when viewed from an Y-direction offset from a center position in accordance with aspects of the present disclosure.

FIG. 8A shows a diagram 800a of a dome framework that illustrates an XZ-plane view of a vision region when viewed from an Y-direction offset from a center position in accordance with aspects of the present disclosure. In this example, the virtual camera is offset from the center and the screen 210 may be directed to face the virtual camera along the view direction 140. The screen axis 610 of the screen 210 in this example may be tilted such that the screen 210 faces directly in the opposite direction to the view direction 140 (as illustrated by equal angles α to either side of the view direction 140).

Figure 8B:
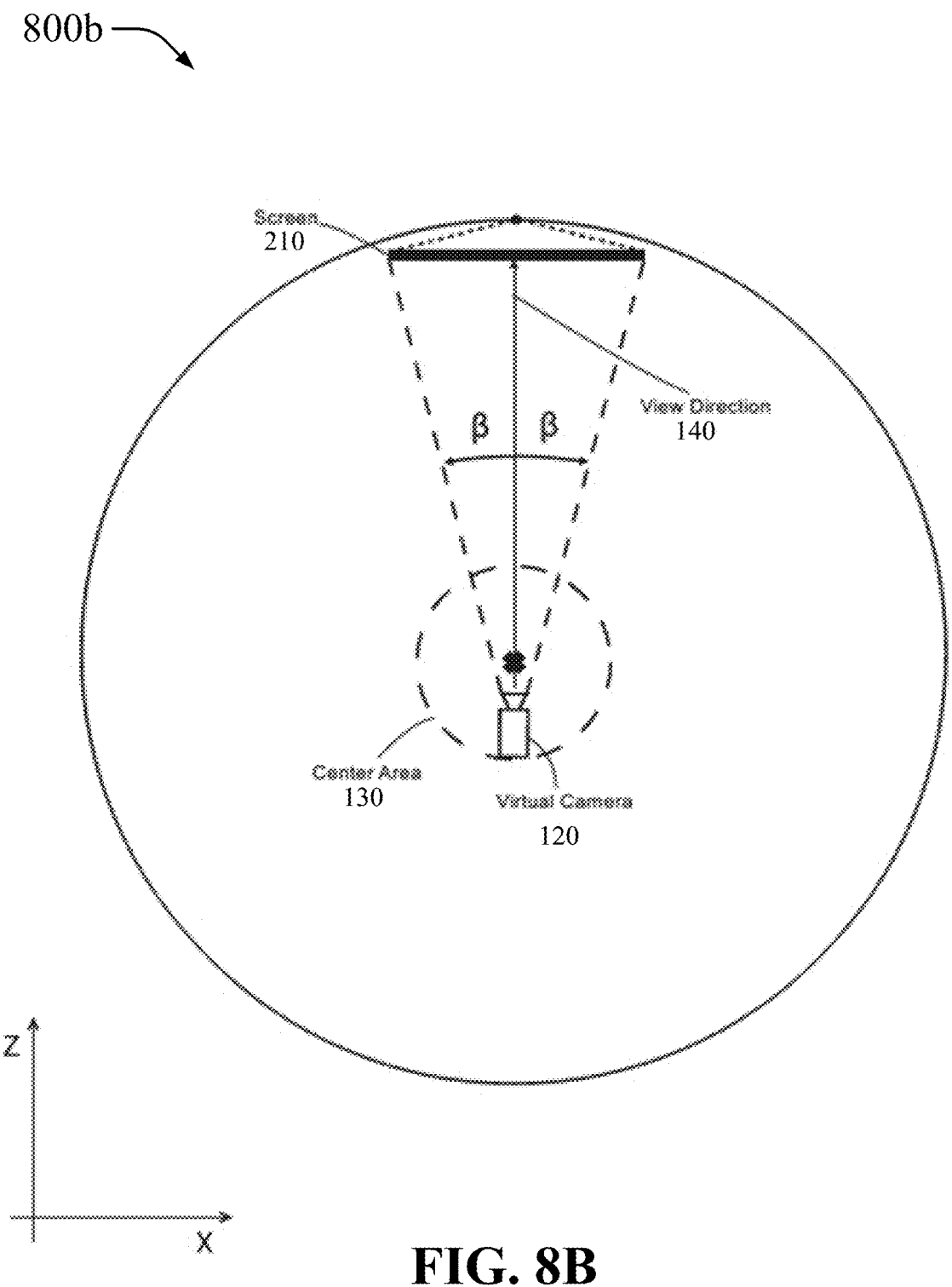
FIG. 8B is a diagram of a dome framework that illustrates an ZX-plane view of a vision region when viewed from a Y-direction offset from a center position in accordance with aspects of the present disclosure.

FIG. 8B shows a diagram 800b of a dome framework that illustrates an ZX-plane view of a vision region when viewed from a Y-direction offset from a center position in accordance with aspects of the present disclosure. In this example, the screen 210 faces in the direction of the virtual camera 120 along the view direction 140 (as illustrated by equal angles β to either side of the view direction 140). Therefore, the diagrams 800a and 800b show different angles of where the virtual camera 120 stands and the screen angles.

Figure 9A:
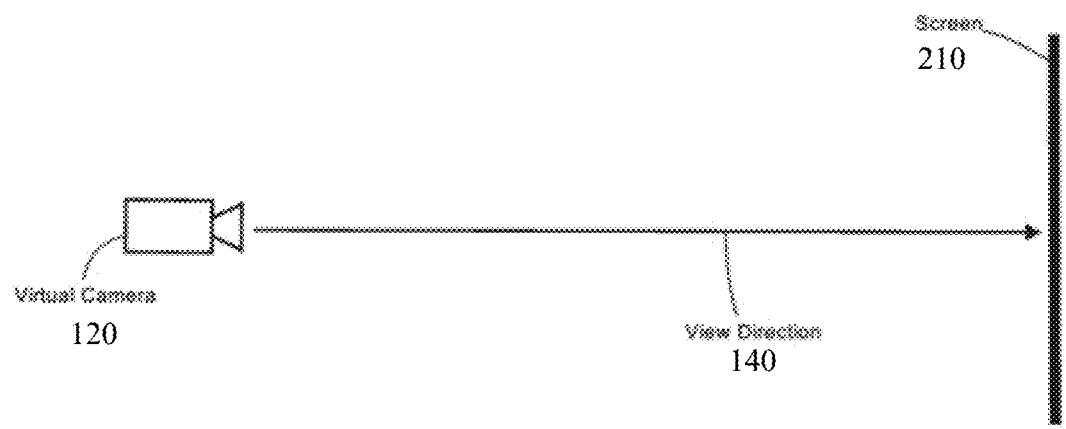
FIG. 9A shows diagrams of a dome framework that illustrate a placement angle of the screen in accordance with aspects of the present disclosure.
Figure 9A:
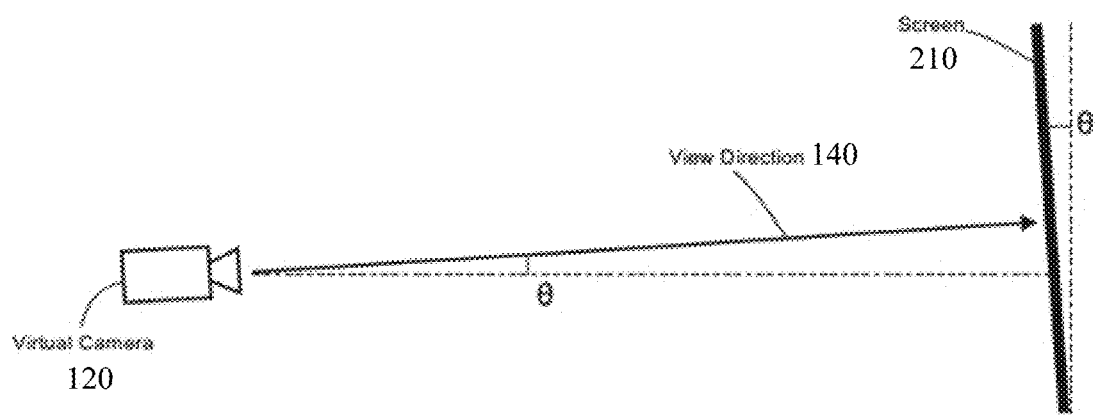

FIG. 9A shows diagrams 900a and 900b of a dome framework that illustrate a placement angle of the screen in accordance with aspects of the present disclosure. In the diagram 900a, the screen 210 is positioned perfectly vertical, while in the diagram 900b the screen 210 is slightly slanted (angle θ) from the vertical position and so the view direction 140 is also slanted upwards by the same angle so that the view direction 140 is normal to the surface of the screen 210. These changes may be seen depending on where in the curvature of the virtual dome sphere 110 (or a dome layer) the screen is placed. The closer to the Equator of the sphere the more upright/vertical the screen 210 is to be and the farther from the Equator of the sphere the more tilted the screen 210 is to be.

Figure 9B:
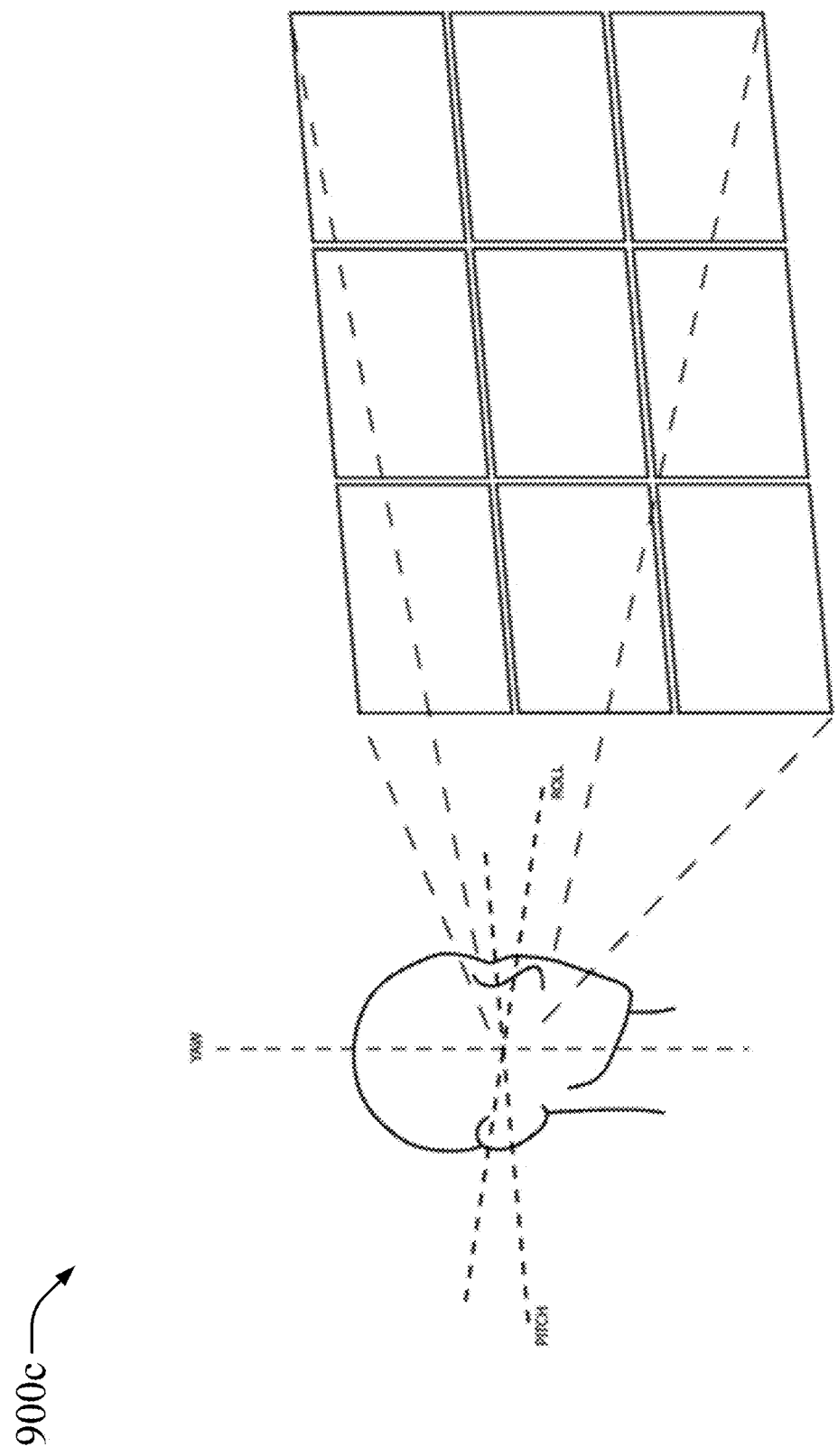
FIG. 9B is a diagram of a dome framework that illustrates an orthogonal coordinate system on a three-dimensional space in accordance with aspects of the present disclosure.

FIG. 9B shows a diagram 900c of a dome framework that illustrates an orthogonal coordinate system on a three-dimensional space in accordance with aspects of the present disclosure. In this example it is shown that the user can rotate his or her view direction and can therefore cover a significant portion of the virtual environment provided by the dome framework. Rotation around the front-to-back axis is called roll. Rotation around the side-to-side axis is called pitch. Rotation around the vertical axis is called yaw. In this example, the head of a user that wears an HMD may be assumed to be in the center area (see e.g., the center area 130, the center point 135 in the diagram 100a in FIG. 1A).

Figure 10A:
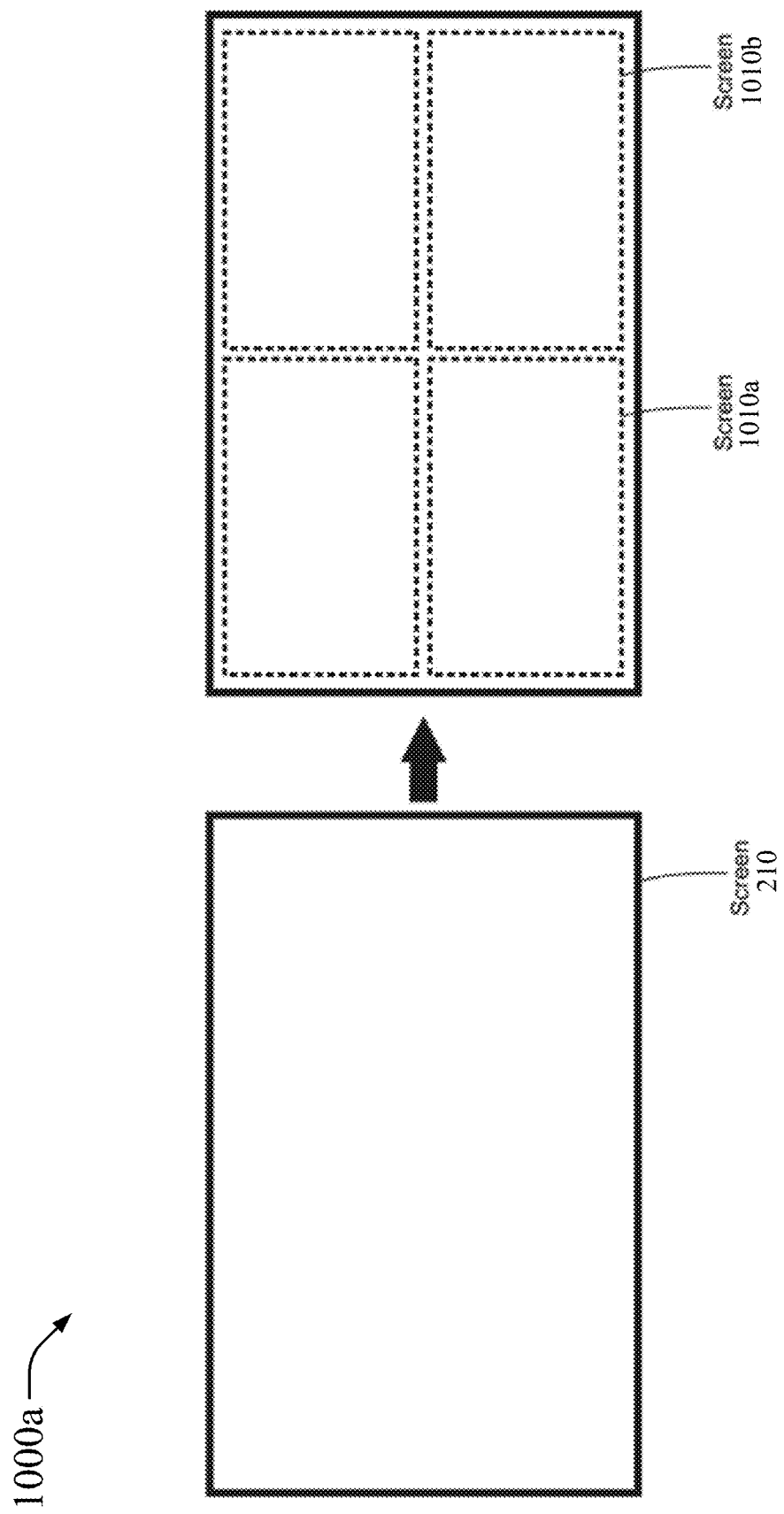
FIGS. 10A and 10B are diagrams of a dome framework that illustrate a layout relationship between screens layout and split screens in accordance with aspects of the present disclosure.
Figure 10B:
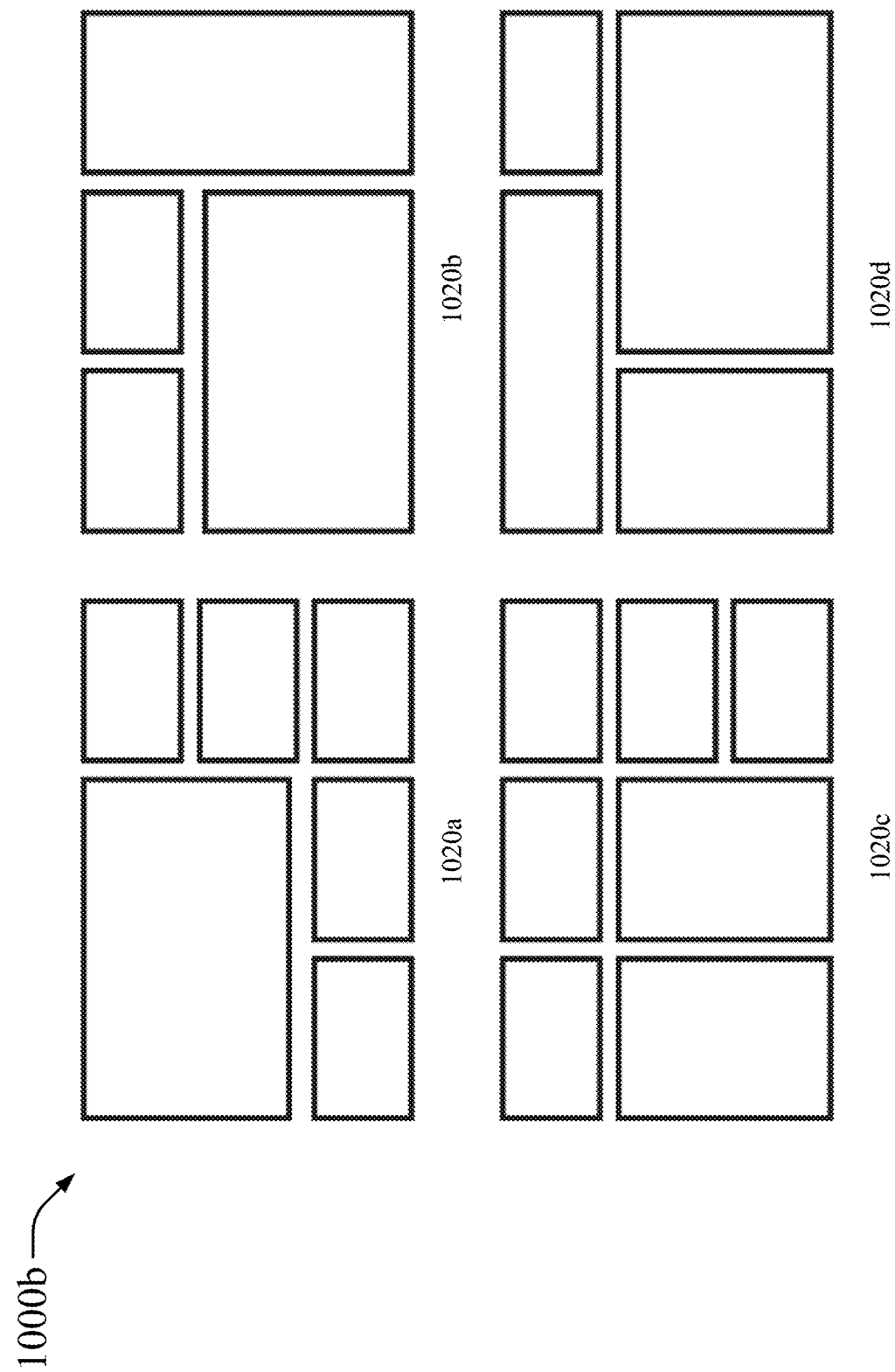

FIGS. 10A and 10B respectively show diagrams 1000a and 1000b of a dome framework that illustrate a layout relationship between screens layout and split screens in accordance with aspects of the present disclosure. The diagram 1000a shows how a screen 210 projected in a dome framework can be split into multiple, smaller screens. In this example, the screen 210 is split into at least two smaller screens 1010a and 1010b, and possibly more. Although up to four (4) smaller screens are shown, the screen 210 can be split into two or more screens.

The diagram 1000b shows different configurations in which screens can be organized. Each of the configurations 1020a, 1020b, 1020c, and 1020d includes multiple screens of different sizes and in different positional arrangements. Each of these configurations may also be an example of splitting a larger screen into multiple smaller screens of different sizes and different positional arrangements. It is to be understood that the configurations 1020a, 1020b, 1020c, and 1020d are provided by way of illustration and not of limitation and other configurations may also be implemented.

Figure 11A:
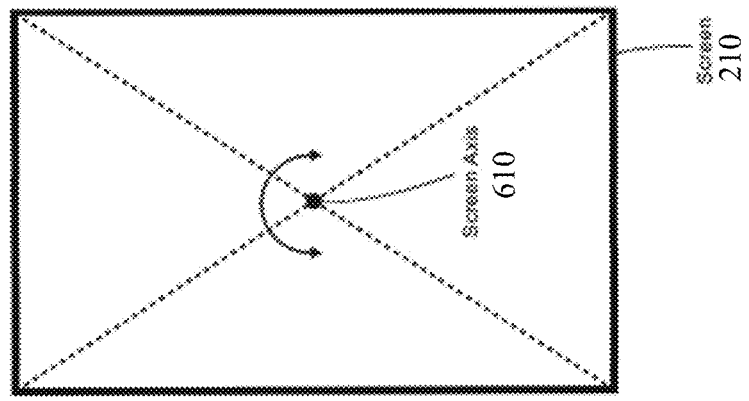
FIGS. 11A and 11B are diagrams of a dome framework that illustrate rotational directions of a screen in accordance with aspects of the present disclosure.
Figure 11A:
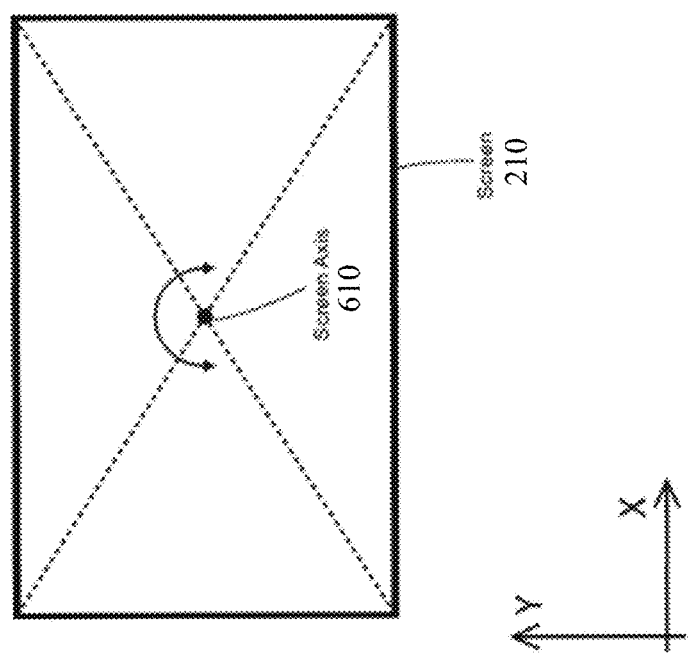
Figure 11B:
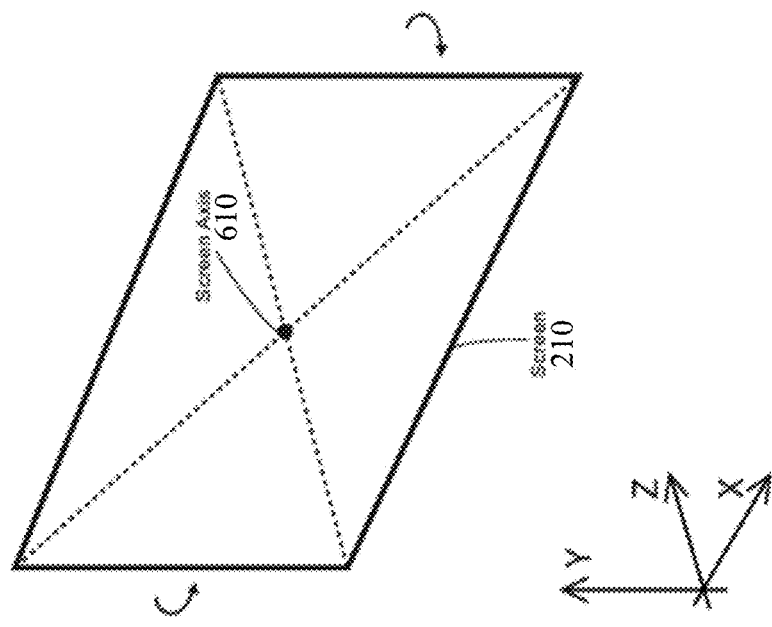

FIGS. 11A and 11B respectively show diagrams 1100a and 1100b of a dome framework that illustrate rotational directions of a screen in accordance with aspects of the present disclosure. In the diagram 1100a (on a YX plane), a screen 210 can be in a landscape or horizontal configuration (left) and can rotate about a screen axis 610, or the screen 210 can be in a portrait or vertical configuration (right) and can rotate about the screen axis 610. In an aspect, it is possible to rotate the screen 210 from landscape/horizontal configuration to portrait/vertical configuration, or from portrait/vertical configuration to landscape/horizontal configuration.

In the diagram 1100b (on an XYZ plane), a screen 210 can be in a landscape or horizontal configuration and can rotate front-to-back or back-to-front about a screen axis 610 (left), or the screen 210 can be in the landscape or horizontal configuration and can rotate top-to-bottom or bottom-to-top about the screen axis 610 (right). In an aspect, it is possible for the screen 210 to be in a portrait/vertical configuration and also be able to rotate front-to-back or back-to-front or rotate top-to-bottom or bottom-to-top about a screen axis 610.

Figure 12:
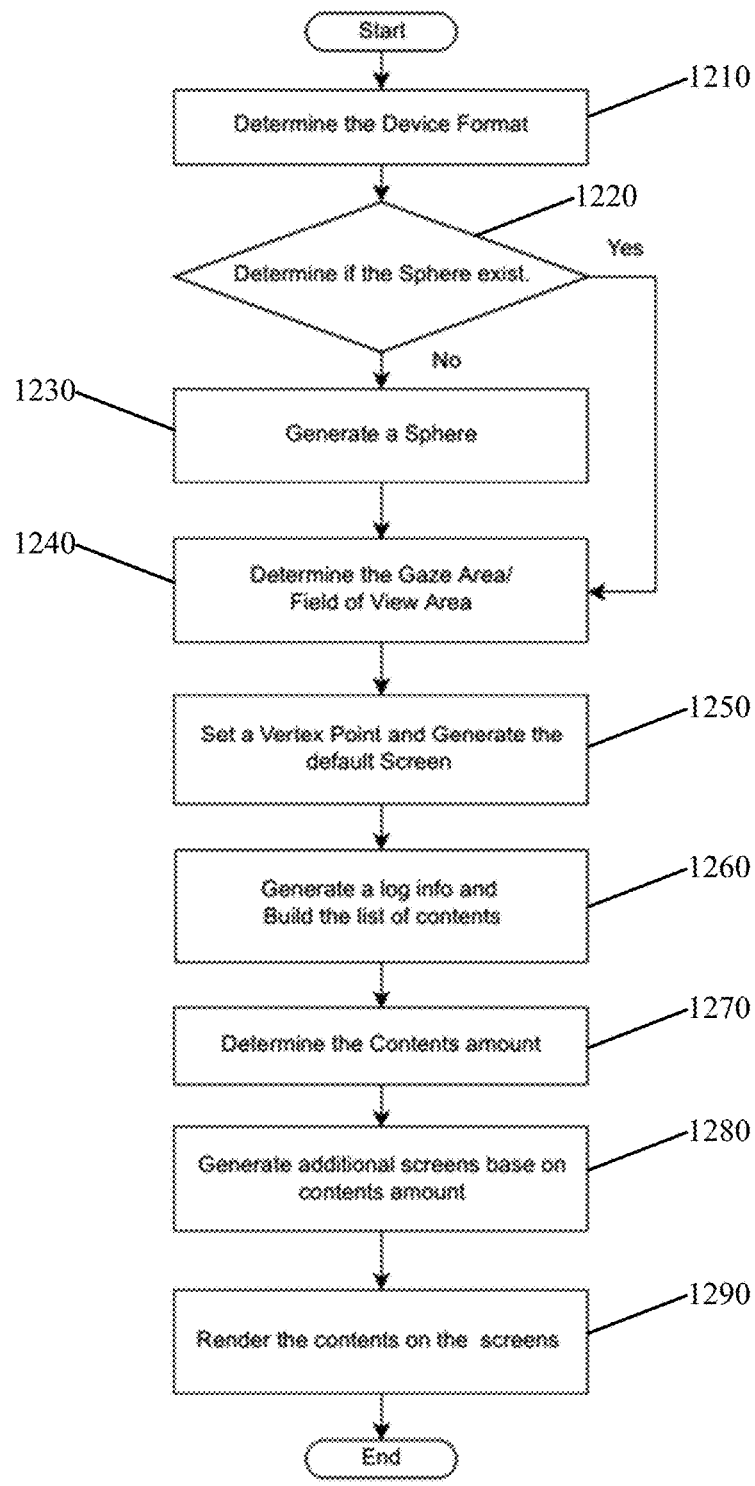
FIG. 12 is a flowchart that illustrates an example of a method for building a dome framework in accordance with aspects of the present disclosure.

FIG. 12 is a flowchart that illustrates an example of a method 1200 for building a dome framework in accordance with aspects of the present disclosure. The method 1200 may include at 1210, determining a device format. A device format may refer to whether the device is an HMD, PC, tablet, mobile device, custom monitors etc. Based on many device formats, the contents might be displayed in a diffident layout. The HMD might have a sphere screen display, any other flat viewing device will have a XY screen layout to display the screens. At 1220, the method 1200 may determine whether a sphere (e.g., the virtual dome sphere 110) exists or has been configured. If a sphere does not exist or has been configured, the method 1200 proceeds to 1230 to generate a sphere. If a sphere does exist or has been configured, the method 1200 proceeds to 1240 to determine a gaze area or field of view area (e.g., the gaze area 115).

At 1250, the method 1200 may set a vertex point and generate a default screen based on the position of the vertex point. At 1260, the method 1200 may generate a log info and build a list of contents (e.g., the data assets that are needed or are being provided). At 1270, the method 1200 may determine the contents amount. At 1280, the method 1200 may generate additional screens based on the contents amount. At 1290, the method 1200 may render the contents on the screens (e.g., one or more screens 210).

Figure 13:
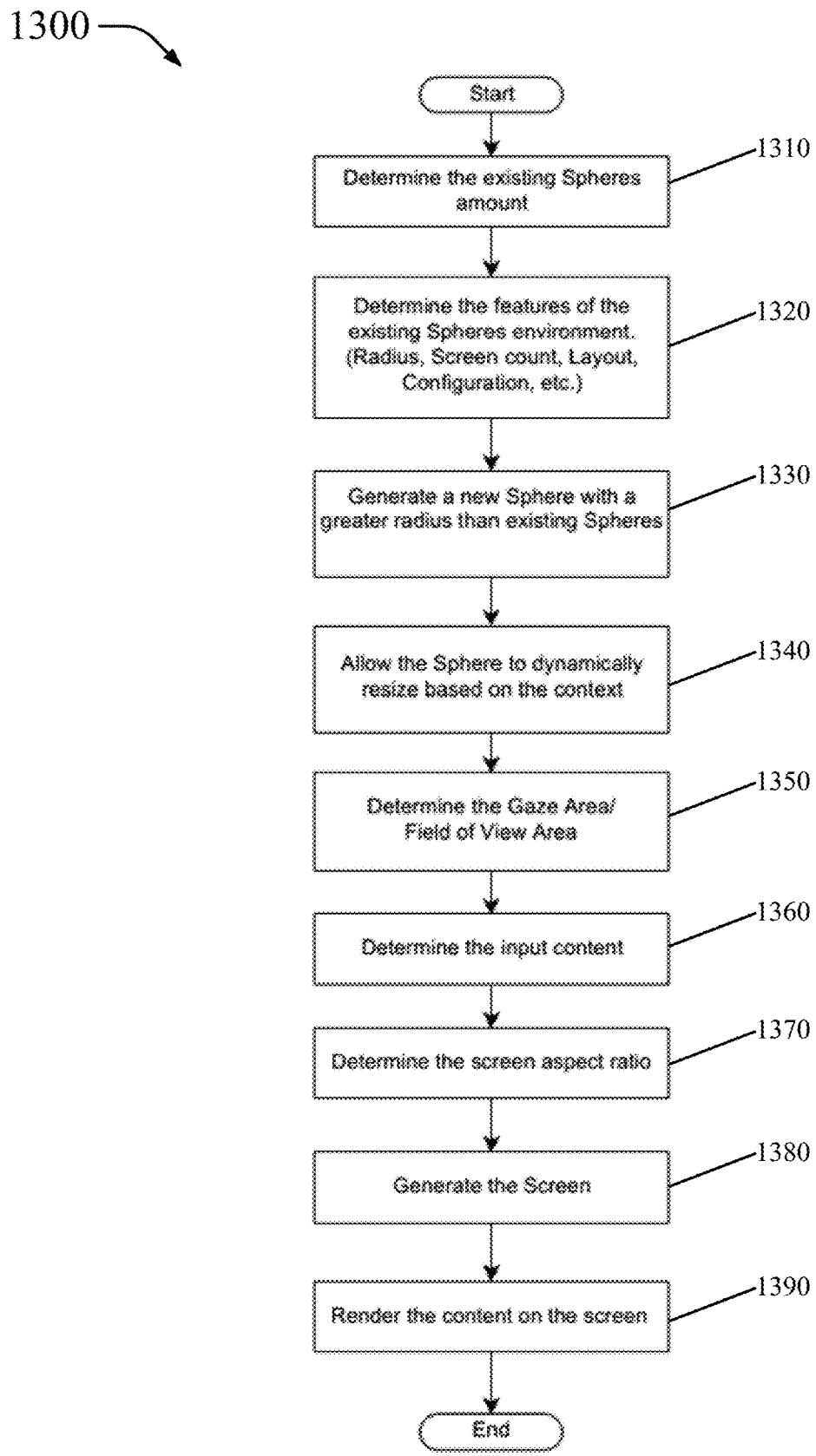
FIG. 13 is a flowchart that illustrates an example of a method for building layers in a dome framework in accordance with aspects of the present disclosure.

FIG. 13 is a flowchart that illustrates an example of a method 1300 for building layers (see e.g., dome layers in the diagrams 400, 500a, and 500b in FIGS. 4, 5A, and 5B) in a dome framework in accordance with aspects of the present disclosure. The method 1300 may include, at 1310, determining the existing spheres amount. That is, a determination is being made as to how many spheres or layer are already configured to see if more are needed to display extra screens. At 1320, the method 1300 may include determining the features of the existing spheres environment (e.g., radius, screen count, layout, configuration, etc.). At 1330, the method 1300 may include generating a new sphere (e.g., a layer) with a greater radius than any existing sphere. At 1340, the method 1300 may include allow the sphere to dynamically resize based on the context. At 1350, the method 1300 may include determining a gaze area or field of view (e.g., the gaze area 115) for the new sphere. At 1360, the method 1300 may include determining the input content for the new sphere. At 1370, the method 1300 may include determining an aspect ratio for a screen on the new sphere. At 1380, the method 1300 may include generating the screen (e.g., projecting a screen 210 onto the new sphere or layer), and at 1390 may include rendering the content to be displayed on the screen.

Figure 14:
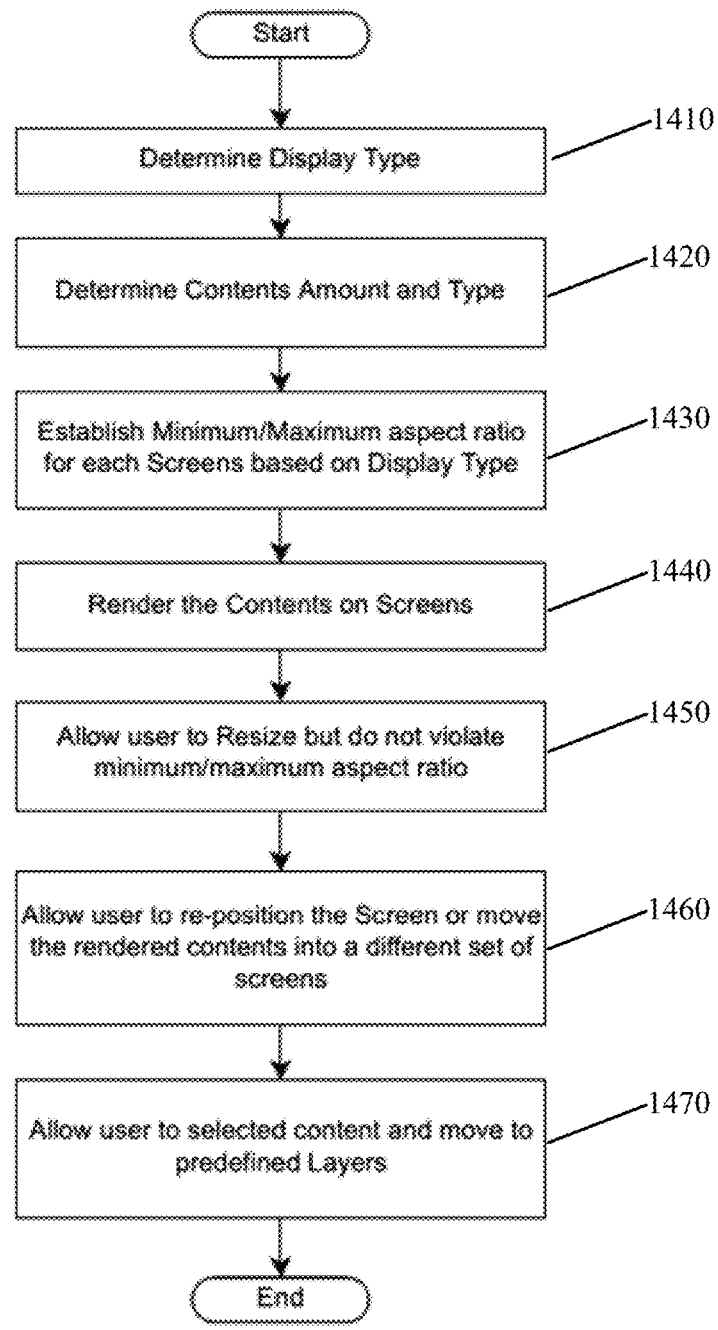
FIG. 14 is a flowchart that illustrates an example of a method for building screens and additions in a dome framework in accordance with aspects of the present disclosure.

FIG. 14 is a flowchart that illustrates an example of a method 1400 for building screens and additions in a dome framework in accordance with aspects of the present disclosure. The method 1400 may include, at 1410, determining a display type (e.g., HMD, PC, tablet, mobile devices, custom screens, etc.). At 1420, the method 1400 may include determining contents amount and type (e.g., amount and type of content in digital assets). At 1430, the method 1400 may include establishing a minimum/maximum aspect ratio of each screen based on the display type. At 1440, the method 1400 may include rendering the contents on the screens. At 1450, the method 1400 may include enabling and allowing the user to resize the screens without violating the minimum/maximum aspect ratio. At 1460, the method 1400 may include enabling and allowing the user to re-position one or more screens or move the rendered contents into a different set of screens. At 1470, the method 1400 may include enabling and allowing a user to select content and move predefined layers.

The method 1400 may include other aspects in which, based on the content and/or the minimum/maximum aspect ratio, additional screens may be added to a main screen to expand the main screen (see e.g., the diagram 700b in FIG. 7B).

Figure 15:
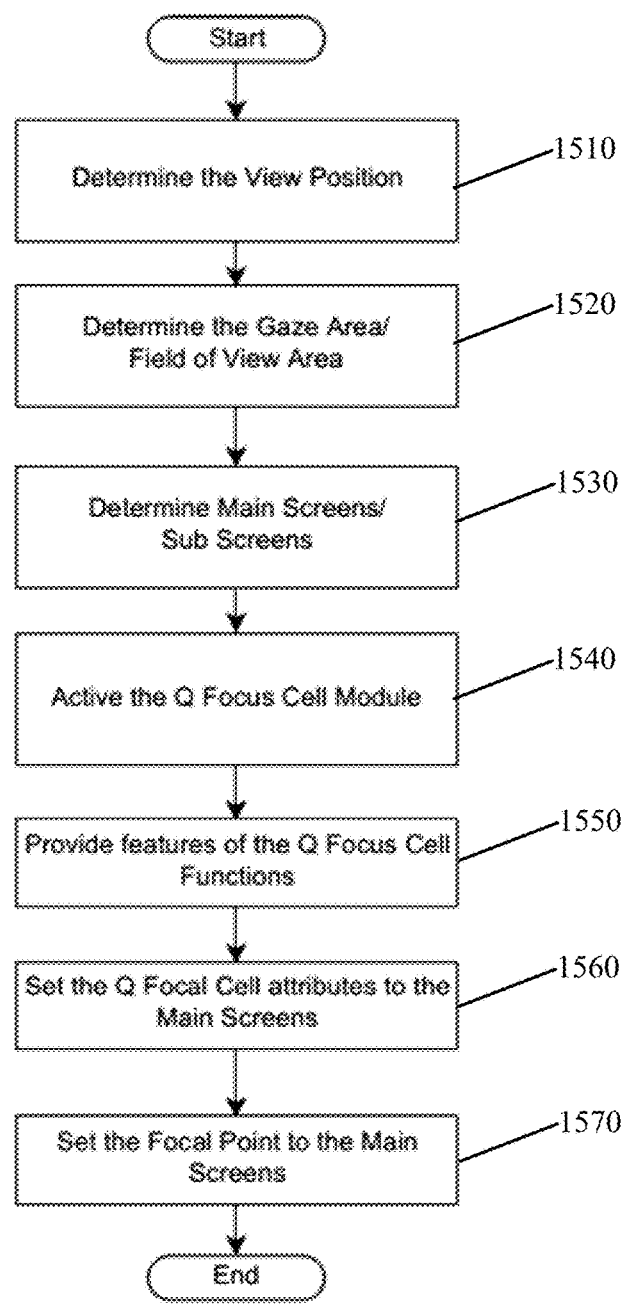
FIG. 15 is a flowchart that illustrates an example of a method for determining a focus gaze area in accordance with aspects of the present disclosure.

FIG. 15 is a flowchart that illustrates an example of a method 1500 for determining a focus gaze area in accordance with aspects of the present disclosure. The method 1500 may include, at 1510, determining a view position. At 1520, the method 1500 may include determining a gaze area or field of view area (e.g., the gaze area 115). At 1530, the method 1500 may include determining main screens and/or sub-screens (see e.g., the diagram 1000a in FIG. 10A). At 1540, the method 1500 may include activating a Q system focus cell module (see e.g., FIG. 16). The focus cell module may be used by the Q system for higher resolution and detail oriented attributes to be available to the user for, for example, professional production ready contents. At 1550, the method 1500 may include providing features of the focus cell module functions. At 1560, the method 1500 may include setting the attributes of the focus cell to the main screens. At 1570, the method 1500 may include setting the focal point to the main screens.

Aspects of the method 1500 may be used to determine where to place the gaze area, what the gaze area is to include (e.g., number of screens and/or sub-screens), and various attributes or configurations of the gaze area.

Figure 16:
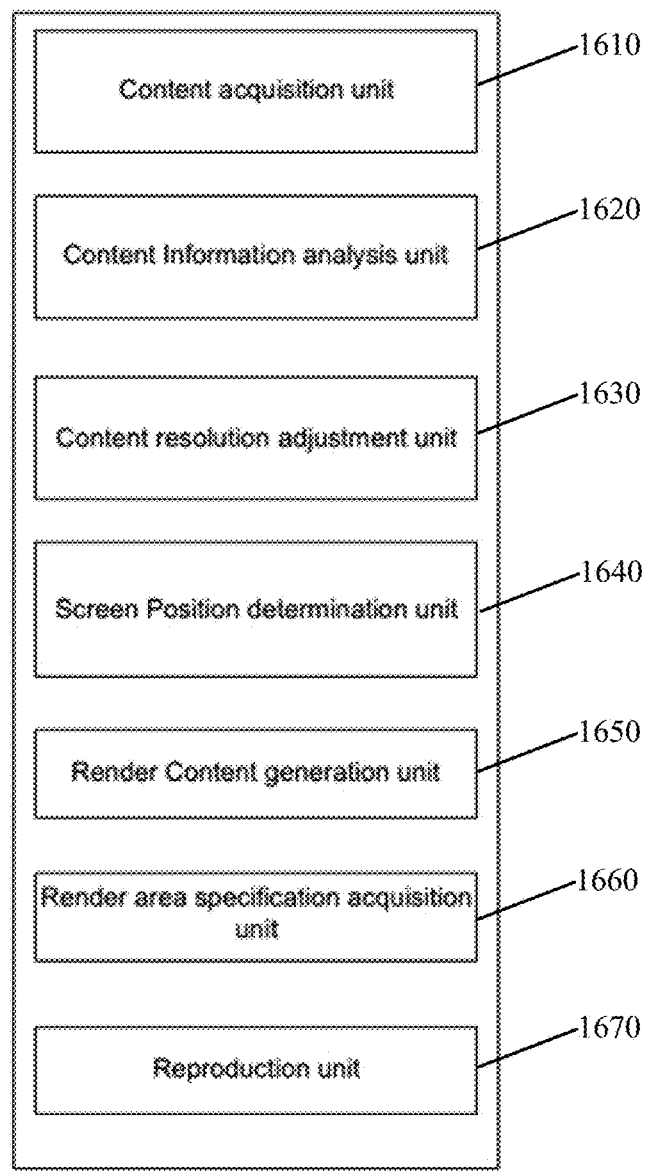
FIG. 16 is block-level diagram of a focus cell processing module in accordance with aspects of the present disclosure.

FIG. 16 shows block-level diagram of a focus cell processing module 1600 (e.g., the Q system focus cell module described above in connection with the method 1500) in accordance with aspects of the present disclosure. The module 1600 may include various units or components. In an example, the module 1600 may include a content acquisition unit 1610, a content information analysis unit 1620, a content resolution adjustment unit 1630, a screen position determination unit 1640, a render content generation unit 1650, a render area specification unit 1660, and a reproduction unit 1670. The module 1600 may be used in connection with at least some aspects of the methods 1200, 1300, 1400, and 1500. That is, the module 1600 may be used in connection with at least some aspects of building a dome framework, building layers in a dome framework, building screens and additions in a dome framework, and/or determining a focus gaze area.

Figure 17A:
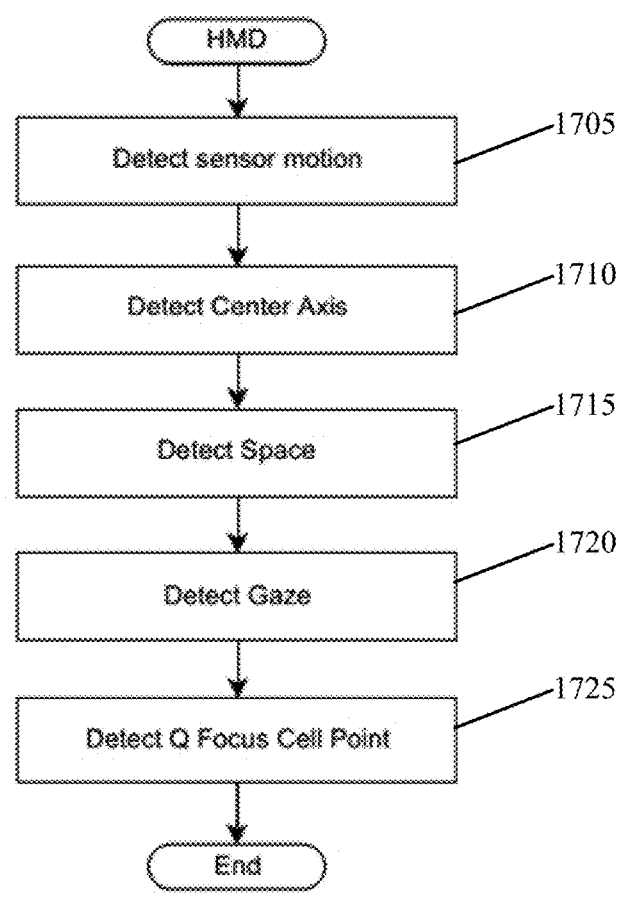
FIGS. 17A and 17B are flowcharts that illustrate examples of methods for detecting the three-dimensional viewing platform in accordance with aspects of the present disclosure.
Figure 17B:
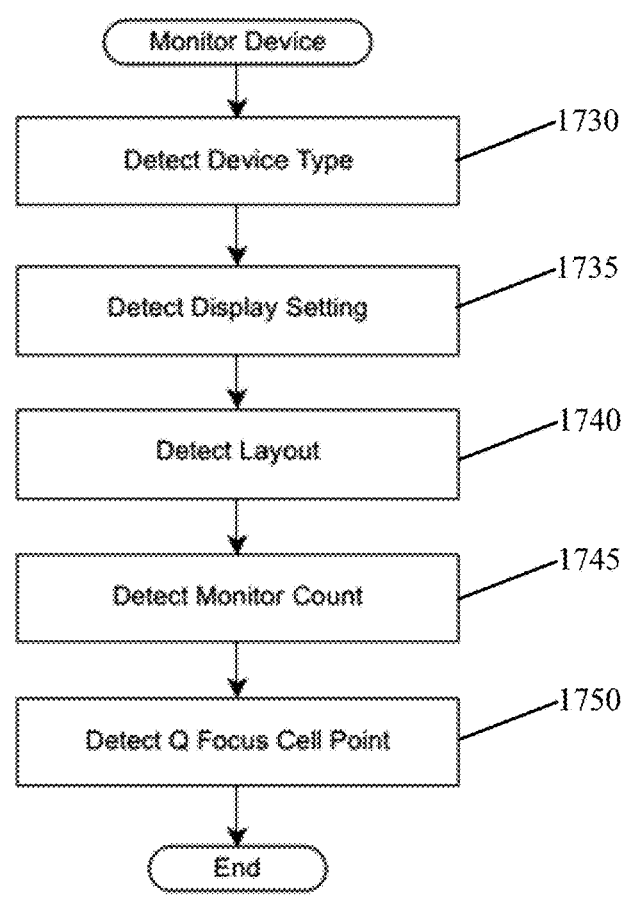

FIGS. 17A and 17B respectively show flowcharts that illustrate examples of a method 1700a for a head mounted display (HMD) and a method 1700b for a monitor or display device, both of which are for detecting the three-dimensional viewing platform (e.g., Q system platform) in accordance with aspects of the present disclosure.

The method 1700a may include, at 1705, detecting sensor motion in the HMD. At 1710, the method 1700a may include detecting a center axis. At 1715, the method 1700a may include detecting a space. At 1720, the method 1700a may include detecting a gaze. At 1725, the method 1700a may include detecting a Q system focus cell point. On a default scene, this point can be the center default screen, and on an ongoing project, this can be the latest screen the user was viewing.

The method 1700b may include, at 1730, detecting a device type. At 1735, the method 1700b may include detecting a display setting. At 1740, the method 1700b may include detecting a layout. At 1745, the method 1700b may include detecting a monitor count. At 1750, the method 1700b may include detecting a Q system focus cell point. In this case, the focus point can be the application window (e.g., the Q application window).

Figure 18A:
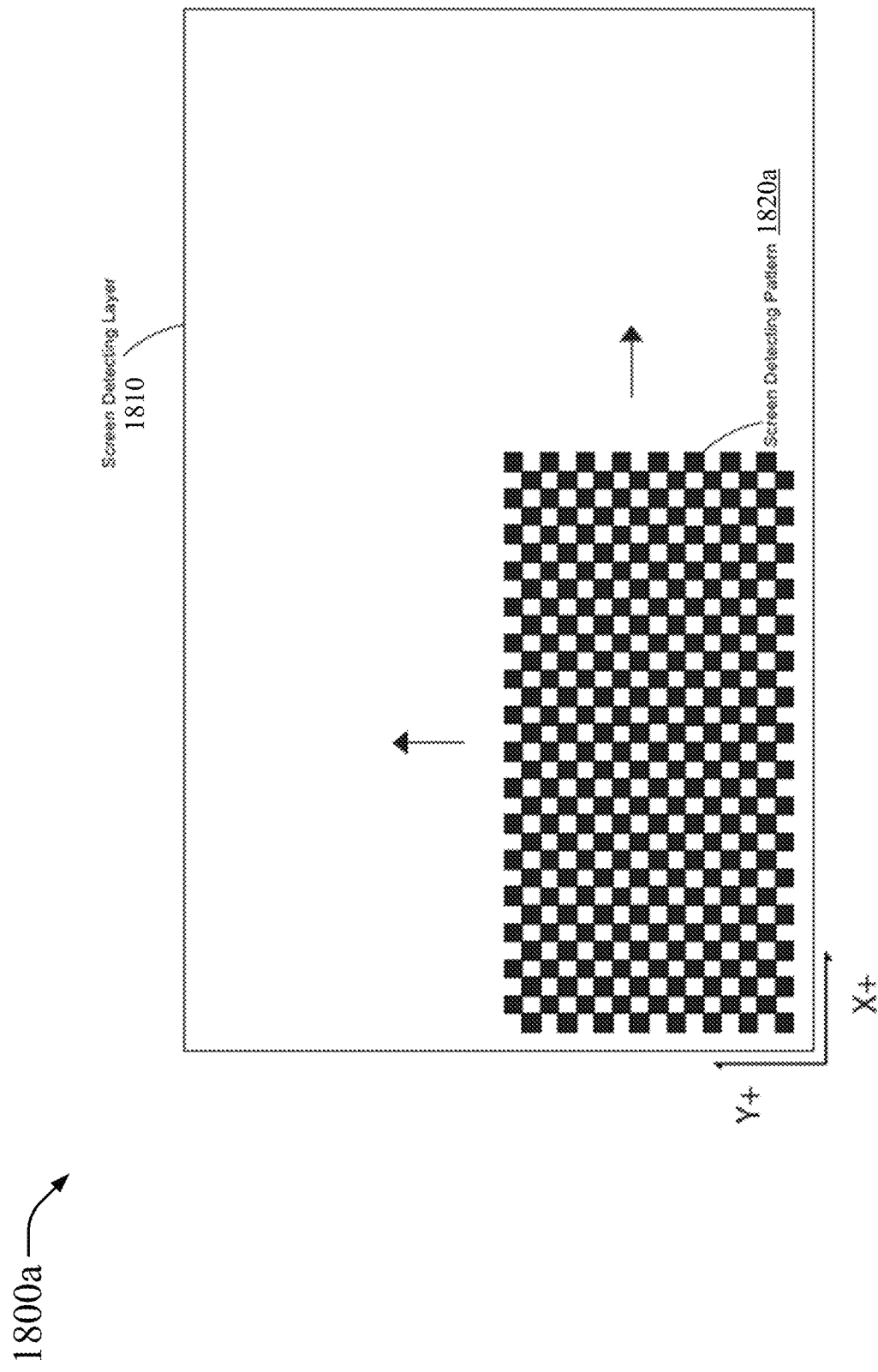
FIGS. 18A and 18B are diagrams of a behavior sync that illustrate examples of detecting pattern layout in accordance with aspects of the present disclosure.
Figure 18B:
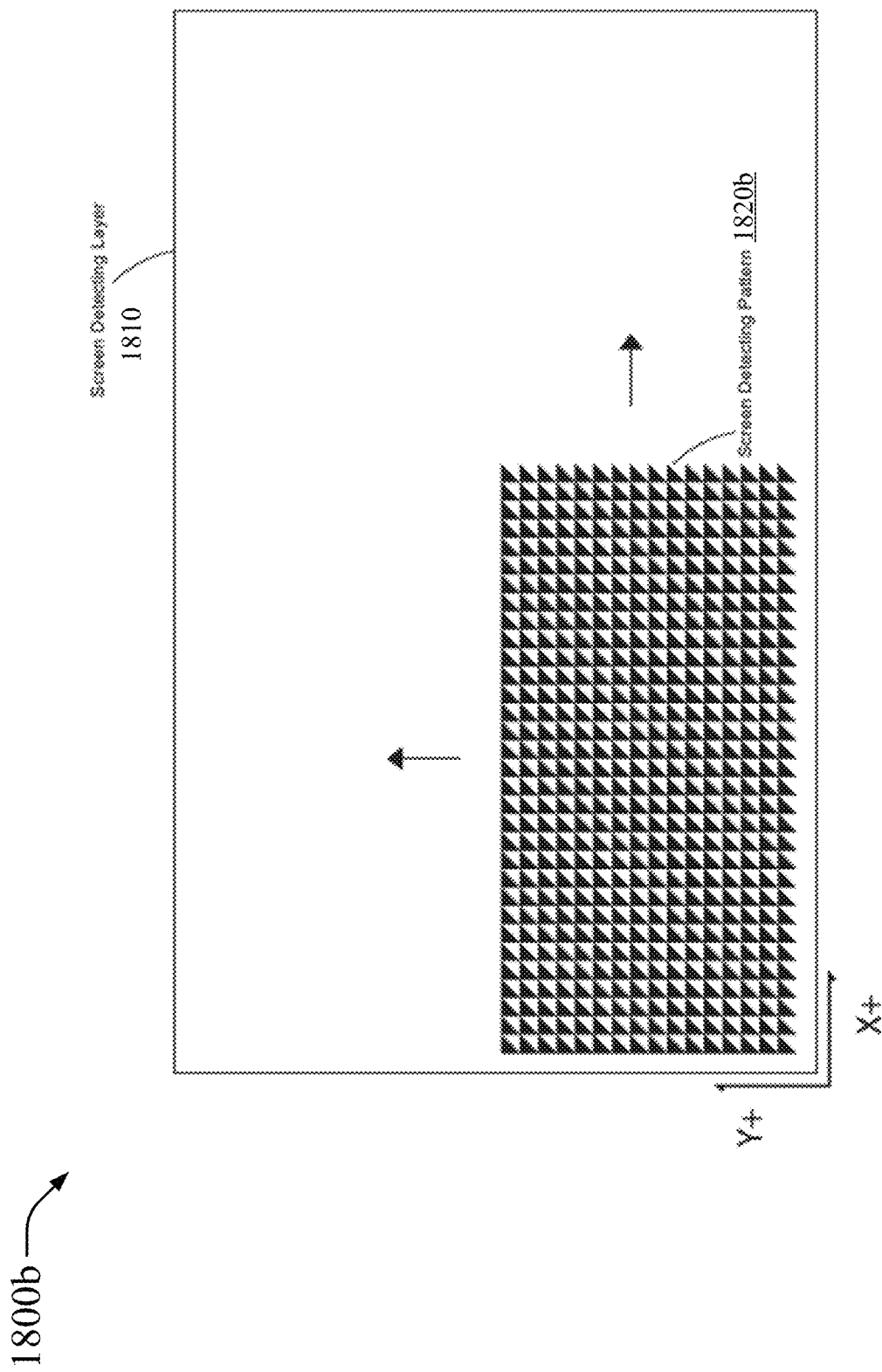

FIGS. 18A and 18B respectively show diagrams 1800a and 1800b of a behavior sync that illustrate examples of detecting pattern layout in accordance with aspects of the present disclosure. The diagram 1800a shows a screen detecting layer 1810 with a screen detecting pattern 1820a that includes a grid of black and white squares. The diagram 1800b shows the screen detecting layer 1810 with a screen detecting pattern 1820b that includes a grid of black and white triangles. A part of the behavior sync process, to synchronize the behavior, each users' movements and interaction will be read as a pattern by using SVG (Scalable Vector Graphics) data format and this data will be using a GPU processor to sync with the other users' display. In the examples in the diagrams 1800a and 1800b, different users are associated with the different screen detecting patterns 1820a and 1820b.

Building the SVG pattern is for the future use of easier and predicable work flow. The interaction comes from the input from each users. For example, if there are 3 users in a project, user 1 content screen is viewable to user 2 and user 3 and their indicator movements are viewable to user 1 by screen layers from user 2 and user 3. The screen layers may only show the users indicator movement but not the content itself, since they are all viewing the same content. Each user may have his or her own instance (clone) content screen on his or her view.

Figure 19A:
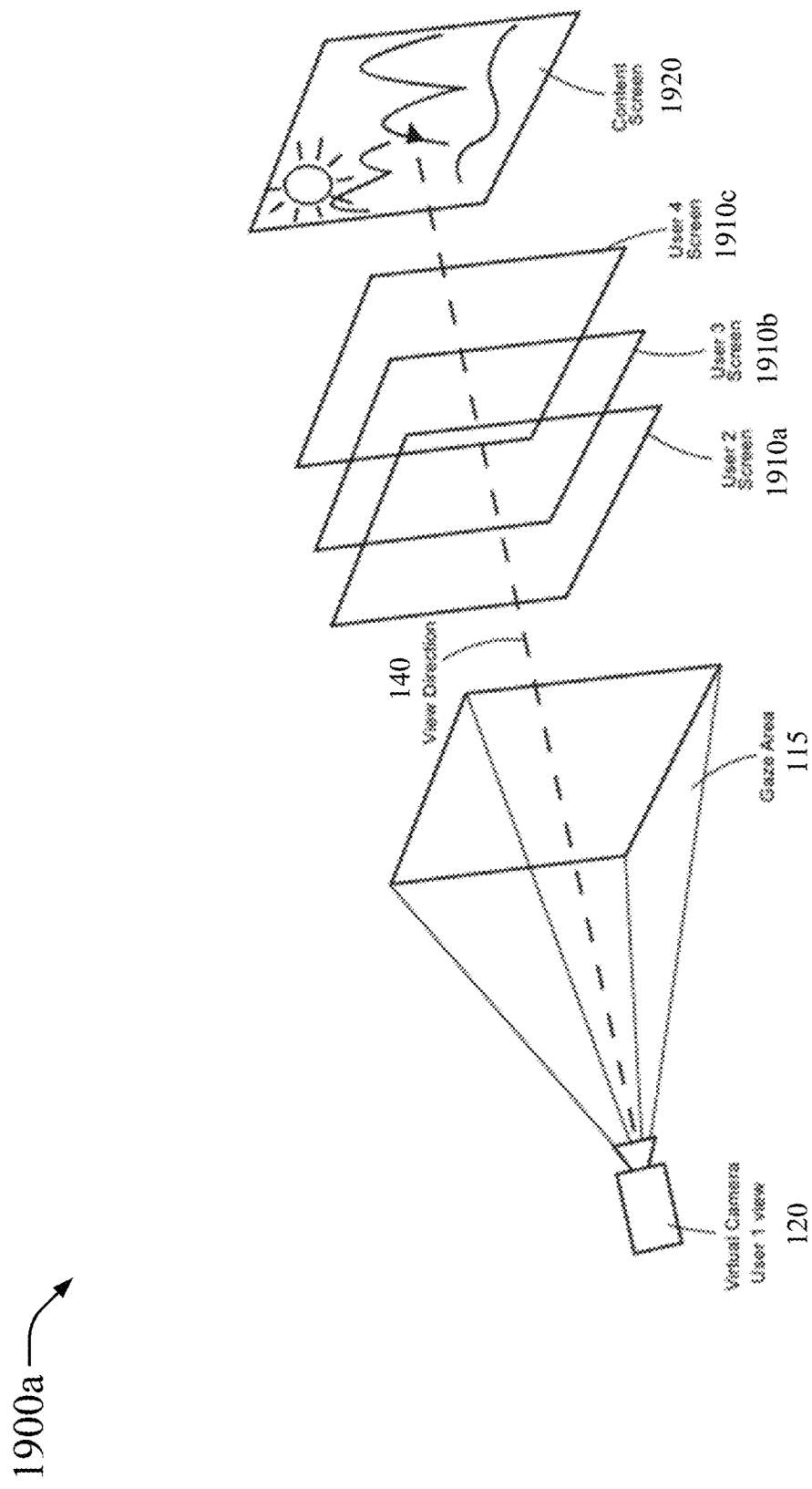
FIGS. 19A and 19B are diagrams of a behavior sync that illustrate examples of users screen layers and viewing direction in accordance with aspects of the present disclosure.

FIG. 19A shows a diagram 1900a of a behavior sync that illustrates an example of users screen layers and viewing direction in accordance with aspects of the present disclosure. In this example, a first user (user 1) has a view in the view direction 140 of a content screen 1920 at the virtual camera 120 and within the gaze area 115. A second user can also view the same content screen 1920 and the first user (user 1) can view the second user's indicator interaction through a second user screen (user 2 screen) 1910a. The same for a third user in a third user screen (user 3 screen) 1910b and a fourth user in a fourth user screen (user 4 screen) 1910c. This allows for multiple users to collaborate by synchronizing the content each receives in a single, collaborative and virtual environment.

Figure 19B:
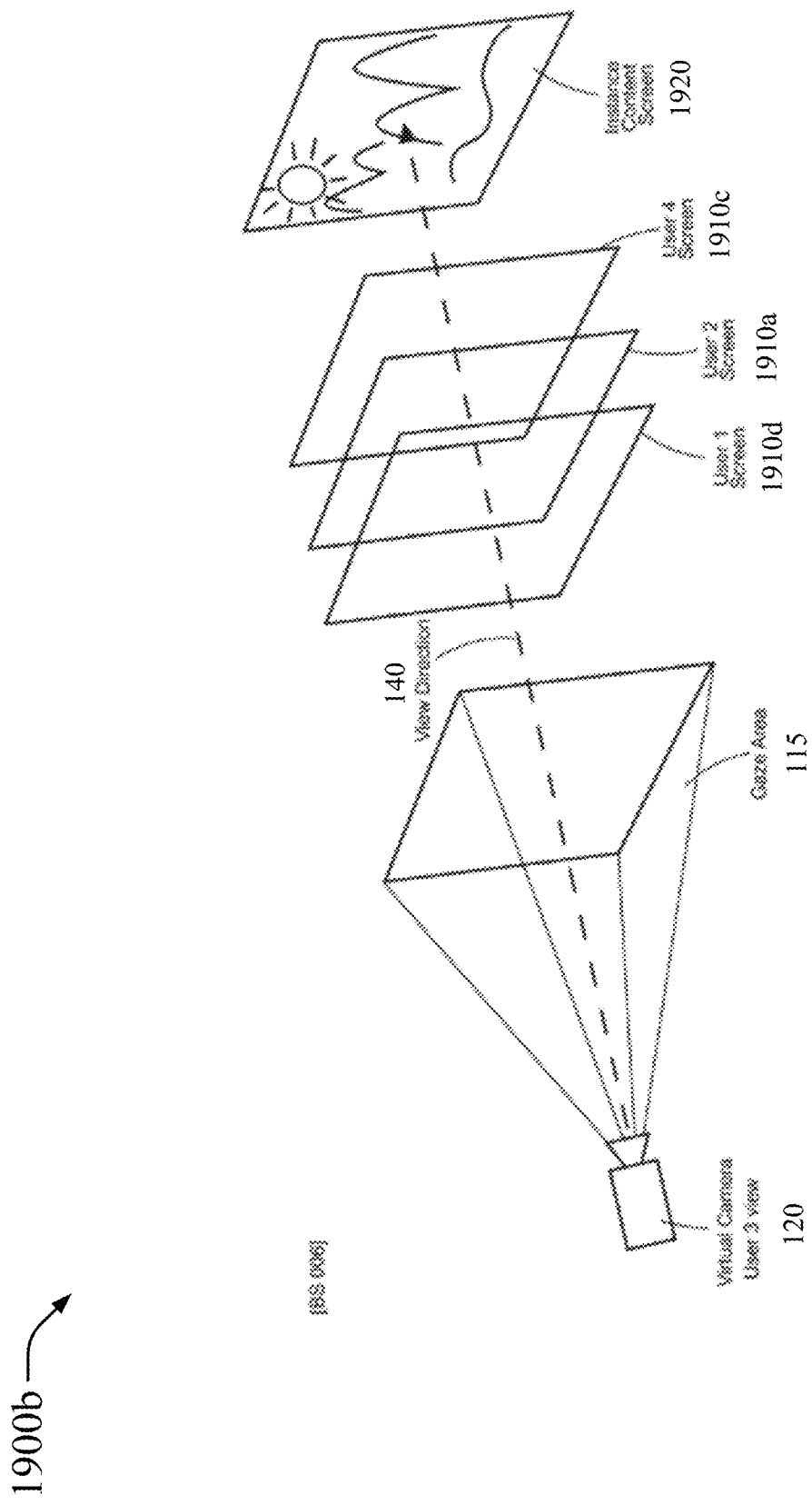

FIG. 19B shows a diagram 1900b that is similar to the diagram 1900a. In this case, the third user is at the position of the virtual camera 120 and the first user can also view the same content screen 1920 and the third user (user 3) can view the first user's indicator interaction through a first user screen (user 1 screen) 1910d. The same for the second user in the second user screen (user 2 screen) 1910a and the fourth user in the fourth user screen (user 4 screen) 1910c. This shows how collaboration can be seen from the perspective of the third user while the diagram 1900a shows collaboration from the perspective of the first user.

FIG. 19C shows a diagram of a behavior sync that illustrates an example of a screen content management table 1900c in accordance with aspects of the present disclosure. In this example, the various screens in the diagram 1900a or the diagram 1900b may be tracked by screen identifier (ID) on a first column, with other information also tracked including at least a content ID column, a project ID column, an aspect ratio of the screens column, and a contents status column.

It is to be understood that the examples in the diagrams 1900a, 1900b, and 1900c in which four users indicator interaction screens are shown is provided by way of illustration and not of limitation. More or fewer users and/or screens may be synchronized in the manner described in the diagrams 1900a, 1900b, and 1900c.

Figure 20:
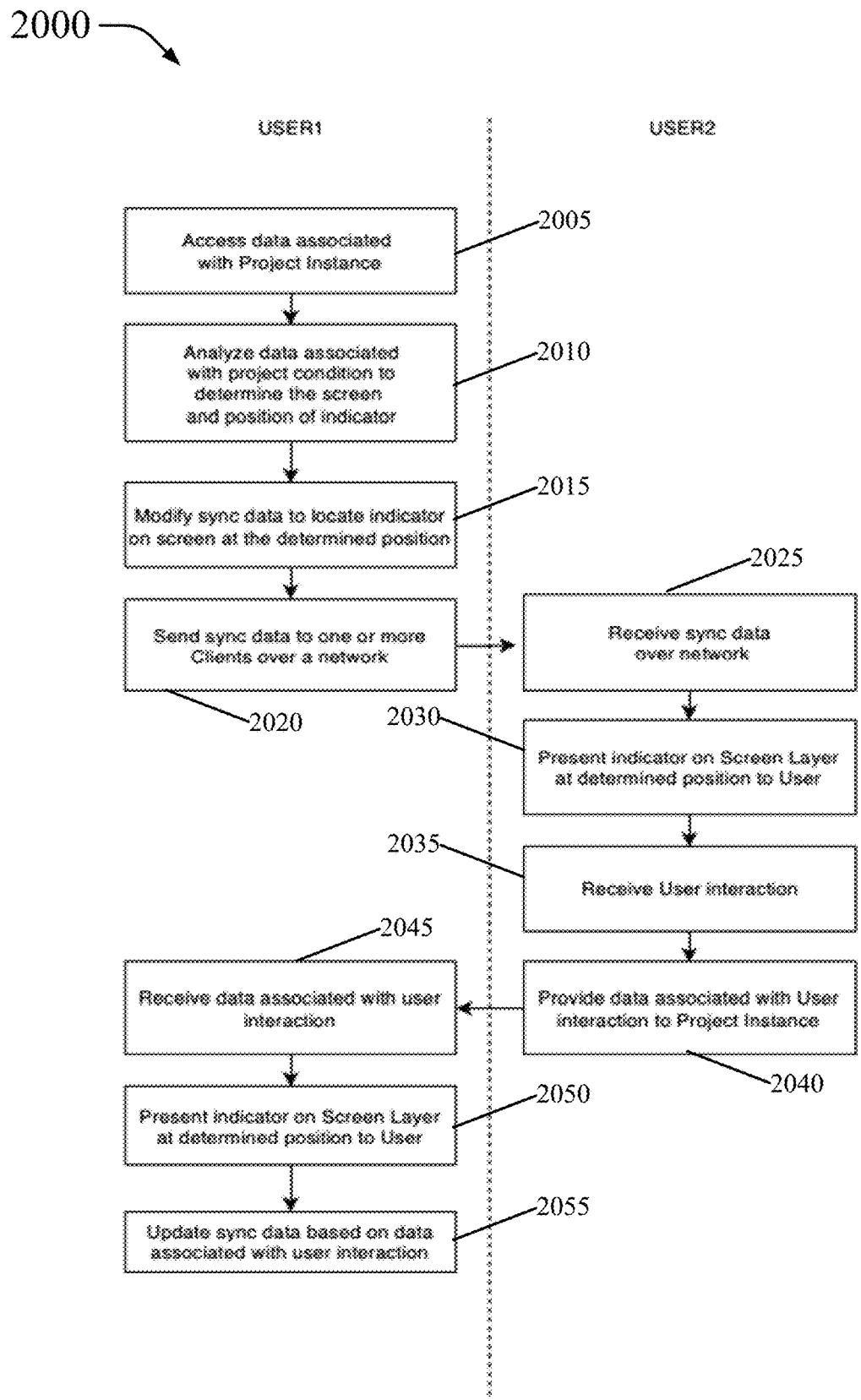
FIG. 20 is a flowchart that illustrates an example of a method for implementing a user interaction in accordance with aspects of the present disclosure.

FIG. 20 is a flowchart that illustrates an example of a method 2000 for implementing a user interaction in accordance with aspects of the present disclosure. In the method 2000, an interaction between a User 1 and a User 2 is shown in connection with a project collaboration, but such interaction may be expanding to other users as well.

The method 2000, at 2005 in User 1, may include accessing data associated with a project instance. At 2010 in User 1, the method 2000 may include analyzing data associated with project condition to determine the screen and position indicator. At 2015 in User 1, the method 200 may include modifying sync data to locate indicator on screen at the determined position. At 2020 in User 1, the method 2000 may include sending sync data to one or more clients over a network.

At 2025 in User 2, the method 2000 may include receiving from User 1 the sync data over the network. At 2030 in User 2, the method 2000 may include presenting an indicator on a screen layer at the determined position for the user. At 2035 in User 2, the method 2000 may include receiving user interaction. At 2040 in User 2, the method 2000 may include providing data associated with the user interaction to the project instance.

At 2045 in User 1, the method 2000 may include receiving from User 2 the data associated with the user interaction. At 2050 in User 1, the method 2000 may include presenting an indicator on the screen layer at the determined position for the user. At 2055 in User 1, the method 2000 may include updating sync data based on the data associated with the user interaction.

Figure 21A:
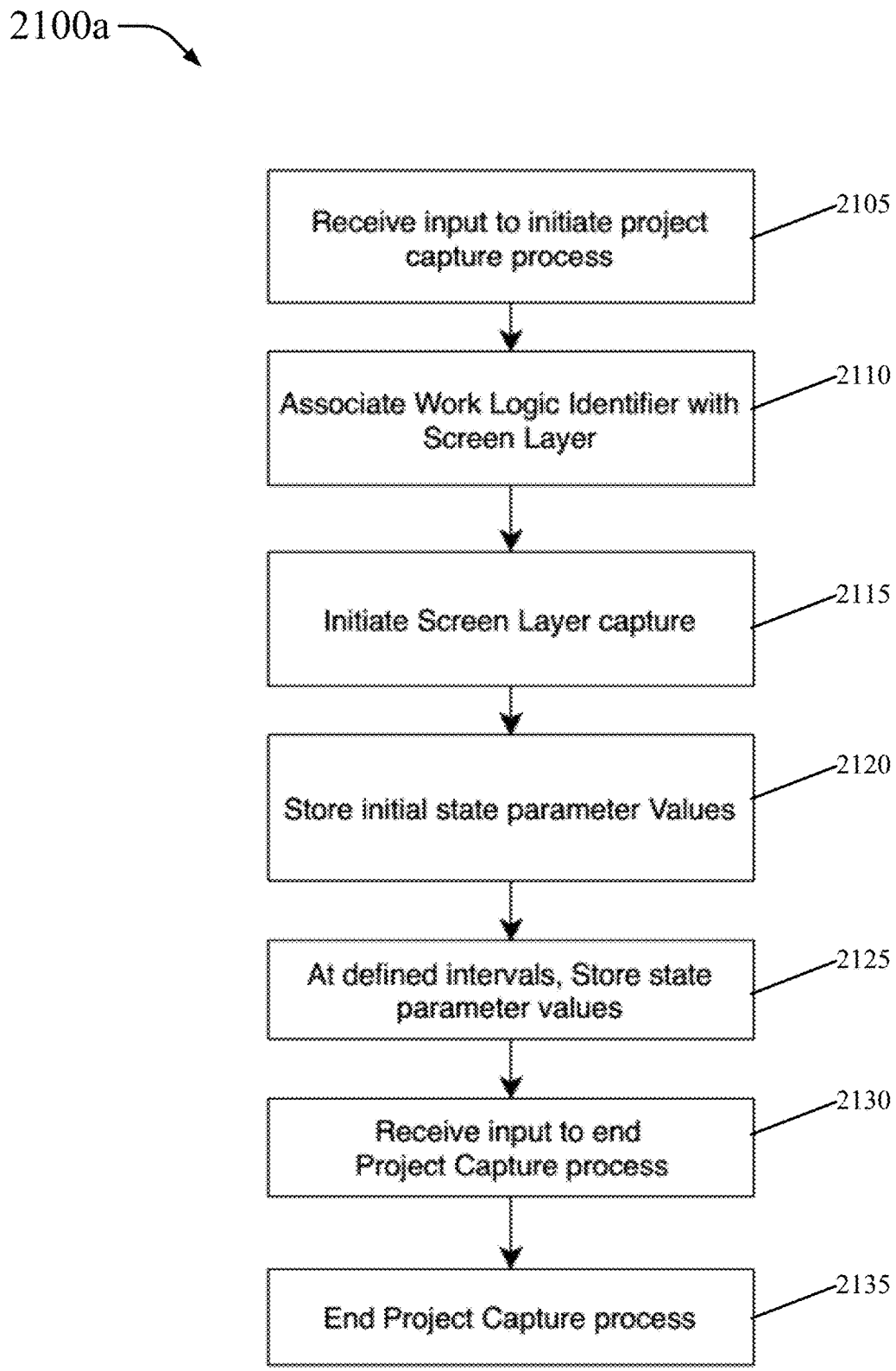
FIG. 21A is a flowchart that illustrates an example of a method for recording a user indicator in accordance with aspects of the present disclosure.

FIG. 21A is a flowchart that illustrates an example of a method 2100a for recording a user indicator in accordance with aspects of the present disclosure. In one example, a user indicator is like a mouse pointer or some other indicator of the activities of a user. The method 2100a may include, at 2105, receiving input to initiate project capture process. At 2110, the method 2100a may include associating a work logic identifier with a screen layer. A work logic may refer to a project workflow and may include pre-defined both tools and interaction. A work logic identifier may refer to an number or value that identifies a particular project workflow. At 2115, the method 2100a may include initiating a screen layer capture. At 2120, the method 2100a may include storing initial state parameters values (e.g., the user indicator input, movement, velocity values). At 2125, the method 2100a may include storing state parameter values at defined intervals. At 2130, the method 2100a may include receive input (or some indication) to end the project capture process. At 2135, the method 2100a may include ending the project capture process.

Figure 21B:
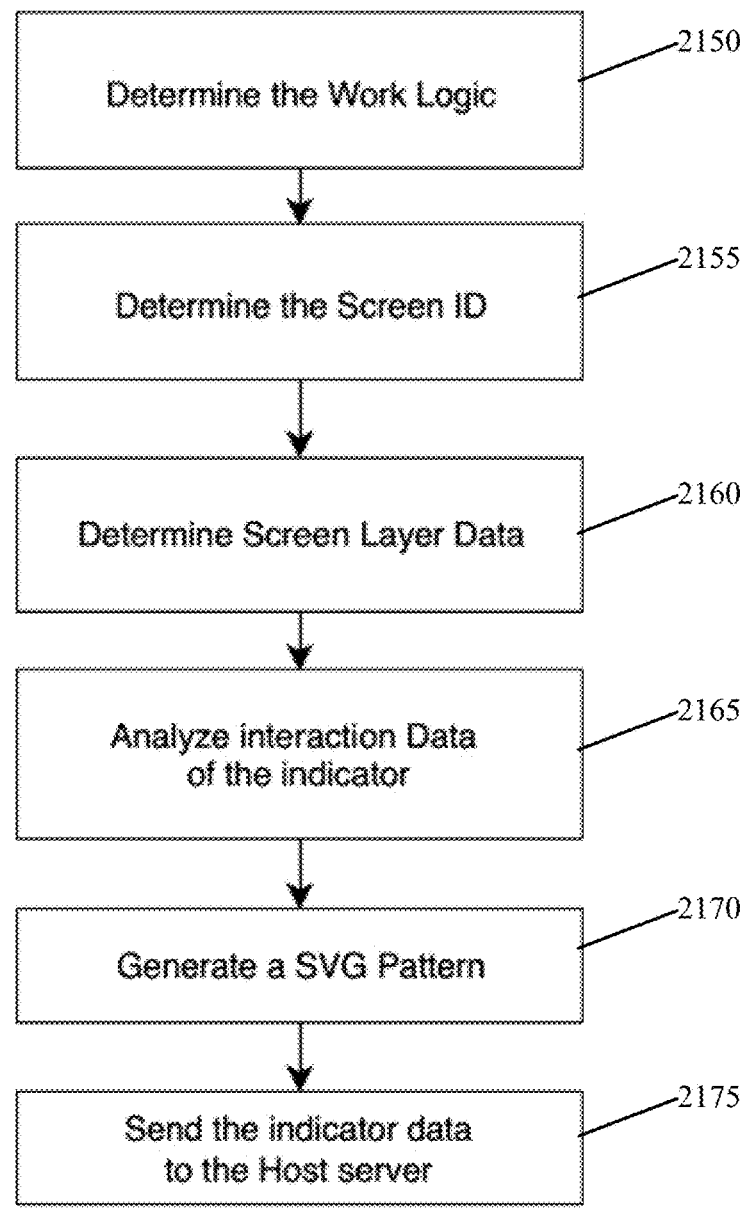
FIG. 21B is a flowchart that illustrates an example of a method for building a scalable vector graphics (SVG) pattern in accordance with aspects of the present disclosure.

FIG. 21B is a flowchart that illustrates an example of a method 2100b for building a scalable vector graphics (SVG) pattern in accordance with aspects of the present disclosure. The method 2100b may include, at 2150, determining the work logic. At 2155, the method 2100b may include determining a screen ID. At 2160, the method 2100b may include determining a screen layer data. At 2165, the method 2100b may include analyzing the interaction data of an indicator (e.g., user indicator). At 2170, the method 2100b may include generating an SVG pattern. For example, if there are multiple points of movement data based on the speed and time, this information can be used to generate a vector line with color, thickness, and/or other characteristics. At 2175, the method 2100b may include sending the indicator data to a host server.

In an aspect of the method 2100b, the method 2100b may include reading a pattern of an indicator and generating SVG to synchronize the behavior of a user workflow and create patterns from the user movement to improve the efficiency of future use of similar workflow. By using and detecting the users indicator behavior as a pattern, in a similar work flow in the future, the Q system can predict the movement and suggest the user or do the work for the user when the user is not available to work in the same or similar project.

Figure 22A:
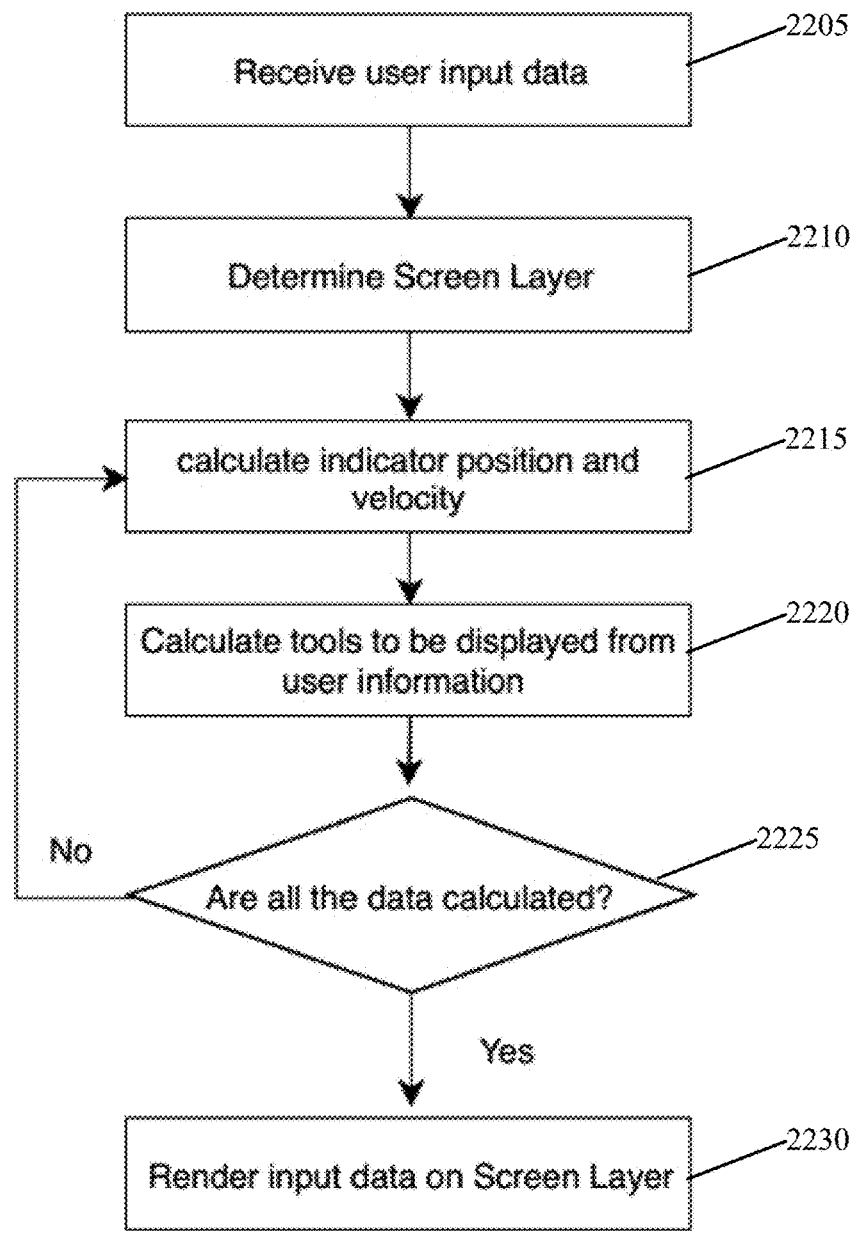
FIG. 22A is a flowchart that illustrates an example of a method for determining synchronization between users in accordance with aspects of the present disclosure.

FIG. 22A is a flowchart that illustrates an example of a method 2200a for determining synchronization between users in accordance with aspects of the present disclosure. The method 2200a may include, at 2205, receiving user input data. At 2210, the method 2200a may include determining or identifying a screen layer. At 2215, the method 2200a may include calculating an indicator position and velocity (e.g., the speed and the input of the indicator). At 2220, the method 2200a may include calculating or identifying tools to be displayed from user information. At 2225, the method 2200a may determine if all the data has been calculated. If all the data has not been calculated, the method 2200a may return to 2215. If all the data has been calculated, the method 2200a may proceed to 2230 where input data is rendered on the screen layer.

Figure 22B:
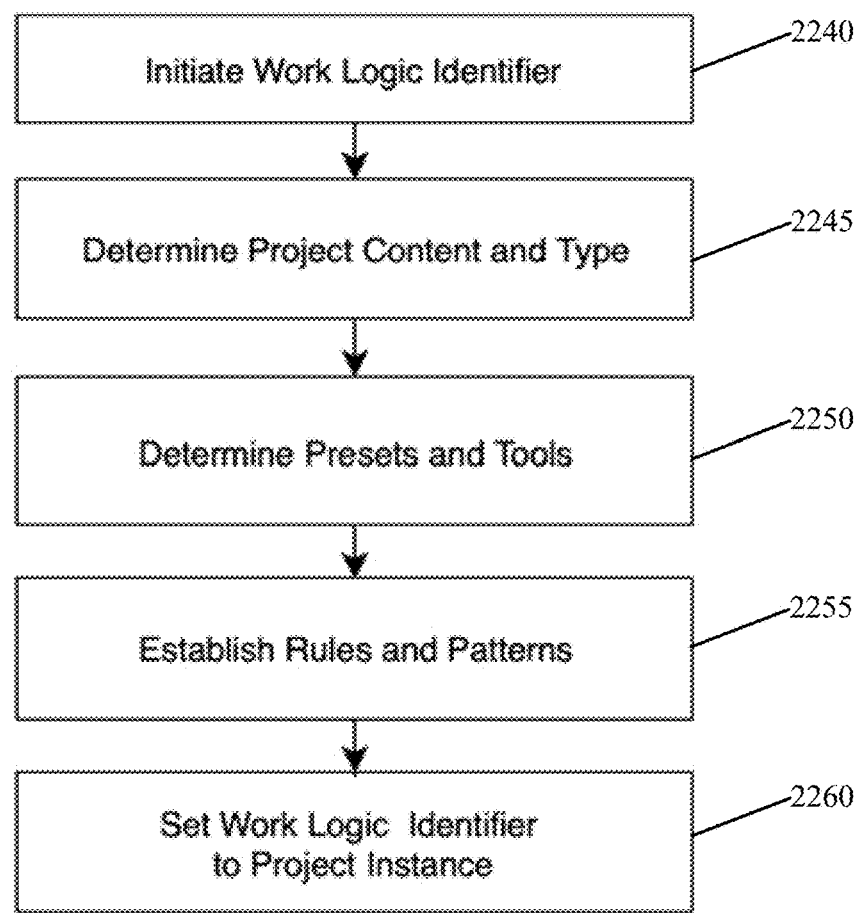
FIG. 22B is a flowchart that illustrates an example of a method for determining work logic in accordance with aspects of the present disclosure.

FIG. 22B is a flowchart that illustrates an example of a method 2200b for determining work logic in accordance with aspects of the present disclosure. The method 2200b may include, at 2240, initiating a work logic identifier. As mentioned above, work logic may refer to a project workflow or a project base setup for a user. If the project is for making a TV car commercial, for example, there are sudden tool sets available to be used for this purpose. The same may happen with any other projects where there is always a tool or set of tools to be used to build the production workflow. In one example, whether MS Word or some other application is used for text and other writing requirements in a project, work logic could per-define which application is used for writing, or could be customizable to allow the user to select a preferred application for writing. At 2245, the method 2200b may include determining a project content and type. At 2250, the method 2200b may include determining presets and tools according to the project content and type (e.g., 3D animation, car commercials, YouTube content build, video editing, music creation). At 2255, the method 2200b may include establishing rules and patterns (e.g. user-associated patterns). At 2260, the method 2200b may include setting the work logic identifier to the project instance.

Figure 22C:
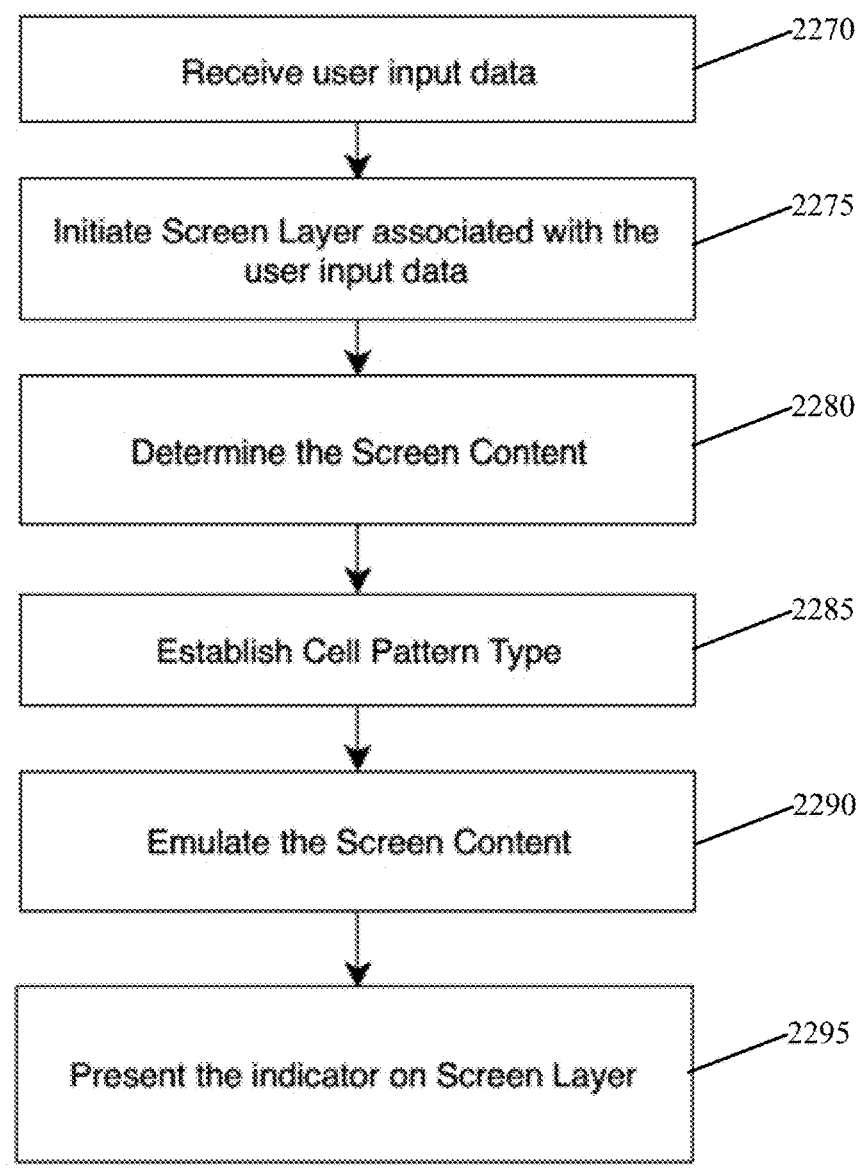
FIG. 22C is a flowchart that illustrates an example of a method for building screen layers in accordance with aspects of the present disclosure.

FIG. 22C is a flowchart that illustrates an example of a method 2200c for building screen layers in accordance with aspects of the present disclosure. The method 2200c may include, at 2270, receiving user input data. At 2275, the method 2200c may include initiating or configuring a screen layer associated with the user input data. At 2280, the method 2200c may include determining a screen content. At 2285, the method 2200c may include establishing a cell pattern type (see e.g., FIGS. 18A and 18B). At 2290, the method 2200c may include emulating the screen content. For example, emulating the screen content can be the process used on each of the user's content screen. At 2295, the method 2200c may include presenting the indicator on the screen layer.

Figure 23:
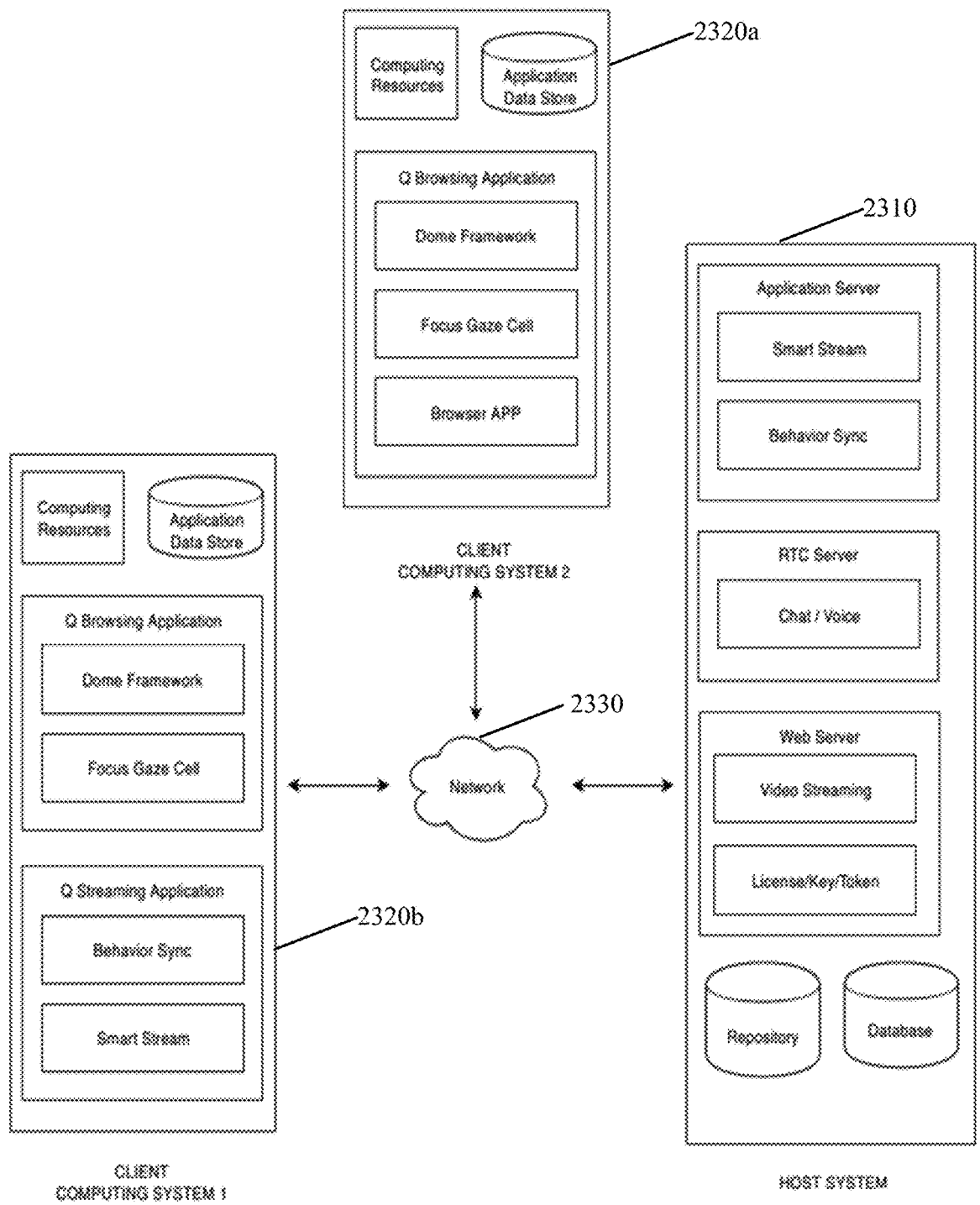
FIG. 23 is a block diagram that illustrates an example of a network system in accordance with aspects of the present disclosure.

FIG. 23 show a block diagram that illustrates an example of a network system 2300 in accordance with aspects of the present disclosure. The network system 2300 may be used to implement aspects of the Q system and enable collaboration or interaction between users of the Q system as described above. In this example, the network system 2300 includes a host system 2310. The host system 2310 may have an application server that supports the smart stream and behavior sync functionalities described herein. The host system 2310 may also include a real-time communications (RTC) server that supports chat/voice functionality. The host system 2310 may also include a web server that supports video streaming and license/key/token functionalities. The host system 2310 may include a repository and a database.

The network system 2300 may also have a first client computing system 2320b (client computing system 1 for a first user) and a second client computing system 2320a (client computing system 2 for a second user). The first client computing system 2320b may include computing resources, an application data store, a Q system browsing application that supports dome framework and focus gaze cell functionalities, and a Q system streaming application that supports behavior sync and smart stream. The second client computing system 2320a may include computing resources, an application data store, a Q system browsing application that supports dome framework, focus gaze cell, and browse application (APP) functionalities.

The host system 2310, the first client computing system 2320b, and/or the second client computing system 2320a may communicate through a network 2330 that may be implemented wirelessly, wired, or by a combination of both.

Figure 24:
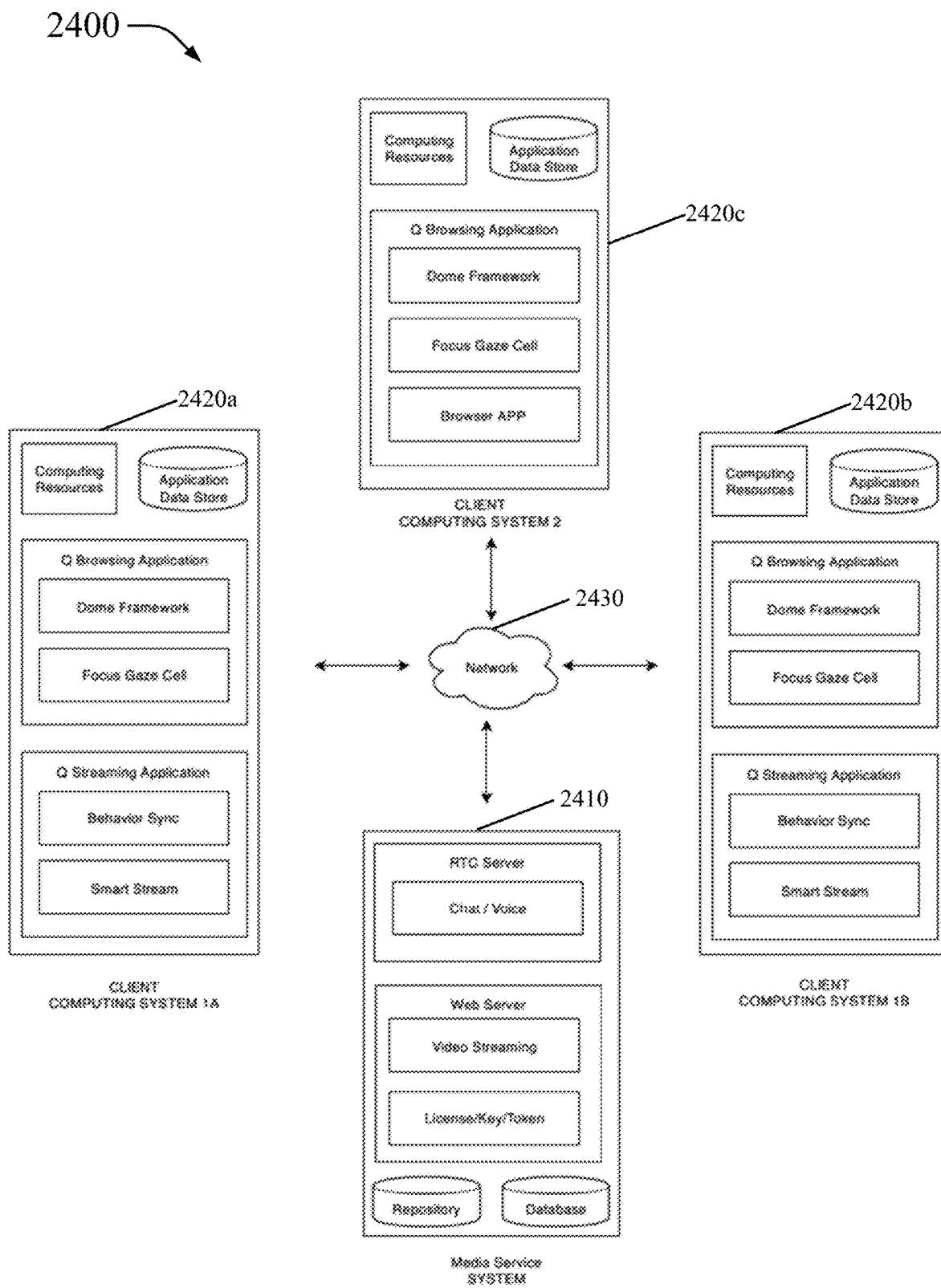
FIG. 24 is a block diagram that illustrates an example of a customizable, adaptable, multiuser network system in accordance with aspects of the present disclosure.

FIG. 24 shows a block diagram that illustrates an example of a customizable, adaptable, multiuser network system 2400 in accordance with aspects of the present disclosure. The network system 2400 may be used to implement aspects of the Q system and enable collaboration or interaction between users of the Q system as described above. The network system 2400 may include a media service system

2410, a first client computing system 2420*a* (client computing system 1A for a first user), a second client computing system 2420*b* (client computing system 1B for a second user), and a third client computing system 2420*c* (client computing system 2 for a third user).

The media service system 2410 may have an RTC server that supports chat/voice functionality. The media service system 2410 may also include a web server that supports video streaming and license/key/token functionalities. The media service system 2410 may include a repository and a database.

Both of the first client computing system 2420*a* and the second client computing system 2420*b* may include computing resources, an application data store, a Q system browsing application that supports dome framework and focus gaze cell functionalities, and a Q system streaming application that supports behavior sync and smart stream. The third client computing system 2420*c* may include computing resources, an application data store, a Q system browsing application that supports dome framework, focus gaze cell, and browse APP functionalities.

The media service system 2410, the first client computing system 2420*a*, the second client computing system 2420*b*, and/or the third client computing system 2420*c* may communicate through a network 2430 that may be implemented wirelessly, wired, or by a combination of both.

Figure 25:
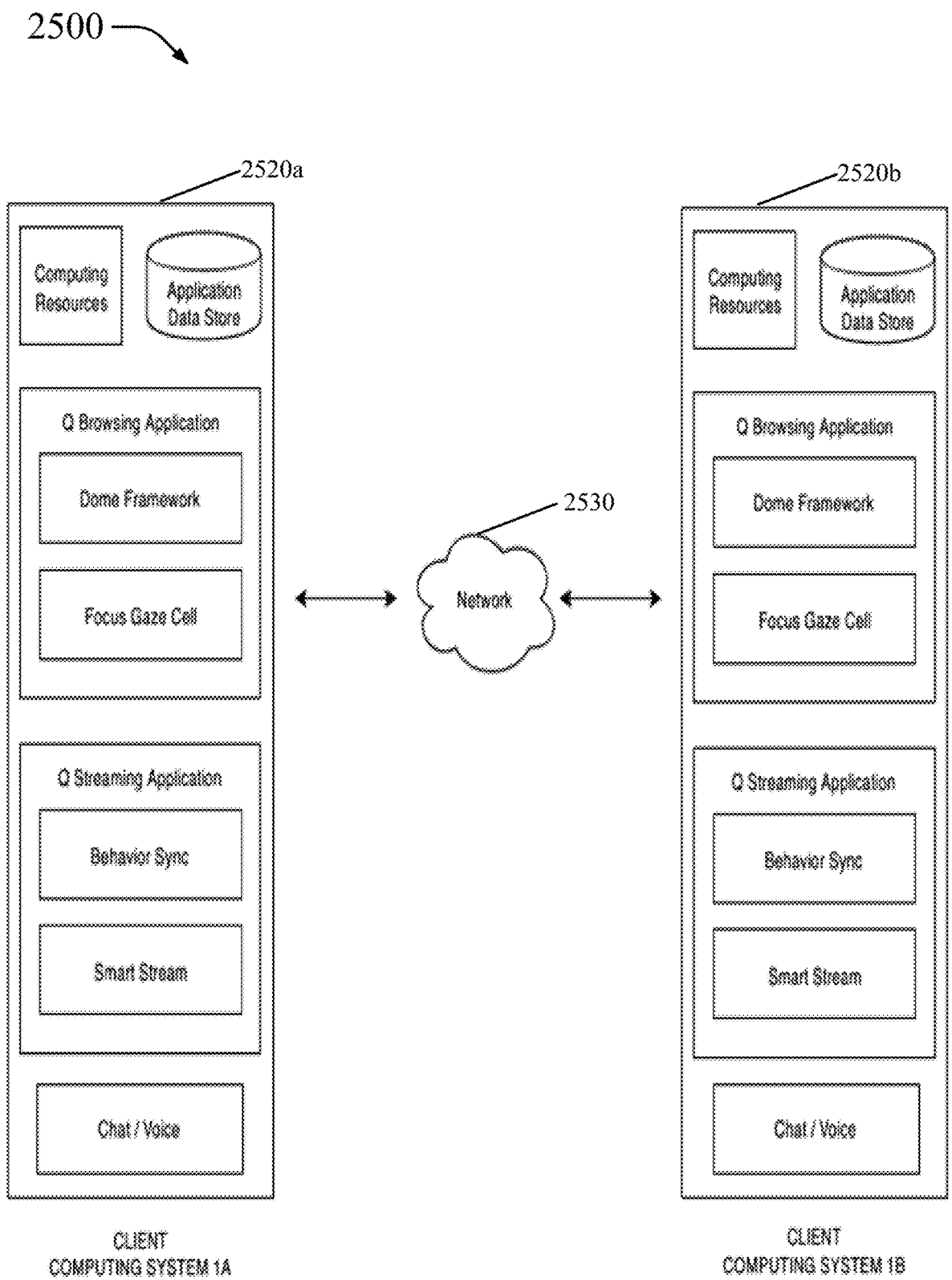
FIG. 25 is a block diagram that illustrates an example of a customizable client-to-client network system in accordance with aspects of the present disclosure.

FIG. 25 shows a block diagram that illustrates an example of a customizable client-to-client network system 2500 in accordance with aspects of the present disclosure. The network system 2500 may be used to implement aspects of the Q system and enable direct collaboration or interaction between users of the Q system as described above.

The network system 2500 may include a first client computing system 2520*a* (client computing system 1A for a first user) and a second client computing system 2520*b* (client computing system 1B for a second user). Both of the first client computing system 2520*a* and the second client computing system 2520*b* may include computing resources, an application data store, a Q system browsing application that supports dome framework and focus gaze cell functionalities, and a Q system streaming application that supports behavior sync and smart stream.

The first client computing system 2520*a* and the second client computing system 2520*b* may communicate through a network 2530 that may be implemented wirelessly, wired, or by a combination of both.

Figure 26A:
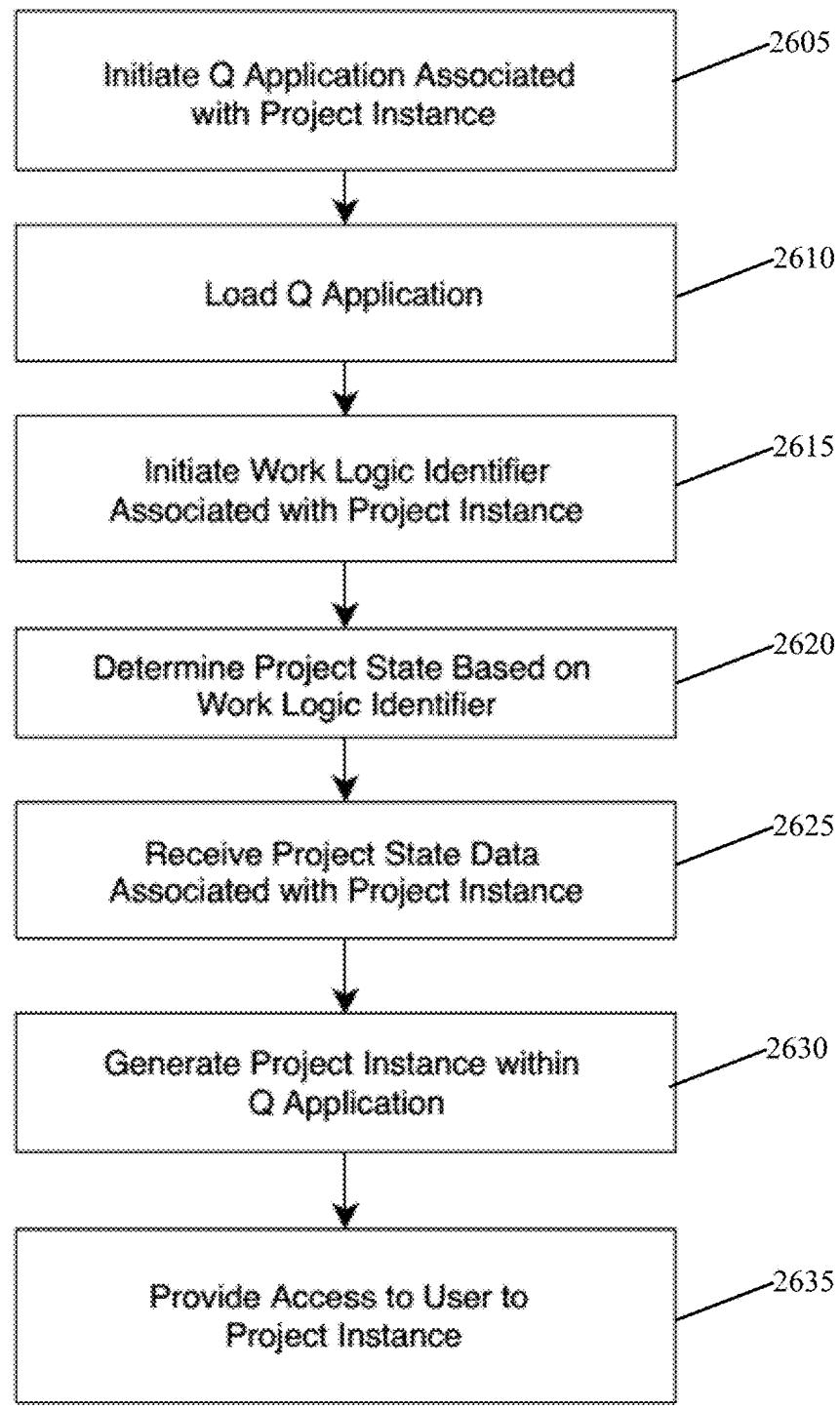
FIG. 26A is a flowchart that illustrates an example of a method for initiating an application in a three-dimensional viewing platform in accordance with aspects of the present disclosure.

FIG. 26A is a flowchart that illustrates an example of a method 2600*a* for initiating an application in a three-dimensional viewing platform (e.g., Q system) in accordance with aspects of the present disclosure. The method 2600*a* may include, at 2605, initiating an application (e.g., a Q application, Q browsing application, Q streaming application) associated with a project instance. At 2610, the method 2600*a* may include loading the application. At 2615, the method 2600*a* may include initiating a work logic identifier associated with the project instance. At 2620, the method 2600*a* may include determining a project state based on the work logic identifier. At 2625, the method 2600*a* may include receiving project state data associated with the project instance. At 2630, the method 2600*a* may include generating the project instance within the application. At 2635, the method 2600*a* may include providing access to a user to the project instance.

Figure 26B:
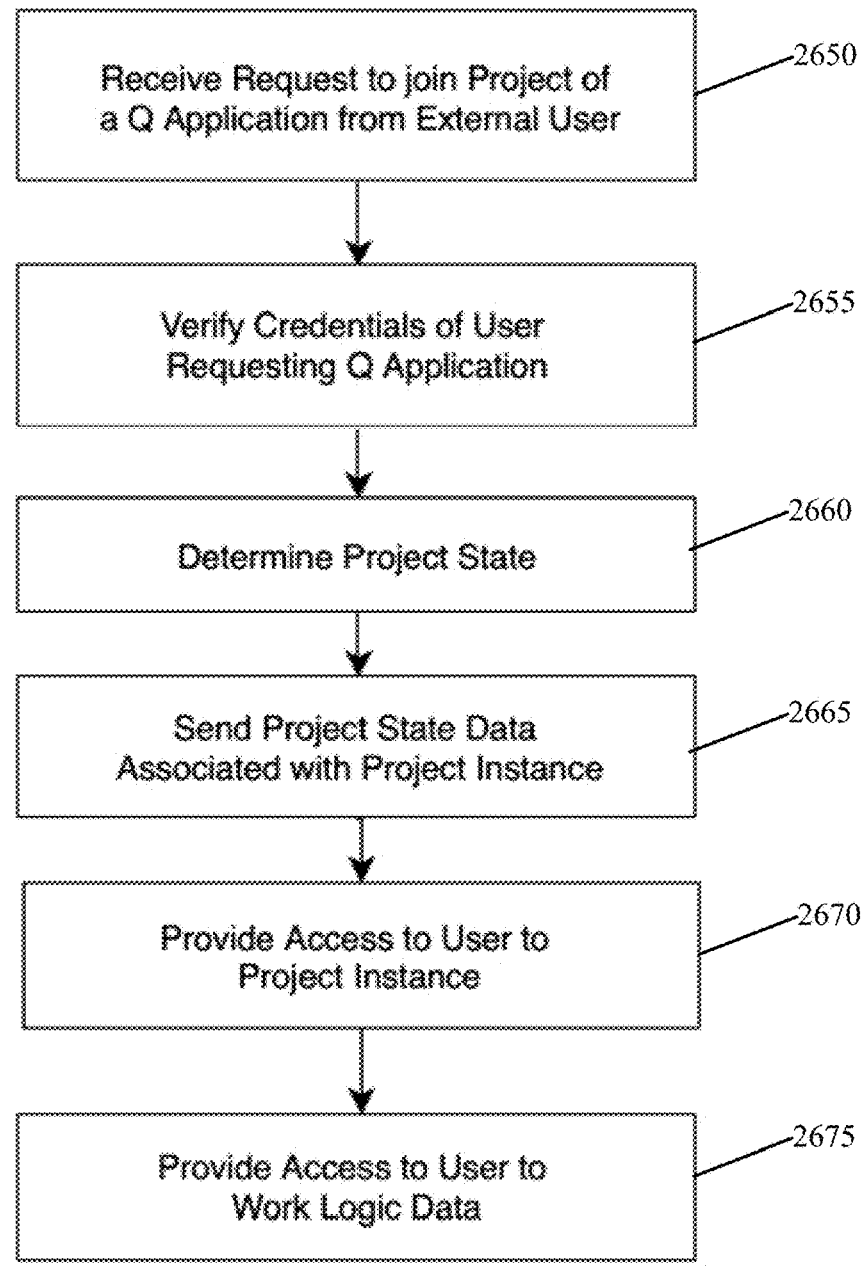
FIG. 26B is a flowchart that illustrates an example of a method for inviting an external user to join an application in a three-dimensional viewing platform in accordance with aspects of the present disclosure.

FIG. 26B shows a flowchart that illustrates an example of a method 2600*b* for inviting an external user to join an application in a three-dimensional viewing platform (e.g., Q system) in accordance with aspects of the present disclosure.

The method 2600*b* may include, at 2650, receiving a request to join a project of an application from an external user. At 2655, the method 2600*b* may include verifying the credential of the external user requesting to join the project/application (e.g., verifying whether the user is authorized to join). At 2660, the method 2600*b* may include determining a state of the project. At 2665, the method 2600*b* may include sending project data associated with the project instance to a host system or a media service system (see e.g., FIGS. 23 and 24). At 2670, the method 2600*b* may include providing access to the user to the project instance. At 2675, the method 2600*b* may include providing access to the user to the work logic data.

Figure 27A:
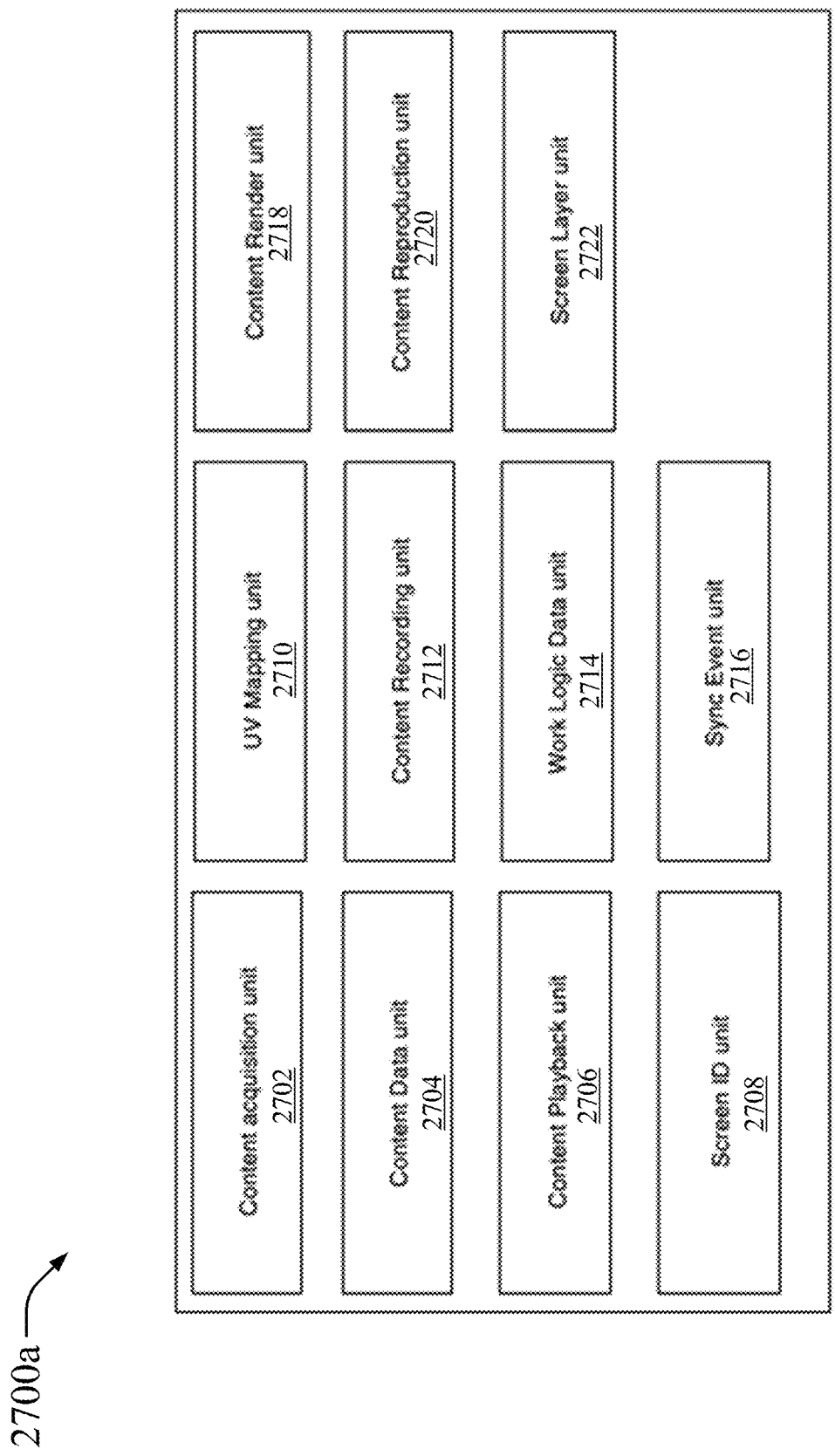
FIG. 27A is a block diagram that illustrates an example of a smart stream module in accordance with aspects of the present disclosure.

FIG. 27A is a block diagram that illustrates an example of a smart stream module 2700*a* in accordance with aspects of the present disclosure. The smart stream module 2700*a* may be used to implement, perform, enable, control, and/or support features or functionality associated with the smart stream component of the Q system. In one implementation, the smart stream module 2700*a* may include hardware and/or software organized in multiple units, each of which can perform a subset of the operations of the smart stream module 2700*a*. In an example, the smart stream module 2700*a* may include a content acquisition unit 27102, a content data unit 2704, a content playback unit 2706, a screen ID unit 2708, a UV mapping unit 2710, a content recording unit 2712, a work logic data unit 2714, a sync event unit 2716, a content render unit 2718, a content reproduction unit 2720, and a screen layer unit 2722. These units may be used in connection with one or more features, functions, operations, and/or steps described above in connection with the Q system, including some of the relevant methods described above, and more particularly, in connection with the smart stream component of the Q system.

Figure 27B:
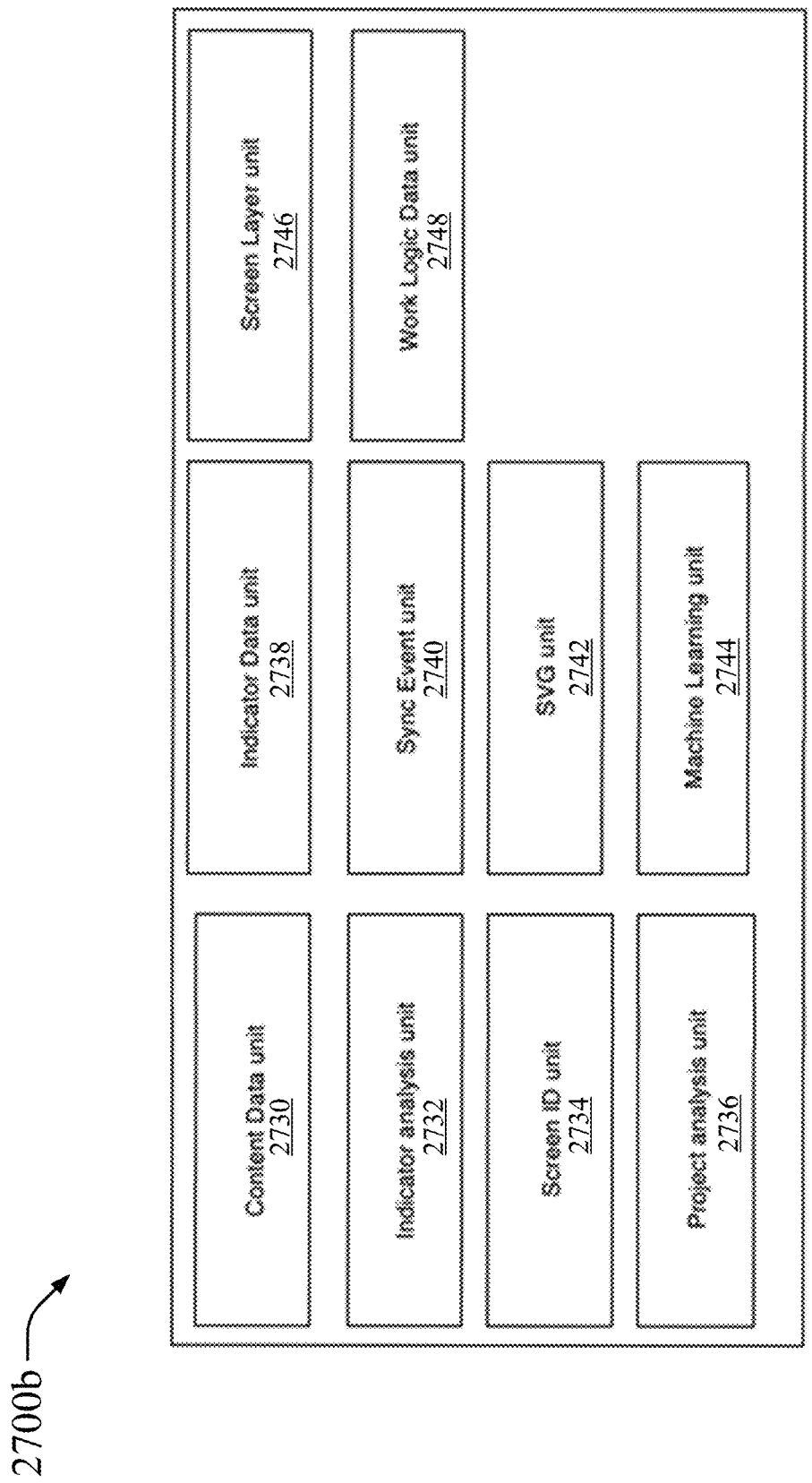
FIG. 27B is a block diagram that illustrates an example of a behavior sync module in accordance with aspects of the present disclosure.

FIG. 27B shows a block diagram that illustrates an example of a behavior sync module in accordance with aspects of the present disclosure. The behavior sync module 2700*b* may be used to implement, perform, enable, control, and/or support features or functionality associated with the behavior sync component of the Q system. In one implementation, the behavior sync module 2700*b* may include hardware and/or software organized in multiple units, each of which can perform a subset of the operations of the behavior sync module 2700*b*. In an example, the behavior sync module 2700*b* may include a content data unit 2730, an indicator analysis unit 2732, a screen ID unit 2734, a project analysis unit 2736, an indicator data unit 2738, a sync event unit 2740, an SVG unit 2742, a machine learning unit 2744, a screen layer unit 2746, and a work logic data unit 2748. These units may be used in connection with one or more features, functions, operations, and/or steps described above in connection with the Q system, including some of the relevant methods described above, and more particularly, in connection with the behavior sync component of the Q system.

Figure 28A:
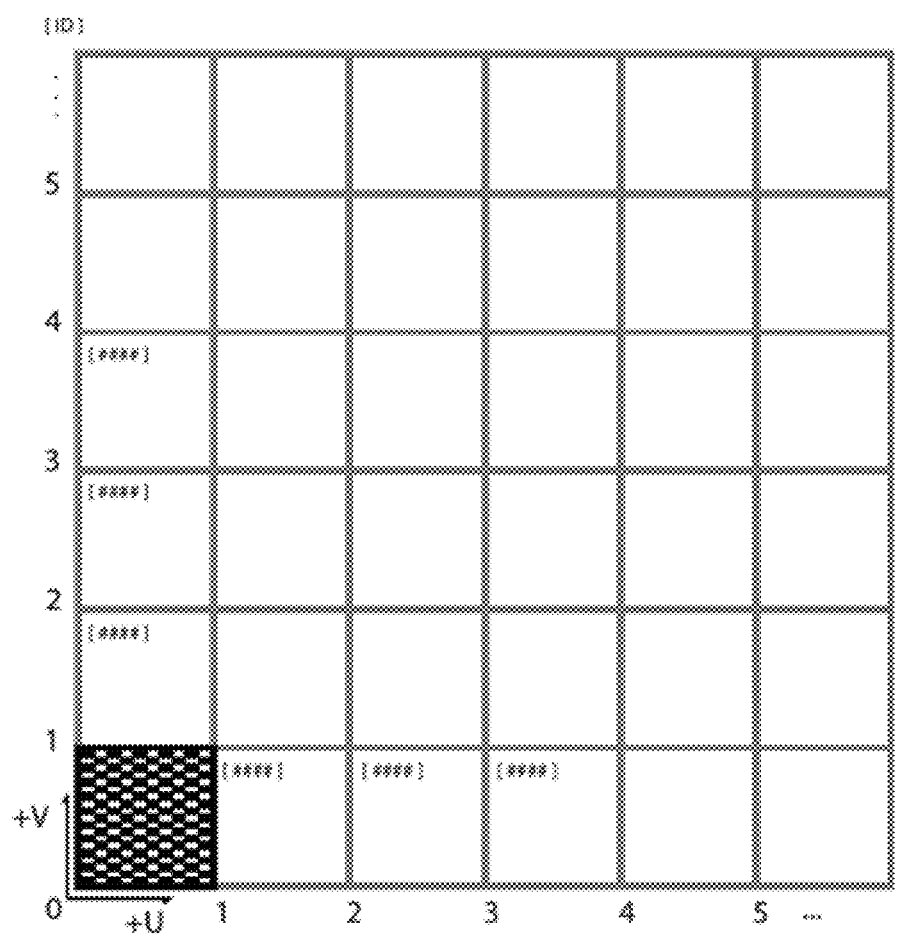
FIG. 28A is a diagram that illustrates for a smart stream an example of a UV coordinate number system in accordance with aspects of the present disclosure.

FIG. 28A shows a diagram 2800*a* that illustrates for a smart stream an example of a UV coordinate number system in accordance with aspects of the present disclosure. The diagram 2800*a* shows a stream texture UV mapping process with assigned ID to a sequence (e.g., "[ID]") and identified a linear UV order. The +U scale is shown horizontally and the +V scale is shown vertically.

Figure 28B:
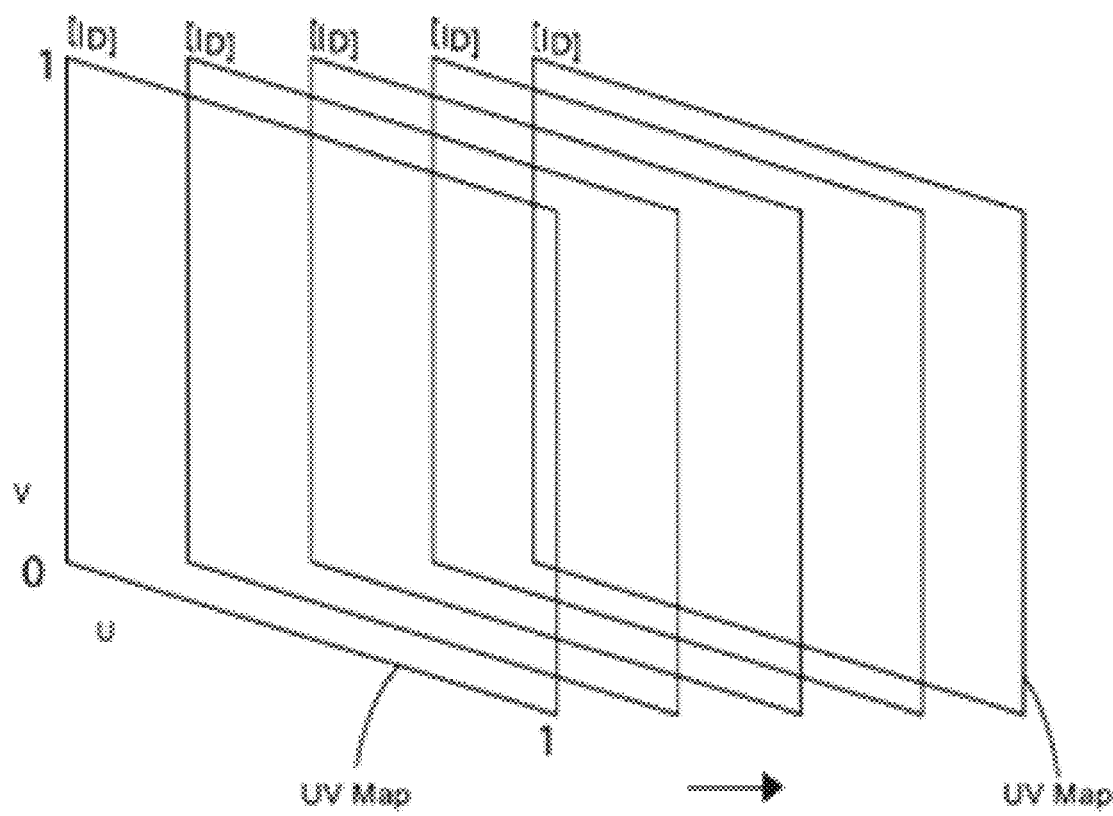
FIG. 28B is a diagram that illustrates for a smart stream an example of a UV map layout in accordance with aspects of the present disclosure.

FIG. 28B shows a diagram 2800*b* that illustrates for a smart stream an example of a UV map layout in accordance with aspects of the present disclosure. In this example, a sequence of maps with corresponding IDs are shown, where the U and V scales have been normalized to be in the range 0-1.

FIG. 29 shows diagrams 2900a and 2900b that illustrate for a smart stream examples of a UV map identifier (ID) system in accordance with aspects of the present disclosure. The diagrams 2900a and 2900b show tables in which UV mapping information is included for handling the UV mapping. In the diagram 2900a, the table includes at least a content column, a type column, a UV ID column, a sequence start number column, a sequence end number column, and a file name column. In the diagram 2900b, the table includes at least a screen ID column, a format column, a UV ID column, a UV coordination (COORD) column, a sequence ID column, and an aspect ratio column.

Figure 30:
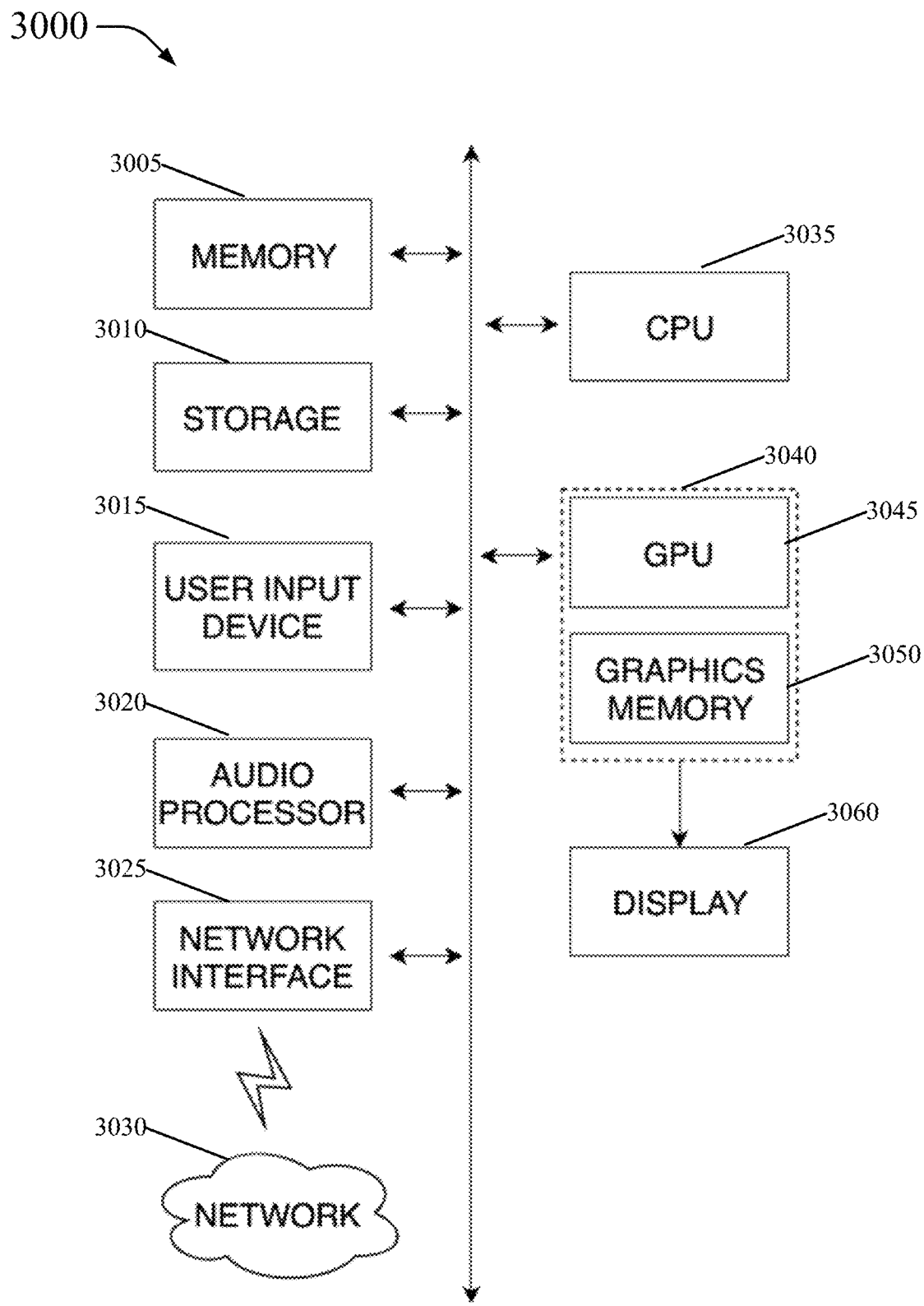
FIG. 30 is a block diagram of a computing device system for implementing the functionality of a three-dimensional viewing platform in accordance with aspects of the present disclosure.

FIG. 30 is a block diagram of a computing device system 3000 for implementing the functionality of a three-dimensional viewing platform (e.g., Q system) in accordance with aspects of the present disclosure. The computing device system 3000 may be used to implement any one or all of the aspects of the Q system (e.g., dome framework, focus gaze cell, smart stream, and behavior sync). In some instances, more than one computing device system 300 may be used when implementing the Q system or portions thereof.

The computing device system 3000 may include one or more of a memory 3005, a storage 3010, a user input device 3015, an audio processor 3020, a network interface 3025 to connect to a network 3030, a central processing unit (CPU) 3035, a graphics card 3040 having a graphics processing unit (GPU) 3040 and a graphics memory 3050, or a display 3060. The display 3060 may be used to display one or more screens 210 and may be configured to provide depth or layering capabilities (e.g., 3D display capabilities) when displaying the one or more screens 210. These elements, components, or devices of the computing device system 3000 may communicate through one or more buses as shown by the arrows.

Figure 31:
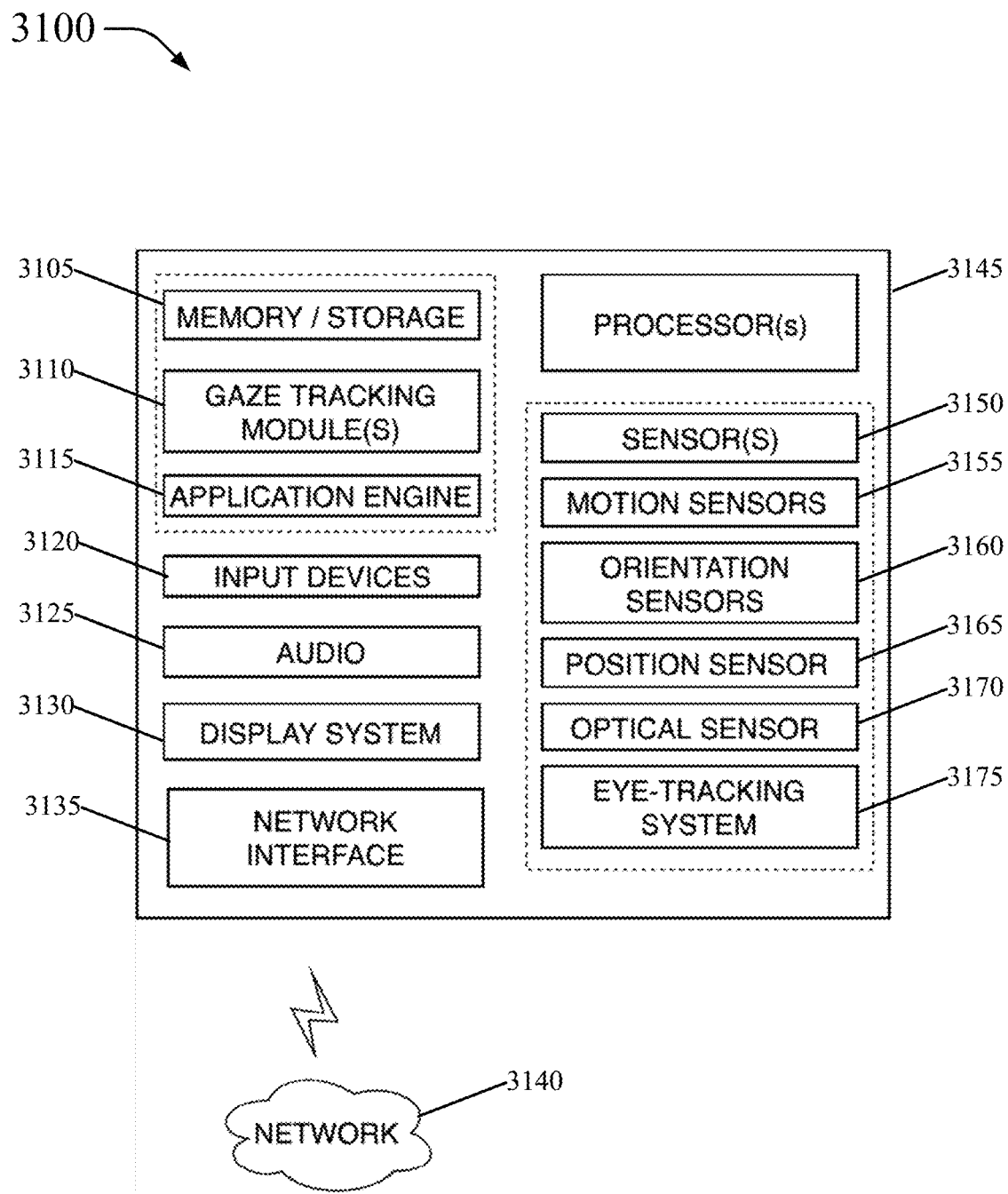
FIG. 31 is a block diagram of a head mounted display (HMD) system used in connection with a three-dimensional viewing platform in accordance with aspects of the present disclosure.

FIG. 31 shows a block diagram of a head mounted display (HMD) system 3100 used in connection with a three-dimensional viewing platform (e.g., the Q system) in accordance with aspects of the present disclosure. The HMD system 3100 may be used to implement any one or all of the user aspects associated the Q system.

The HMD system may include one or more of a memory/storage 3105, a gaze tracking module(s) 3110, an application engine 3115, input devices 3120, audio capabilities 3125, a network interface 3135 to connect to a network 3140, one or more processors 3145 (e.g., CPU, GPU), sensor(s) 3150, motion sensor(s) 3155, orientation sensor(s) 3160, position sensor(s) 3165, optical sensor(s) 3170, or an eye-tracking system 3175.

Figure 32:
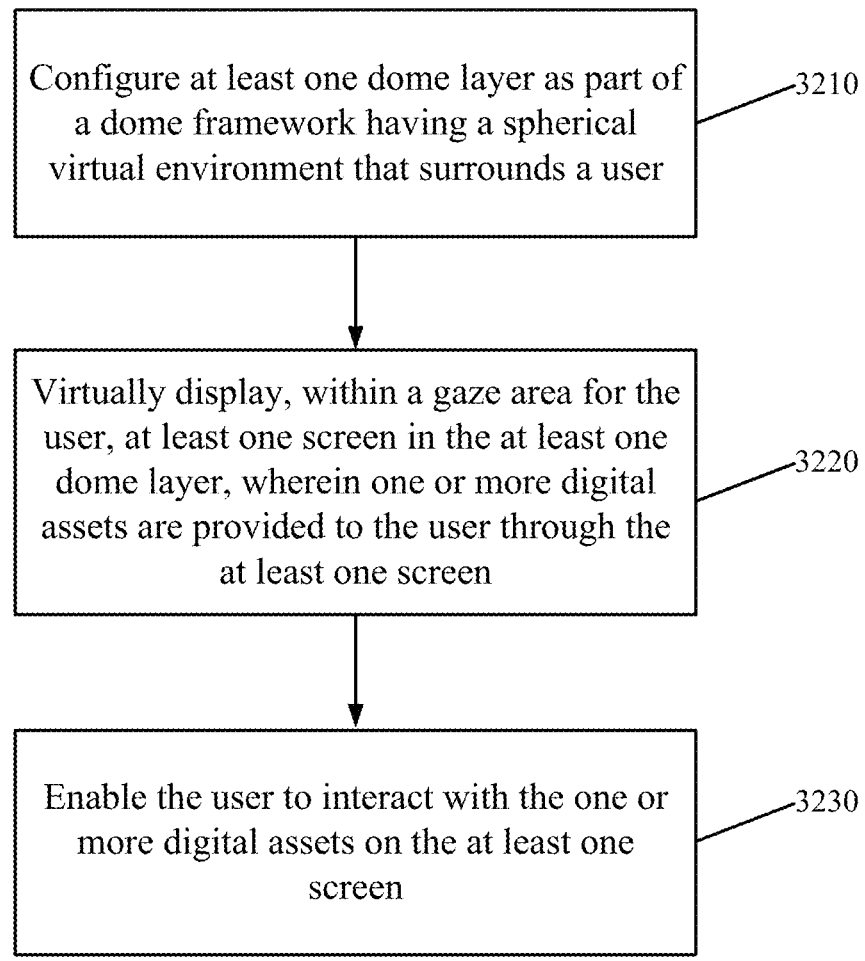
FIG. 32 is a flowchart that illustrates an example of a method for manipulating digital assets on a three-dimensional viewing platform in accordance with aspects of the present disclosure.

FIG. 32 is a flowchart that illustrates an example of a method 3200 for manipulating digital assets on a three-dimensional viewing platform in accordance with aspects of the present disclosure. Aspects of the method 3200 may be performed by one or more of the computing device system 3000, one or more of the HMD system 3100, or a combination thereof.

The method 3200, at 3210, may include configuring at least one dome layer as part of a dome framework having a spherical virtual environment that surrounds a user.

The method 3200, at 3220, may include virtually displaying, within a gaze area for the user, at least one screen in the at least one dome layer, wherein one or more digital assets are provided to the user through the at least one screen.

The method 3200, at 3220, may include enabling the user to interact with the one or more digital assets on the at least one screen.

In an aspect of the method 3200, the graze area is on a top hemisphere of the spherical virtual environment.

In an aspect of the method 3200, the user is positioned near or at a center point of the spherical virtual environment.

In an aspect of the method 3200, virtually displaying at least one screen within the gaze area includes virtually displaying multiple screens, where the multiple screens are arranged horizontally, vertically, in a matrix, or in a random fashion. The method 3200 may further include selecting one or more screens from the multiple screens for focused viewing by the user, where the selected one or more screens for focused viewing are virtually displayed to appear closer to the user than the unselected screens. The method 3200 may further include adjusting the selected one or more screens for focused viewing in size, position, viewing direction, or a combination thereof.

In another aspect of the method 3200, configuring at least one dome layer includes configuring multiple concentric dome layers as part of the dome framework, and virtually displaying at least one screen within the gaze area includes virtually displaying at least one screen in each of the dome layers. The dome layers may include an initial or default dome layers and one or more additional dome layers, the initial dome layer having a radius corresponding to the radius of the spherical virtual environment that surrounds the user, and the one or more additional dome layers each having a radius that is greater than the radius of the initial dome layer. The one or more digital assets may be provided to the user through the at least one screen in each of the dome layers.

In another aspect of the method 3200, each of the at least one screen has a screen axis associated with a direction the screen faces, and the direction is configured to face the user.

In another aspect of the method 3200, the at least one screen includes a screen border within which to display or enable custom functions.

In another aspect of the method 3200, the method 3200 may further include adjusting a size of the at least one screen by adding one or more screens to form a larger screen.

In another aspect of the method 3200, the user is free to rotate view direction within the spherical virtual environment and within the same gaze area or in a different gaze area, the rotation of the user may include a change in roll, a change in pitch, a change in yaw, or a combination thereof.

In another aspect of the method 3200, virtually displaying the at least one screen within a gaze area for the user further includes rotating the at least one screen about a screen axis, the rotation including a clockwise rotation, a counterclockwise rotation, a front-to-back rotation, a back-to-front rotation, a top-to-bottom rotation, a bottom-to-top rotation, a partial one of any of these rotations, or a combination of any of these rotations.

In another aspect of the method 3200, virtually displaying the at least one screen within a gaze area for the user further includes rotating the at least one screen between a landscape/horizontal position and a portrait/vertical position.

In another aspect of the method 3200, the method 3200 may further include interacting with at least one other user through the at least one screen. Interacting with at least one other user may include viewing through the at least one screen a screen of the at least one other user. Interacting with the at least one other user may include viewing through the at least one screen a same content screen that the at least one other user is also viewing. Interacting with the at least one one other user may include working on a same project instance through the at least one screen. Interacting with the at least one other user may include verifying the at least one other user and providing access to a project instance when the at least one other user is verified. Interacting with the at least one other user may include identifying, for a project instance, a work logic identifier that indicates a particular project workflow including pre-defined tools and user interactions. Interacting with the at least one other user may include analyzing data for the user and the at least one other user and generating patterns based on the analyzed data for future projects or to review a current project. Interacting with the at least one other user may include having a dome layer for each user, monitoring an indicator movement for each of the users through each user input and output patterns, and setting up the types of functions and schemes supported in each of the layers based on the input and output pattern of the respective user. Interacting with the at least one other user may include reading a pattern of user indicators and generating patterns from the movement in the user indicators to improve the efficiency of future use of the same or similar project workflow.

In another aspect of the method 3200, the method 3200 may further include, for the one or more digital assets, performing a stream texture UV mapping process and assigning a corresponding identifier (ID) to each UV map in the process.

In connection with the above description, the present disclosure describes aspects of a system for manipulating digital assets on a three-dimensional viewing platform, where the system includes a memory configured to store instructions, and one or more processors configured to execute the instructions to configure at least one dome layer as part of a dome framework having a spherical virtual environment that surrounds a user, to virtually display, within a gaze area for the user, at least one screen in the at least one dome layer, wherein one or more digital assets are provided to the user through the at least one screen, and to enable the user to interact with the one or more digital assets on the at least one screen.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method for manipulating digital assets on a three-dimensional viewing platform, comprising:
configuring a dome framework that supports a plurality of dome layers and has a user-centric center point and a center area around the center point with a full spherical virtual environment that surrounds (1) a user, (2) the center point, and (3) the center area, wherein the dome framework is a framing approach for positioning one or more vertices to generate screens on the plurality of dome layers, wherein each screen functions independently from any other screen, and each screen has user-centric interface rules regarding a screen size and distance from the user;
create a gaze area for the user to focus and for virtually displaying the screens, and initiating the one or more vertices in the gaze area to provide a pivot point for generating and manipulating each screen;
generating at least one dome layer of the plurality of dome layers supported by the dome framework;
virtually displaying, within the gaze area, the screens in the generated at least one dome layer, wherein one or more digital assets are provided to the user through the screens and the digital assets comprise content projected on the screens from a different user in another three-dimensional viewing platform; and
enabling the user to interact with the one or more digital assets on the screens.

2. The method of claim 1, wherein the gaze area comprises the full spherical virtual environment.

3. The method of claim 1, wherein the user is positioned near or at the center point of the spherical virtual environment.

4. The method of claim 1, wherein virtually displaying the screens within the gaze area includes virtually displaying multiple screens, the multiple screens being arranged horizontally, vertically, in a matrix, or in a random fashion.

5. The method of claim 4, further comprising selecting one or more screens from the multiple screens for focused viewing by the user, wherein the selected one or more screens for focused viewing are virtually displayed to appear closer to the user than unselected screens.

6. The method of claim 5, further comprising adjusting the selected one or more screens for focused viewing in size, position, viewing direction, or a combination thereof.

7. The method of claim 1, wherein:
configuring the dome framework includes configuring multiple concentric dome layers as part of the dome framework, and
virtually displaying the screens within the gaze area includes virtually displaying at least one screen in each of the dome layers.

8. The method of claim 7, wherein the dome layers include an initial or default dome layers and one or more additional dome layers, the initial dome layer having a radius corresponding to the radius of the spherical virtual environment that surrounds the user, and the one or more additional dome layers each having a radius that is greater than the radius of the initial dome layer.

9. The method of claim 7, wherein the one or more digital assets are provided to the user through the at least one screen in each of the dome layers.

10. The method of claim 1, wherein each of the screens has a screen axis or pivot point associated with a direction each screen faces, and wherein the direction is configured to face the user.

11. The method of claim 1, wherein each screen includes a screen border within which to display or enable custom functions.

12. The method of claim 1, further comprising adjusting a size of one of the screens by adding one or more screens to form a larger screen.

13. The method of claim 1, wherein the user is free to rotate view direction within the spherical virtual environment and within the gaze area or in a different gaze area, the rotation of the user including a change in roll, a change in pitch, a change in yaw, or a combination thereof.

14. The method of claim 1, wherein virtually displaying the screens within the gaze area for the user further includes rotating the screens about a screen axis, the rotation including a clockwise rotation, a counterclockwise rotation, a front-to-back rotation, a back-to-front rotation, a top-to-bottom rotation, a bottom-to-top rotation, a partial one of any of these rotations, or a combination of any of these rotations.

15. The method of claim 1, wherein virtually displaying the screens within the gaze area for the user further includes rotating the screens between a landscape/horizontal position and a portrait/vertical position.

16. The method of claim 1, further comprising interacting with the different user through one of the screens.

17. The method of claim 16, wherein interacting with the different user includes viewing through the one screen a screen of the different user.

18. The method of claim 16, wherein interacting with the different user includes viewing through the one screen a same content screen that the different user is also viewing.

19. The method of claim 16, wherein interacting with the different user includes working on a same project instance through the one screen.

20. The method of claim 16, wherein interacting with the different user includes verifying the different user and providing access to a project instance when the other different user is verified.

21. The method of claim 16, wherein interacting with the different user includes identifying, for a project instance, a work logic identifier that indicates a particular project workflow including pre-defined tools and user interactions.

22. The method of claim 16, wherein interacting with the different user includes analyzing data for the user and the other different user and generating patterns based on the analyzed data for future projects or to review a current project.

23. The method of claim 16, wherein interacting with the different user includes having a dome layer for each user, monitoring an indicator movement for each of the users through each user input and output patterns, and setting up types of functions and schemes supported in each of the layers based on the input and output pattern of a respective user.

24. The method of claim 16, wherein interacting with the different user include reading a pattern of user indicators and generating patterns from movement in the user indicators to improve an efficiency of future use of same or similar project workflow.

25. The method of claim 1, further comprising for the one or more digital assets, performing a stream texture UV mapping process and assigning a corresponding identifier (ID) to each UV map in the process.

26. A system for manipulating digital assets on a three-dimensional viewing platform, comprising:
a memory configured to store instructions; and
one or more processors configured to execute the instructions to:
configure a dome framework that supports a plurality of dome layers and has a user-centric center point and a center area around the center point with a full spherical virtual environment that surrounds (1) a user, (2) the center point, and (3) the center area, wherein the dome framework is a framing approach for positioning one or more vertices to generate screens on the plurality of dome layers, wherein each screen functions independently from any other screen, and each screen has user-centric interface rules regarding a screen size and distance from the user;
create a gaze area for the user to focus and for virtually displaying the screens, and initiate the one or more vertices in the gaze area to provide a pivot point for generating and manipulating each screen;
generate at least one dome layer of the plurality of dome layers supported by the dome framework;
virtually display, within the gaze area, the screens in the generated at least one dome layer, wherein one or more digital assets are provided to the user through the screens and the digital assets comprise content projected on the screens from a different user in another three-dimensional viewing platform; and
enable the user to interact with the one or more digital assets on the screens.

* * * * *